(12) United States Patent
Patch et al.

(10) Patent No.: US 11,156,522 B2
(45) Date of Patent: Oct. 26, 2021

(54) RADIAL SEAL FOR DISPOSABLE FORCE SENSOR

(71) Applicant: HONEYWELL INTERNATIONAL INC., Morris Plains, NJ (US)

(72) Inventors: Jason Dennis Patch, Columbus, OH (US); Richard Wade, Worthington, OH (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 240 days.

(21) Appl. No.: 16/369,568

(22) Filed: Mar. 29, 2019

(65) Prior Publication Data

US 2020/0309268 A1     Oct. 1, 2020

(51) Int. Cl.
   *G01L 19/00*    (2006.01)
   *F16J 15/10*    (2006.01)
   (Continued)

(52) U.S. Cl.
   CPC .......... *G01L 19/003* (2013.01); *F16J 15/064* (2013.01); *F16J 15/104* (2013.01); *G01L 1/2206* (2013.01);
   (Continued)

(58) Field of Classification Search
   CPC . G01L 19/149; G01L 19/003; G01L 19/0645; G01L 1/2206; G01L 3/1457;
   (Continued)

(56) References Cited

U.S. PATENT DOCUMENTS

| | | | |
|---|---|---|---|
| 4,679,567 A | | 7/1987 | Hanlon et al. |
| 4,825,876 A | * | 5/1989 | Beard .................. A61B 5/0215 |
| | | | 439/930 |

(Continued)

FOREIGN PATENT DOCUMENTS

| | | |
|---|---|---|
| CN | 101957245 A | 1/2011 |
| CN | 106233119 A | 12/2016 |

(Continued)

OTHER PUBLICATIONS

Globe Scientific, Laboratory Consumables for Routine Urinalysis Applications: A full line of laboratory consumables for use in routine urinalysis applications. (Year: 2018).*

(Continued)

*Primary Examiner* — David L Singer
(74) *Attorney, Agent, or Firm* — Alston & Bird LLP

(57) ABSTRACT

A pressure reading assembly including a housing defining a conduit configured to transmit bodily fluid therethrough and a receiving tube having a first opening and an inner cylindrical surface. The pressure reading assembly further includes a sensing apparatus which includes a sensor disposed on a substrate and an engagement member including a generally columnar sealing member configured to engage an inner cylindrical surface of a receiving tube within the housing connected to the substrate about the sensor. The sealing member defines an axial bore extending from a proximal end to a distal end and includes an outer sealing surface defining one or more engaging elements configured to non-adhesively engage the inner cylindrical surface of the receiving tube to resist removal of the sensor assembly so that a pre-sterilized sensor assembly can be removed from a clean sealed packaging and joined directly with the housing.

20 Claims, 25 Drawing Sheets

(51) Int. Cl.
*G01L 1/22* (2006.01)
*F16J 15/06* (2006.01)
G01L 19/06 (2006.01)
G01L 3/14 (2006.01)

(52) U.S. Cl.
CPC ........ *G01L 3/1457* (2013.01); *G01L 19/0645* (2013.01)

(58) Field of Classification Search
CPC ......... G01L 5/161; G01L 19/14; F16J 15/064; F16J 15/104; F16J 15/3232; F16J 15/48; G01D 11/245; G01K 1/08; F16L 2201/10; F16L 37/0885; F16L 41/008
USPC ................................................ 4/295; 401/94
See application file for complete search history.

(56) References Cited

U.S. PATENT DOCUMENTS

| | | | | |
|---|---|---|---|---|
| 5,097,841 | A * | 3/1992 | Moriuchi | A61B 5/0215 600/488 |
| 5,273,047 | A * | 12/1993 | Tripp | A61B 5/02156 600/488 |
| 5,410,916 | A * | 5/1995 | Cook | G01L 19/0038 600/561 |
| 5,438,876 | A | 8/1995 | Lewis et al. | |
| 5,549,276 | A * | 8/1996 | Pittman | F16K 41/02 251/214 |
| 5,765,436 | A | 6/1998 | Wilda et al. | |
| 2002/0198458 | A1* | 12/2002 | Tripp, Jr. | A61B 5/0215 600/485 |
| 2005/0120813 | A1* | 6/2005 | Clark | E21B 49/08 73/866.5 |
| 2006/0058740 | A1* | 3/2006 | Cise | A61M 39/281 604/247 |
| 2006/0217618 | A1* | 9/2006 | Lia | G01L 7/104 600/499 |
| 2007/0167910 | A1* | 7/2007 | Tennican | A61M 5/31596 604/110 |
| 2007/0216105 | A1* | 9/2007 | Fessele | G01L 19/0007 277/318 |
| 2008/0018029 | A1* | 1/2008 | Leonard | B60G 11/26 267/64.27 |
| 2008/0127741 | A1* | 6/2008 | Selvan | G01F 1/383 73/727 |
| 2010/0206046 | A1* | 8/2010 | Bentley | G01L 19/0023 73/29.02 |
| 2011/0005326 | A1* | 1/2011 | Bentley | G01L 19/148 73/754 |
| 2011/0107839 | A1 | 5/2011 | Teli et al. | |
| 2011/0210516 | A1* | 9/2011 | Sharp | F17C 1/16 277/312 |
| 2012/0079886 | A1 | 4/2012 | Beck et al. | |
| 2012/0247179 | A1* | 10/2012 | Kerin | G01K 1/08 73/23.2 |
| 2016/0231186 | A1 | 8/2016 | Sood et al. | |
| 2016/0327416 | A1* | 11/2016 | Gagne | G01L 19/144 |
| 2018/0195924 | A1* | 7/2018 | Patch | G01L 19/147 |
| 2019/0011321 | A1* | 1/2019 | Kobayashi | G01L 19/003 |

FOREIGN PATENT DOCUMENTS

| | | |
|---|---|---|
| EP | 0330011 A2 | 8/1989 |
| EP | 2273247 A2 | 1/2011 |
| EP | 2462865 A2 | 6/2012 |
| EP | 3348982 A1 | 7/2018 |
| WO | 86/02446 A1 | 4/1986 |

OTHER PUBLICATIONS

Translation of Office Action Issued in Chinese Application No. 202010240020.1 dated Jun. 3, 2021 (Year: 2021).*
Extended European Search Report for Patent Application No. 20165413.4 dated Aug. 27, 2020, 11 pages.
James Gaskets Map Sensor Seal—JGI-11291, [retrieved Jun. 28, 2019] retrieved from the Internet<URL: https://fortnine.ca/en/james-gaskets-manifold-air-sensor-seal-jgi-11291> 5 pages.
Dade Manifold Absolute Barometric Pressure Map Sensor Replaces 213-796 8093594090 16187556, [retrieved Jun. 28, 2019] retrieved from the Internet<URL: https://www.amazon.com/09359409-Manifold-Absolute-Barometric-Pressure/dp/B01GX19CWQ/ref=pd_lpo_vtph_bs_lp_img_1?_encoding=UTF8&psc=1&refRID=NQ4QQR7FR17VHBXTHF9S> 8 pages.
Office Action Issued in Chinese Application No. 202010240020.1 dated Jun. 3, 2021, 10 pages,.
Office Action received for European Application No. 20165413.4, dated Jul. 30, 2021, 7 pages.

* cited by examiner

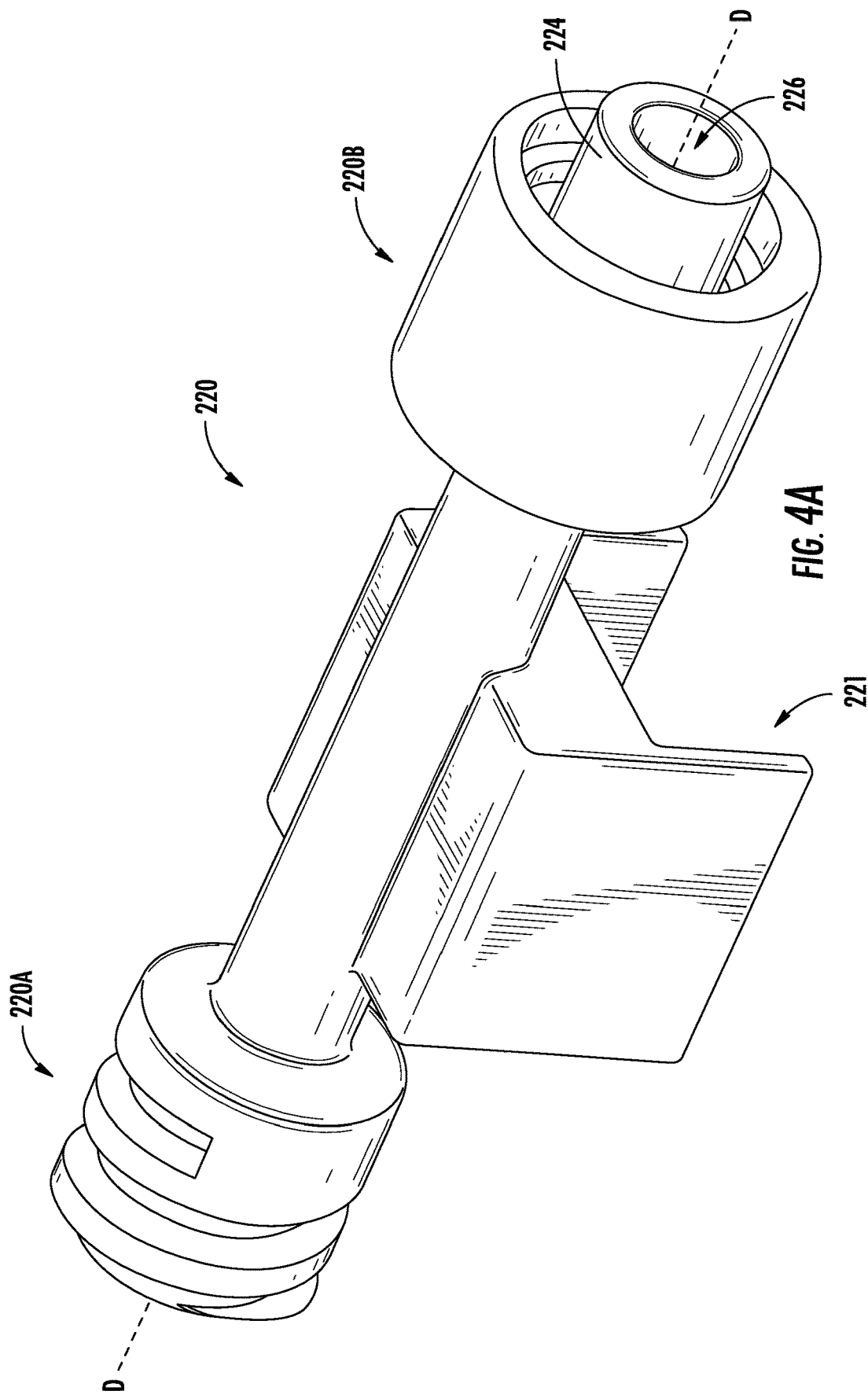

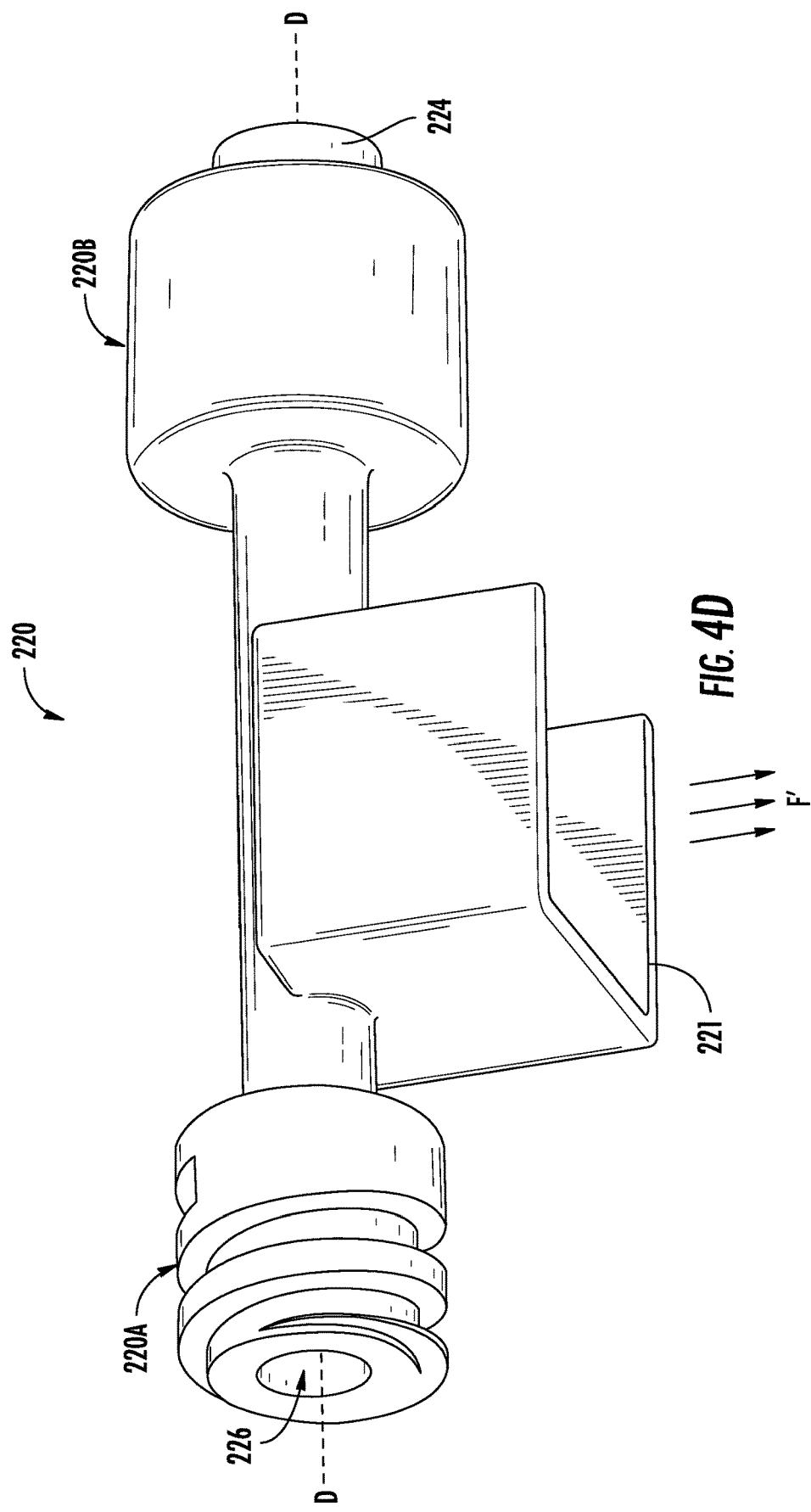

RADIAL SEAL FOR DISPOSABLE FORCE SENSOR

TECHNOLOGICAL FIELD

Embodiments of the present disclosure relate generally to sensors and, more particularly, to facilitating secure connection between a sensor and a housing.

BACKGROUND

Sensors may be used to directly or indirectly measure the force or pressure of a fluid flowing in a system. For example, such sensors may be used in a healthcare environment to determine blood pressure or the pressure of another fluid travelling through a conduit. Currently, such sensors are difficult and inefficient to produce and require substantial time, manufacturing steps, and materials to produce. Applicant has identified a number of deficiencies and problems associated with conventional sensors and sensor systems. Through applied effort, ingenuity, and innovation, many of these identified problems have been solved by developing solutions that are included in embodiments of the present disclosure, many examples of which are described in detail herein.

BRIEF SUMMARY

Various embodiments described herein relate generally to a radial seal for non-adhesive coupling of sensors such as pressure sensors within a housing of a healthcare sensor device. An example sensor device can include a sensor disposed on a substrate and an engagement member connected to the substrate about the sensor. In some embodiments, the engagement member can include a generally columnar sealing member configured to engage an inner cylindrical surface of a receiving tube. In some embodiments, the receiving tube can be a part of a housing as a separate apparatus or as an integral part of the same apparatus. In some embodiments, the generally columnar sealing member can define an axial bore extending from a proximal end to a distal end. In some embodiments, the generally columnar sealing member can be configured to receive one or more media in the axial bore. In some embodiments, the one or more media can include any suitable sealing gel or other such material, such as a silicone-containing gel, room temperature vulcanizing rubber, and the like. In some embodiments, the sensor can be configured to detect a force applied to the media at or proximate the distal end. In some embodiments, the generally columnar sealing member can include at least an outer sealing surface defining one or more engaging elements extending circumferentially about a diameter of the generally columnar sealing member.

In some embodiments, the one or more engaging elements stand proud of at least a portion of the outer sealing surface of the generally columnar sealing member and define an asymmetrical shape relative to the insertion direction. In some embodiments, at least one of the one or more engaging elements can include i) a medial portion that is generally flat in an axial direction and extends about the generally columnar sealing member in a circumferential direction, ii) a proximal portion adjacent the medial portion in a proximal direction and extending about the generally columnar sealing member in the circumferential direction, wherein an intersection of the medial portion and the proximal portion defines a first reflex angle, and iii) a distal portion adjacent the medial portion in a distal direction and extending about the generally columnar sealing member in the circumferential direction, wherein an intersection of the medial portion and the distal portion defines a second obtuse angle greater than the first reflex angle. In some embodiments, the one or more engaging elements can be configured to engage the inner cylindrical surface of the receiving tube to resist removal of the sensor from the receiving tube during operation. In some embodiments, the one or more engaging elements can be configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end.

In some embodiments, one of the one or more engaging elements can include or define an inclined surface defined circumferentially about a distal opening of the axial bore at the distal end of the generally columnar sealing member. In some embodiments, the outer sealing surface of the generally columnar sealing member can be configured to form an adhesive-free interface with the inner cylindrical surface of the receiving tube, such that the engagement of the outer sealing surface with the inner cylindrical surface is configured to support the force applied to the media. In some embodiments, the one or more engaging elements can include at least two engaging elements spaced along the outer sealing surface. In some embodiments, the engagement member can further include a generally columnar receiving collar coupled to the substrate and positioned about the sensor, at least a portion of the generally columnar sealing member configured to be disposed about at least a portion of the generally columnar receiving collar, such that the at least the portion of the generally columnar receiving collar is configured to be disposed in the axial bore of the generally columnar sealing member. In some embodiments, the receiving collar and/or the engagement member can further include a flange coupled to the generally columnar sealing member within a distal opening of the axial bore. In some embodiments, the flange can define an aperture at the distal end of the generally columnar sealing member that has an inner diameter less than the inner diameter of the generally columnar sealing member. In some embodiments, the flange can be configured to have a width in an inward radial direction such that a portion of the flange forms a partial covering for the axial bore. In some embodiments, the flange can further include a contact surface having a positive slope in a distal direction and an inward radial direction, the slope of the flange dimensioned such that a flow of the fluid in a generally perpendicular direction about the flange exhibits substantially laminar flow. In some embodiments, the flange can be dimensioned such that no, substantially no, or a lesser amount of gas bubbles are formed in the fluid when the fluid passes over and about the flange.

In some embodiments, the one or more engaging elements can include the one or more engaging elements one or more protrusions extending radially outwardly and angled at least partially towards the proximal end. In some embodiments, the one or more engaging elements can have two or more vertices abutting or coupled to the outer sealing surface of the generally columnar sealing member and two or more other vertices raised above the outer sealing surface of the generally columnar sealing member in an axial direction (e.g., a direction perpendicular to the insertion direction). In some embodiments, at least one of the two or more other vertices can be proximate the two or more vertices. In some embodiments, one or more of the engaging elements can include a proximal portion having an end portion forming a first angle opposite the generally columnar sealing member, a medial portion that is generally flat in a axial direction and rounded about the generally columnar sealing member in a radial direction, and a distal portion having a tapered end portion that forms a second angle opposite the generally columnar sealing member greater than the first angle.

In some embodiments, the sensor device can further include an inclined plane defined circumferentially about an aperture at the distal end of the generally columnar sealing member. In some embodiments, the outer sealing surface of the generally columnar sealing member can be configured to form an adhesive-free interface with the inner cylindrical surface of the receiving tube. In some embodiments, the one or more engaging elements can include at least two engaging elements spaced along the outer sealing surface. In some embodiments, the housing can include a generally columnar receiving collar coupled to the substrate and positioned about the sensor, at least a portion of the generally columnar sealing member configured to be disposed about at least a portion of the generally columnar receiving collar. In some embodiments, the generally columnar sealing member can have an innermost diameter, relative to an axis from the distal end to the proximal end, that is less than an outermost diameter of the generally columnar receiving collar, such that the sealing member is configured to stretch around the generally columnar receiving collar and be frictionally secured to the generally columnar receiving collar. In some embodiments, during insertion of the engagement member into the receiving tube, the one or more engaging elements exert a first resistive force on the inner cylindrical surface of the receiving tube and, during removal of the engagement member from the receiving tube, the one or more engaging elements exerts a second resistive force greater than the first resistive force on the inner cylindrical surface of the receiving tube.

According to other embodiments of the present disclosure, a pressure reading assembly can include, at least a housing defining a conduit configured to transmit bodily fluid therethrough, the conduit defining a conduit wall, and a receiving tube having a first opening, an inner cylindrical surface, and a second opening in the conduit wall. In some embodiments, the pressure reading assembly can further include a sensing apparatus including at least a sensor disposed on a substrate and an engagement member connected to the substrate about the sensor. In some embodiments, the engagement member can include a generally columnar sealing member configured to engage the first opening of the receiving tube. In some embodiments, the generally columnar sealing member can define an axial bore extending from a proximal end to a distal end. In some embodiments, the generally columnar sealing member is configured to receive one or more media in the axial bore. In some embodiments, the sensor is configured to detect a force applied to the media at or proximate the distal end. In some embodiments, the generally columnar sealing member can include an outer sealing surface defining one or more engaging elements extending circumferentially about a diameter of the generally columnar sealing member, wherein the one or more engaging elements are configured to engage the inner cylindrical surface of the receiving tube to resist removal of the sensor during operation. In some embodiments, the one or more engaging elements are configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end.

In some embodiments, the pressure reading assembly can include a fluidic sealing agent disposed within the generally columnar sealing member. In some embodiments, the fluidic sealing agent can include a silicone-containing gel, a room temperature vulcanizing rubber, and/or the like. In some embodiments, the pressure reading assembly can include a contact surface defined by an inclined plane defined circumferentially about the aperture at the distal end of the generally columnar sealing member. In some embodiments, at least a portion of the generally columnar sealing member can be configured to be coupled with a receiving element of a housing, the housing comprising a radial passageway configured to communicate a bodily fluid in a direction perpendicular to the aperture at the distal end of the generally columnar sealing member such that the fluidic sealing agent is in fluidic communication with the bodily fluid. As such, in some embodiments, coupling the portion of the generally columnar engaging elements with the receiving element of the housing can form an adhesive-free interface therebetween. In some embodiments, the one or more engaging elements can be positioned near the distal end of the generally columnar sealing member. In some embodiments, the pressure reading assembly can include a generally columnar receiving collar coupled to the substrate and positioned about the sensor. In some embodiments, at least a portion of the generally columnar sealing member can be configured to be slideably disposed about at least a portion of the generally columnar receiving collar. In some embodiments, slideably disposing at least the portion of the generally columnar sealing member about at least the portion of the generally columnar receiving collar forms an adhesive-free interface therebetween.

According to another embodiments of the present disclosure, a method for using a sensing apparatus, such as a pressure reading assembly, can include, at least, providing a sensing apparatus including at least a sensor disposed on a substrate and an engagement member connected to the substrate about the sensor. In some embodiments, the engagement member can include a generally columnar sealing member configured to engage an inner cylindrical surface of a receiving tube. In some embodiments, the generally columnar sealing member can define an axial bore extending from a proximal end to a distal end. In some embodiments, the generally columnar sealing member can be configured to receive one or more media in the axial bore. As such, in some embodiments, the sensor can be configured to detect a force applied to the media at or proximate the distal end. In some embodiments, the generally columnar sealing member can include an outer sealing surface defining one or more engaging elements extending circumferentially about a diameter of the generally columnar sealing member. In some embodiments, the one or more engaging elements can be configured to engage the inner cylindrical surface of the receiving tube to resist removal of the sensor during operation. In some embodiments, the one or more engaging elements can be configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end. In some embodiments, the method can further include communicating a volume of a media into the axial bore defined by the generally columnar sealing member. In some embodiments, the method can further include slideably disposing at least a portion of the engagement member into a receiving tube of a housing such that the media is placed in fluidic contact with a bodily fluid being communicated through a radial passageway defined within the housing.

BRIEF DESCRIPTION OF THE DRAWINGS

The description of the embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4A illustrates a perspective view of a housing, in accordance with some example embodiments described herein;

FIG. 4D illustrates a side view of the housing of FIG. 4A;

DETAILED DESCRIPTION

Figure 1:
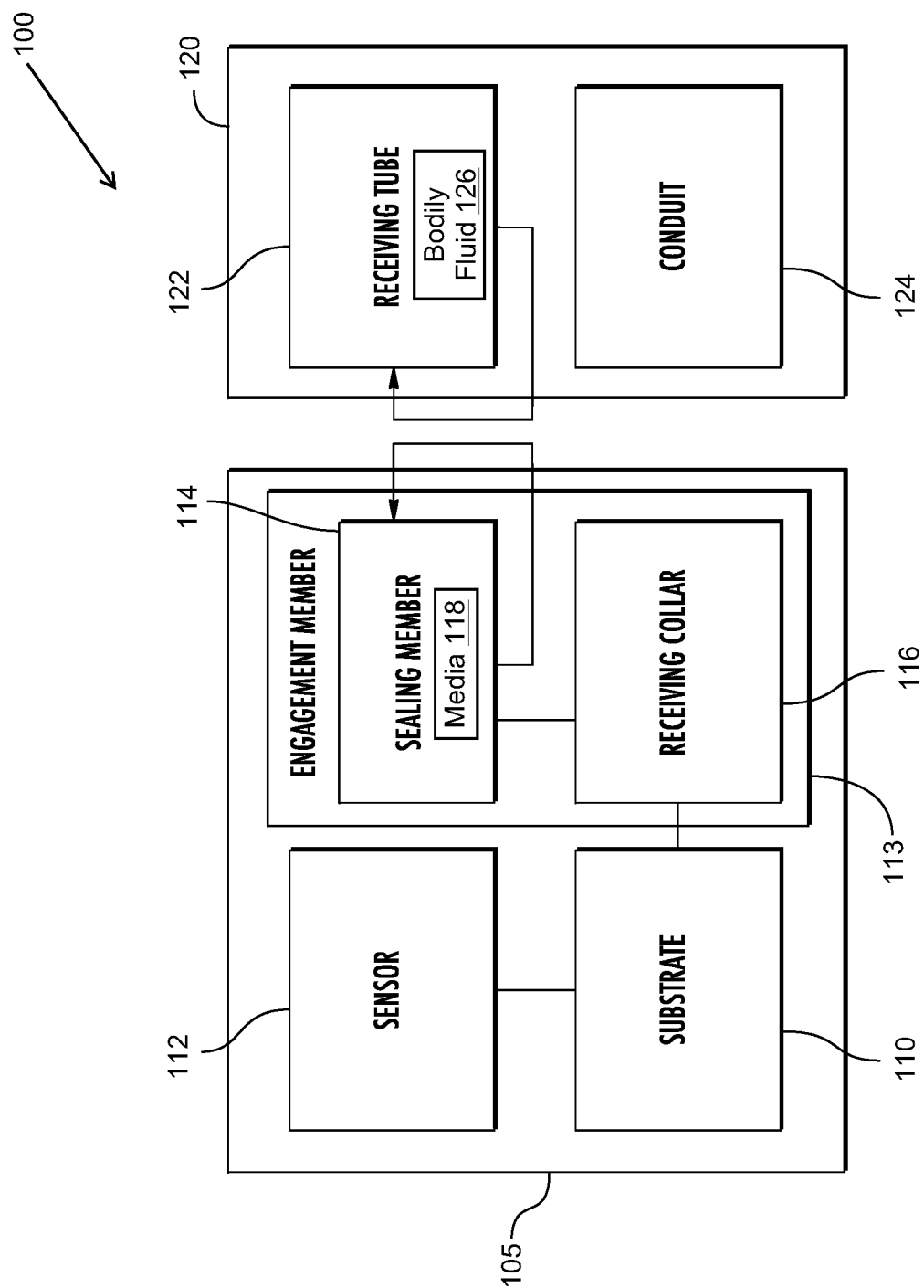
FIG. 1 illustrates a block diagram of a pressure sensor system, in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting in so far as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

To reduce the cost of producing a sensor assembly and to avoid the need for complex sterilization procedures, various example embodiments disclosed herein may relate to single-use (i.e., disposable) sensor assemblies, and in some embodiments, to healthcare sensors. In such embodiments, the sensor assembly may include two or more elements joined together to form the sensor assembly, and there is a need for a sensor assembly that may be manufactured to join the two or more elements quickly, efficiently, and securely. Various example embodiments described herein relate to seals (e.g., radial seals) that facilitate engagement of a sensor assembly with a receiving tube of a housing to improve manufacturability while also withstanding the loads required of a pressure sensor. Separate sealing devices such as an O-ring may be insufficient to provide both a seal and secure attachment under the expected loading conditions of, for example, a healthcare sensor, and embodiments of the seals disclosed herein overcome these deficiencies.

In some embodiments discussed herein, a sensor may be mounted to a substrate for detecting a force. The sensor and substrate may be engaged with a fluid conduit to measure the pressure therein. The sensor and substrate may be connected to the conduit via an engagement member that engages the housing of the conduit. The engagement member can define, at least in part, an axial bore aligned between a proximal portion of the engagement member and a distal portion of the engagement member. In some embodiments, the axial bore can at least partially define an inner volume. In some embodiments, a media, such as a silicone-containing gel, room temperature vulcanizing rubber, and/or the like, can be disposed within the axial bore. In some embodiments, the media can be disposed within the axial bore such that at least a portion of the media extends through an aperture defined at a distal end of the engagement member, e.g., as a convexity, a meniscus, or the like. According to some example embodiments, an engagement member that facilitates the sliding disposal of at least a portion of the engagement member into the receiving tube to fluidically couple the media in the axial bore with a bodily fluid in the housing is described. In some embodiments, the housing can include a passageway configured to retain and communicate bodily fluids therethrough. In some embodiments, the passageway can be positioned such that, after slideably disposing at least the portion of the engagement member into the receiving tube of the housing, the media is placed in fluidic communication with a flow of fluid (e.g., bodily fluid) being communicated through the passageway. In some embodiments, the bodily fluid can have a pressure or a pressure range that can exert hydraulic pressure on the media, the media being operably coupled to a sensor disposed via the axial bore of the sensor assembly and configured to measure an exerted hydraulic pressure, and the media prevents direct contamination of the sensor by the fluid. As such, the engagement member can form a seal suitable to prevent or substantially prevent leaks of the media from the axial bore, and/or to prevent or substantially prevent leaks of the bodily fluid from the housing.

Example Systems and Methods for Implementing Embodiments of the Present Invention FIG. 1 depicts a block diagram of a sensing apparatus 100 such as a pressure reading assembly, the sensing apparatus 100 comprising a sensor assembly 105 comprising a sensor 112 disposed on a substrate 110. In some embodiments, the sensor assembly 105 can include an engagement member 113, which may include a sealing member 114 and, optionally, a receiving collar 116. In some embodiments, the substrate 110 can be configured to receive the engagement member 113. In some embodiments, the receiving collar 116 may be coupled to the substrate 110 and configured to receive the sealing member 114. In some embodiments, the receiving collar 116 can be coupled to the substrate 110 about the sensor 112. In some embodiments, the engagement member 113 can comprise a generally columnar sealing member 114 configured to engage or partially engage one or more other components of the pressure reading assembly 100 to secure the sensor assembly 105 in place during normal operation of the pressure reading assembly 100. In some embodiments, the pressure reading assembly 100 can further comprise a housing 120 comprising a receiving tube 122 configured to receive at least a portion of the engagement member 113 (e.g., the sealing member 114) and a conduit 124 configured to allow a flow a flow of a fluid therethrough. In some embodiments, the generally columnar sealing member 114 can be configured to engage at least a portion or component of the housing 120 and/or at least a portion of the receiving collar 116. In some embodiments, the housing 120 can include a casing or other such structure dimensioned and configured to define a receiving tube 122. In some embodiments, the receiving tube 122 can be at least partially defined by an inner cylindrical surface. In some embodiments, the engagement member 113 can be or include the generally columnar sealing member 114. In some embodiments, the engagement member 113 can define an axial bore (not shown) extending from a proximal end of the engagement member 113 to a distal end of the engagement member 113. In some embodiments, the sealing member 114 and/or the receiving collar 116 may define axial bores that collectively define the bore of the engagement member. In some embodiments, coupling the engagement member 113 with the receiving tube 122 of the housing 120 can place the sensor 112 in operable communication with a bodily fluid 126 disposed within a conduit 124 of the housing 120. In some embodiments, including any embodiment described herein, the receiving collar 116 may be stiffer and more rigid than the sealing member 114 to allow compression of the sealing member 114 between the inner cylindrical surface of the receiving tube and the rigid collar.

In some embodiments, the engagement member 113 can be configured to receive one or more media 118 in the axial bore. In some embodiments, disposing the one or more media 118 in the axial bore of the engagement member 113 can place the sensor 112 in direct fluidic communication with the one or more media 118. In some embodiments, coupling the engagement member 113 with the receiving tube 122 of the housing 120 can place the one or more media 118 in fluidic communication with a bodily fluid 126 disposed within a conduit 124 of the housing 120 (e.g., via an opening in the wall of the conduit, such that the media abuts the flow path of the fluid from an orthogonal angle). In some embodiments, by placing the sensor 112 in fluidic communication with the one or more media 118 and the one or more media 118 in fluidic communication with the bodily fluid 126, the sensor 112 can be indirectly in fluidic communication and/or operable communication with the bodily fluid 126. In some embodiments, the sensor 112 is configured to detect a force applied to the media 118 at or proximate the distal end of the engagement member 113. In some embodiments, the bodily fluid 126 flowing through and/or disposed within the conduit 124 can exert a hydraulic pressure on the one or more media 118 such that the one or more media 118 in turn exert the same or a substantially similar hydraulic pressure on the sensor 112, the sensor 112 configured to measure and/or calculate the hydraulic pressure exerted by any suitable means and using any suitable combination of devices or components, such as those known to one of skill in the art.

In some embodiments, the sealing member 114 can comprise an outer sealing surface defining one or more engaging elements extending circumferentially about an axis of the sealing member 114. In some embodiments, the one or more engaging elements can be configured to engage the inner cylindrical surface of the receiving tube 122 to resist removal of the sensor 112 and/or the sensor assembly 105 from being operably coupled to the bodily fluid 126 during operation. In some embodiments, the one or more engaging elements can be configured to cause an asymmetrical friction force against the inner cylindrical surface of the receiving tube 122 such that the friction force between the sealing member 114 and the inner cylindrical surface of the receiving tube 122 is greater during application of a force to the sealing member 114 in a removal direction defined from the distal end of the sealing member 114 towards the proximal end of the sealing member 114 than during application of the force to the sealing member 114 in an insertion direction defined from the proximal end towards the distal end. The frictional force in each direction may be based upon at least one of the material used, the shape of the engagement member 113 or a component thereof, the size of the sealing member 114 or a component thereof, or any other suitable characteristic.

In some embodiments, the one or more engaging elements can be dimensioned and configured to stand proud of an outer surface of the sealing member 114. In some embodiments, the one or more engaging elements can have an asymmetrical shape relative to the insertion direction to cause an asymmetrical frictional force (e.g., the sealing member may be easier to insert than to remove due to the structure of the one or more engaging elements). In some embodiments, at least one of the one or more engaging elements can include a proximal portion having an end portion forming a first angle opposite the generally columnar sealing member 114 (e.g., a reflex angle between a medial portion and a proximal portion of the sealing member 114). In some embodiments, the one or more engaging elements can further include a medial portion that is generally flat in an axial direction and rounded about the generally columnar sealing member 114 in a circumferential direction. In some embodiments, the one or more engaging elements can further include a distal portion having a tapered end portion that forms a second angle opposite the generally columnar sealing member 114 greater than the first angle (e.g., a reflex angle between the medial portion and distal portion of the sealing member 114). In some embodiments, the sealing member 114 can further include an inclined plane defined circumferentially about the aperture at the distal end of the sealing member 114.

In some further embodiments, the sealing member 114 may include a flange (e.g., flanges 2143, 5143, 6143, 7143, 8143 described herein) at the distal end that reduces the diameter of the opening at the distal end. In some embodiments, the flange at the distal end of the sealing member 114 can be coupled circumferentially within the opening or formed integrally with the sealing member 114. In some embodiments, the flange may at least partially entrain the media 118 within the axial bore and may reduce bubble formation along the surface of the media during operation. In some embodiments, the flange can include a coupling portion configured to be coupled to a portion of the sealing member 114. In some embodiments, the flange can further include a top surface and a bottom surface, collectively the top and bottom surfaces. In some embodiments, the top surface can have a slope defined by the angle of the top surface in a distal direction or a proximal direction relative to a distance from one of an outside surface or an inside surface of the flange. For instance, in some embodiments, the flange can be connected at an outside surface of the generally columnar sealing member 114 or another suitable component of the engagement member 113 and be angled in the distal direction relative to an inward radial direction (towards a center of the axial bore). As such, from the perspective of the distal end of the engagement member 113, such a flange would have at least a degree of convexity. Conversely, in some embodiments, the flange can be connected to the outside surface of the generally columnar sealing member 114 or another suitable component of the engagement member 113 and be angled in the proximal direction relative to the inward radial direction (towards the center of the axial bore). As such, the flange may be at least partially angled relative to a horizontal plane that is perpendicular to an axis of the axial bore. For example, in some embodiments, from the perspective of the distal end of the engagement member 113, the flange can be angled towards the distal end of the sealing member 114. In some embodiments, the flange may be flat or parallel to the horizontal plane.

In some embodiments, the shape, dimensions, surface characteristics, mechanical properties, and/or other characteristics of the flange can be at least partially controlled to change or improve the flow characteristics of a fluid (e.g., a bodily fluid) flowing past and in contact with the flange during use of the pressure reading assembly 100. Without wishing to be bound by any particular theory, the flange can be dimensioned and configured for a particular application or particular applications such that the fluid flowing past and in contact with the flange experiences substantially turbulent flow rather than laminar flow, which may reduce the likelihood that unwanted gas bubble formed in the conduit, such as above, about, or within the receiving tube, can be dislodged. For instance, the shapes formed at the interface between the fluid in the conduit 124 and the distal portion of the sealing member 114, the distal portion of the receiving collar 116, the receiving tube 122, and/or the conduit 124 can progressively encroach on the flow path of the fluid in the conduit 124 such that turbulence zones are created to prevent collection of and encourage the dislodgement of gas bubbles at or adjacent the sensor assembly and reduce dead space at or adjacent the sensor assembly. In some embodiments, one or more abrupt steps may be created by the flange and its interaction with the media and surrounding housing to create the turbulent flow areas. In some embodiments, the top surface of the flange and the bottom surface of the flange may be joined by an annular, circumferential surface extending about the inner diameter of the opening of the flange, which surface may be perpendicular to the top surface and/or bottom surface.

In some embodiments, the outer sealing surface of the sealing member 114 can be configured to form an adhesive-free interface with the inner cylindrical surface of the receiving tube. In some embodiments, the one or more engaging elements of the sealing member 114 can include at least two engaging elements spaced along the outer sealing surface of the sealing member 114. In some embodiments, the receiving collar 116 can be generally columnar. In some embodiments, the receiving collar 116 can be coupled to the substrate 110 and positioned about the sensor 112. In some embodiments, the sensor 112 can be any suitable device or apparatus, including but not limited to, a piezoelectric sensor, a pressure transducer, a pressure transmitter, a manometer, a pressure indicator, a pressure switch, a piezoresistive pressure sensor, a digital pressure sensor, a piezoresistive strain gauge, a capacitive sensor, a diaphragm capacitive sensor, an electromagnetic sensor, a vacuum pressure sensor, a differential pressure sensor, a sealed pressure sensor, a potentiometric resistive sensor, a resonant frequency sensor, variants and/or combinations of the same, or the like.

In some embodiments, at least a portion of the sealing member 114 can be configured to be disposed about at least a portion of the receiving collar 116. In some embodiments, the sealing member 114 can have an innermost diameter, relative to an axis from the distal end to the proximal end that is less than an outermost diameter of the receiving collar 116, such that the sealing member 114 is configured to stretch around the receiving collar 116 and be frictionally secured to the receiving collar 116. In some embodiments, the sealing member 114 can be fixed or secured to the receiving collar 116 using any suitable means, such as an adhesive, a glue, a paste, an epoxy, or the like.

In some embodiments, for example during insertion of the sealing member 114 into the receiving tube 122, the one or more engaging elements can be configured to exert a first force on the inner cylindrical surface of the receiving tube 116. In some embodiments, for example during removal of the sealing member 114 from the receiving tube 122, the one or more engaging elements can be configured to exert a second force greater than the first force on the inner cylindrical surface of the receiving tube 122. In some embodiments, by placing the sensor 112 in fluidic communication with the one or more media 118 and the one or more media 118 in fluidic communication with the bodily fluid 126, thereby placing the sensor 112 indirectly in fluidic communication and/or operable communication with the bodily fluid 126, the frictional force of the sealing member 114 within the receiving tube 122 can be greater than the hydraulic force exerted by the bodily fluid 126 on the one or more media 118. In other words, the frictional force achieved between the engagement member 113 and the receiving tube 122 can be greater than the force exerted by the bodily fluid 126 on the one or more media 118, such that the engagement member 113 can remain coupled with or within the receiving tube 122 and the sensor assembly 105 can remain in place during operation of the sensor assembly. As such, in some embodiments the sensor assembly 105 can be operably coupled to the housing 120 without the use of an adhesive between the sealing member 114 and the receiving tube 122. This can save the steps of applying an adhesive to one or both of the sealing member 114 and the receiving tube 122 and the curing of the adhesive to ensure the sealing member 114 and the receiving tube 122 remain slideably engaged during operation of the device.

Referring now to FIGS. 2A-2D, a receiving collar 216 for a sensor assembly (e.g., the sensor assembly 105) can include a distal portion 2160, a medial portion 2161, and a proximal portion 2162. In some embodiments, the receiving collar 216 can include an engaging element comprising an entire outer surface of the receiving collar 216. In some embodiments, the receiving collar 216 can be generally or substantially columnar in shape. In some embodiments, the receiving collar 216 can define an orifice at the distal portion 2160 and/or an orifice at the proximal portion 2162, thereby defining an axial bore 2164 through some or all of the receiving collar 216. In some embodiments, the receiving collar can be coupled to a substrate (e.g., the substrate 110) about a sensor (e.g., the sensor 112). In some embodiments, the distal portion 2160, the medial portion 2161, and/or the proximal portion 2162 can be aligned along an axis denoted in FIG. 2A by the hashed line A. In some embodiments, the distal portion 2160, the medial portion 2161, and/or the proximal portion 2162 can at least partially define an axial bore 2164 aligned parallel with the hashed line A. In some embodiments, the receiving collar 216 can include a coupling surface 2163 defined at the edge of the orifice in the distal portion 2160 of the receiving collar 216. In some embodiments, the proximal portion 2162 can be configured to abut, be coupled to, be fixed to, be adhered to, or integrally formed with a portion of the substrate 110. In some embodiments, the receiving collar 216 can engage with the substrate 110 such that the receiving collar 216 is disposed about the sensor 112. In some embodiments, the axial bore 2164 is at least partially defined by an inner cylindrical surface 2165 of the receiving collar 216. In some embodiments, the receiving collar 216 can be a portion of an engagement member (e.g., the engagement member 113), and may be dimensioned and configured for a sealing component thereof (e.g., the sealing member 114) to be disposed or partially disposed on or about the receiving collar 216. In some embodiments, the receiving collar 216 can be dimensioned and configured such that the sealing component remains disposed on or about the receiving collar 216 during normal operation of the pressure reading assembly (e.g., pressure reading assembly 100).

In some embodiments, the receiving collar 216 can further comprise the coupling surface 2163, which can be formed at or coupled to the proximal portion 2162 of the receiving collar 216. In some embodiments, the coupling surface 2163 can be dimensioned such that an aperture therethrough defines an opening at the proximal end 2162 of the receiving collar 216 that has an inner diameter that is smaller than the inner diameter of the inner cylindrical surface 2165 of the receiving collar 216. In some embodiments, the coupling surface 2163 at the proximal end 2162 of the receiving collar 216 can be coupled circumferentially within the opening or formed integrally with the receiving collar 216. In some embodiments, the coupling surface 2163 may at least partially support the media 118. In some embodiments, the coupling surface 2163 can further include a top surface and a bottom surface, collectively the top and bottom surfaces. In some embodiments, the top surface can have a slope defined by the angle of the top surface in a distal direction or a proximal direction relative to a distance from one of an outside surface or an inside surface of the coupling surface 2163. For instance, in some embodiments, the coupling surface 2163 can be connected at an outside surface of the receiving collar 216 or another suitable component of the engagement member 113 and be angled in the proximal direction relative to an inward radial direction (towards a center of the axial bore). As such, from the perspective of the distal end of the engagement member 113, the coupling surface 2163 may have at least a degree of concavity. As such, from the perspective of the distal end of the engagement member 113, the coupling surface 2163 may have at least a degree of concavity. It is also possible that, in some embodiments, some or all of the top surface of the coupling surface 2163 could be flat and/or horizontal. In some embodiments, the coupling surface 2163 may provide a larger surface to couple the receiving collar 216 with the substrate (described herein). In some embodiments, the receiving collar 216 may be cylindrical at the proximal end without a coupling surface. In some example embodiments, the receiving collar 216 may define an inner diameter of about 1.85 mm and may define an outer diameter of about 2.35 mm. For instance, in some embodiments, the inner diameter of the receiving collar 216 can be between about 1 mm and about 3 mm, about 1.25 mm and about 2.75 mm, about 1.5 mm and about 2.5 mm, about 1.75 mm and about 2.25 mm, about 1 mm and about 3 mm, about 1.25 mm and about 2.75 mm, about 1.5 mm and about 2 mm, about 1.5 mm and about 2.75 mm, about 1.75 mm and about 2.25 mm, or about 1.75 mm and about 2 mm, inclusive of all values and ranges therebetween. In some embodiments, the inner diameter of the receiving collar 216 can be greater than about 1 mm, 1.25 mm, 1.5 mm, 1.75 mm, 2 mm, 2.25 mm, 2.5 mm, 2.75 mm, or 3 mm, inclusive of all values and ranges therebetween. In some embodiments, the inner diameter of the receiving collar 216 can be less than about 3 mm, 2.75 mm, 2.5 mm, 2.25 mm, 2 mm, 1.75 mm, 1.5 mm, 1.25 mm, or 1 mm, inclusive of all values and ranges therebetween. In some embodiments, the outer diameter of the receiving collar 216 can be between about 1.5 mm and about 3.5 mm, about 1.75 mm and about 3.25 mm, about 2 mm and about 3 mm, about 1.75 mm and about 2.75 mm, about 2 mm and about 2.75 mm, about 2.25 mm and about 2.75 mm, about 2 mm and about 2.75 mm, about 2 mm and about 2.5 mm, about 2.25 mm and about 2.75 mm, or about 2.25 mm and about 2.5 mm, inclusive of all values and ranges therebetween. In some embodiments, the outer diameter of the receiving collar 216 can be greater than about 1.5 mm, 1.75 mm, 2 mm, 2.25 mm, 2.5 mm, 2.75 mm, 3 mm, 3.25 mm, 3.5 mm, 3.75 mm, or 4 mm, inclusive of all values and ranges therebetween. In some embodiments, the outer diameter of the receiving collar 216 can be less than about 4 mm, 3.75 mm, 3.5 mm, 3.25 mm, 3 mm, 2.75 mm, 2.5 mm, 2.25 mm, 2 mm, 1.75 mm, or 1.5 mm, inclusive of all values and ranges therebetween. In some embodiments, the inner diameter of the receiving collar 216 can be between about 50% and about 99% of the outer diameter of the receiving collar 216, or between about 65% and about 90%, about 70% and about 85% about 70% and about 80% or about 75% and about 80%, inclusive of all values and ranges therebetween.

In some embodiments, a doming surface 2166 can be formed circumferentially at the distal end of the axial bore 2164 of the receiving collar 216. In some embodiments, the doming surface 2166 can be formed as a transition between the inner diameter of the inner surface 2165 of the receiving collar 216 and the distal end 2160 (e.g., a chamfer to a flat, horizontal distal surface). In some embodiments, the doming surface 2166 can be formed by adding or subtracting material from the receiving collar 216, which can be the same or a different from the material or materials from which the receiving collar 216 is formed.

In some embodiments, the receiving collar 216 can be configured to facilitate an appropriate or suitable interfacial interaction between the media (such as media 118) and the receiving collar 216. In some embodiments, the receiving collar 216 can be coupled to the substrate (e.g., 110) via the coupling surface 2163, such that the axial bore 2164 and the portion of the substrate within the axial bore 2164 of the receiving collar 216 can define an inner cavity that can be filled, substantially filled, or partially filled with the media. In some embodiments, sufficient volume of the media can be disposed within the inner cavity (within the axial bore 2164) of the receiving collar 216 such that the media extends beyond the distal end 2160 of the receiving collar 216. In some embodiments, the media may form a convexity (e.g., dome) at or near or partially beyond the distal end 2160 of the receiving collar 216 such that an appropriate profile is formed between the media and the fluid in the conduit. In some embodiments, the doming surface 2166 can be formed such that when a sufficient volume of the media is disposed within the axial bore 2164 of the receiving collar 216, the media is disposed against at least a portion of the doming surface 2166 such that an appropriate convexity of the media is achieved beyond the distal end 2160 of the collar.

Figure 2A:
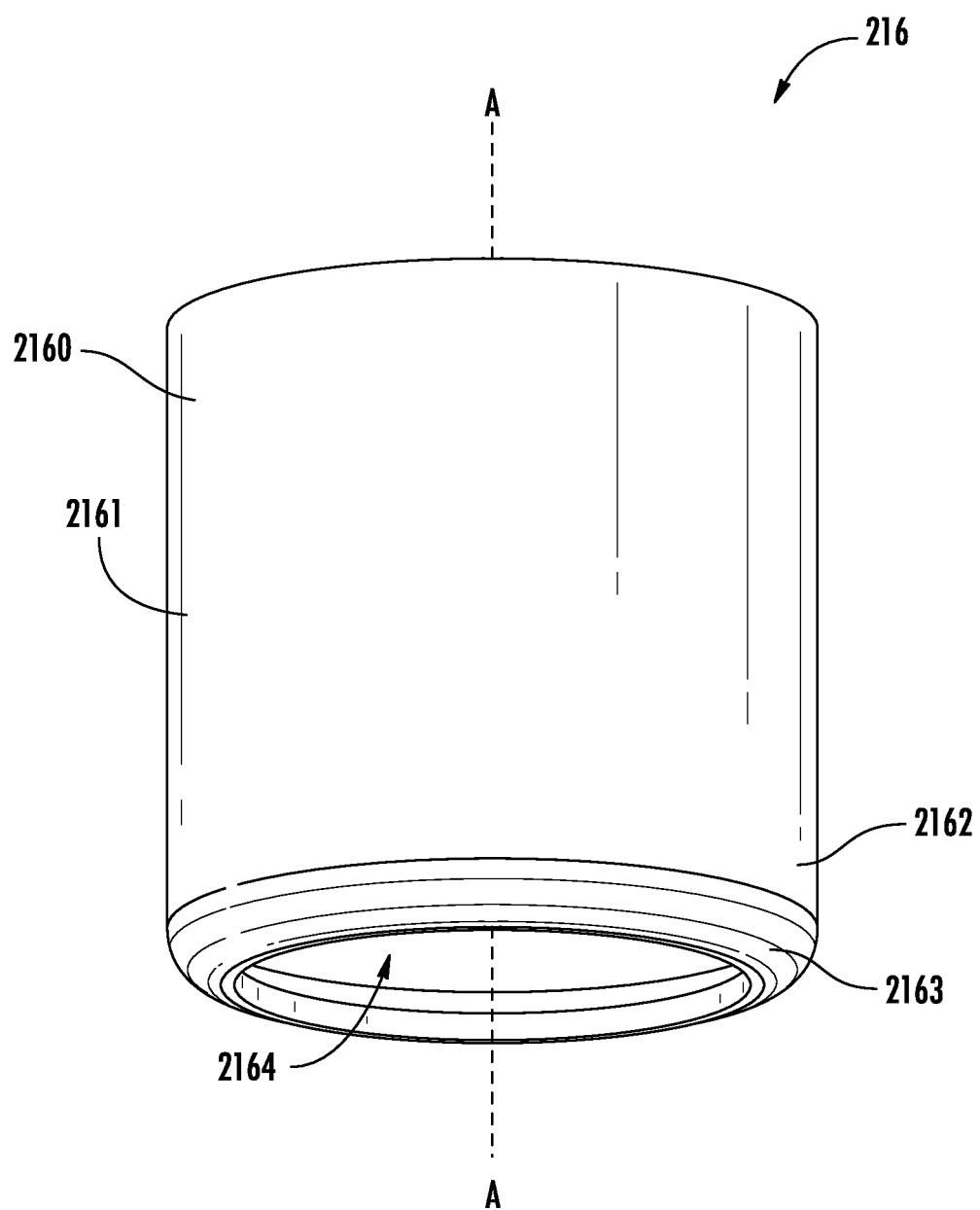
FIG. 2A illustrates a perspective view of a receiving collar, in accordance with some example embodiments described herein.
Figure 2B:
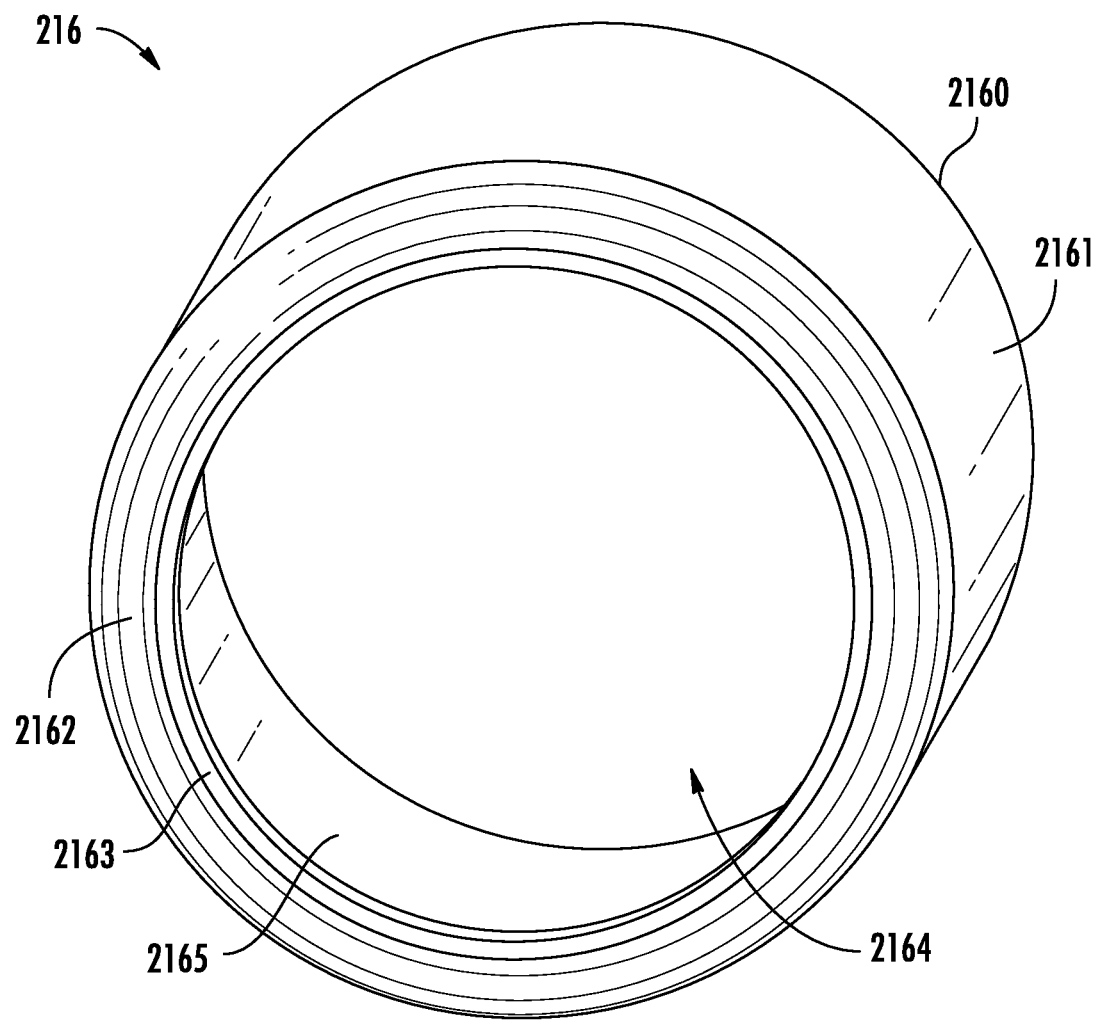
FIG. 2B illustrates a bottom view of the receiving collar of FIG. 2A.
Figure 2C:
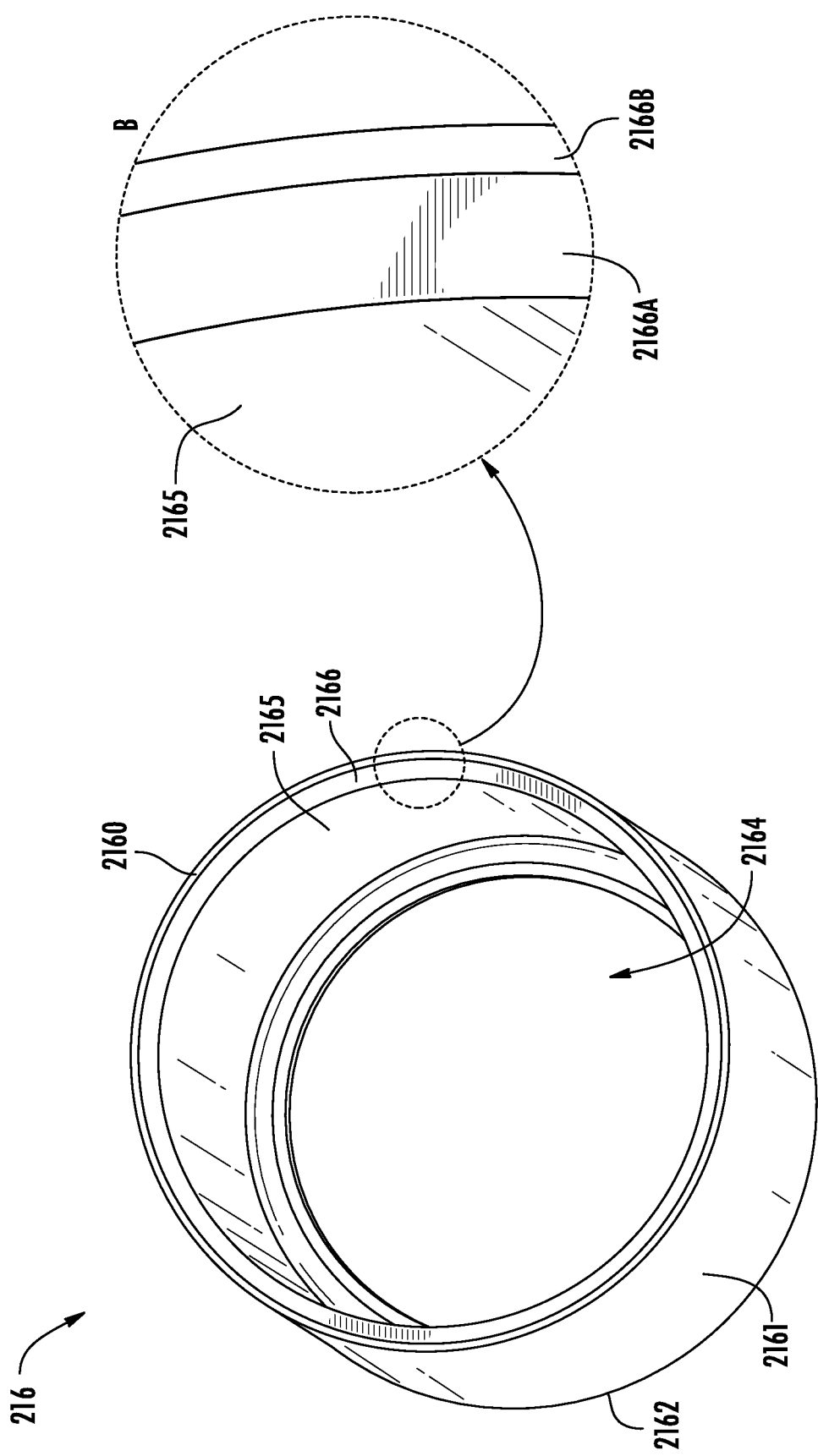
FIG. 2C illustrates a top view of the receiving collar of FIG. 2A.
Figure 2D:
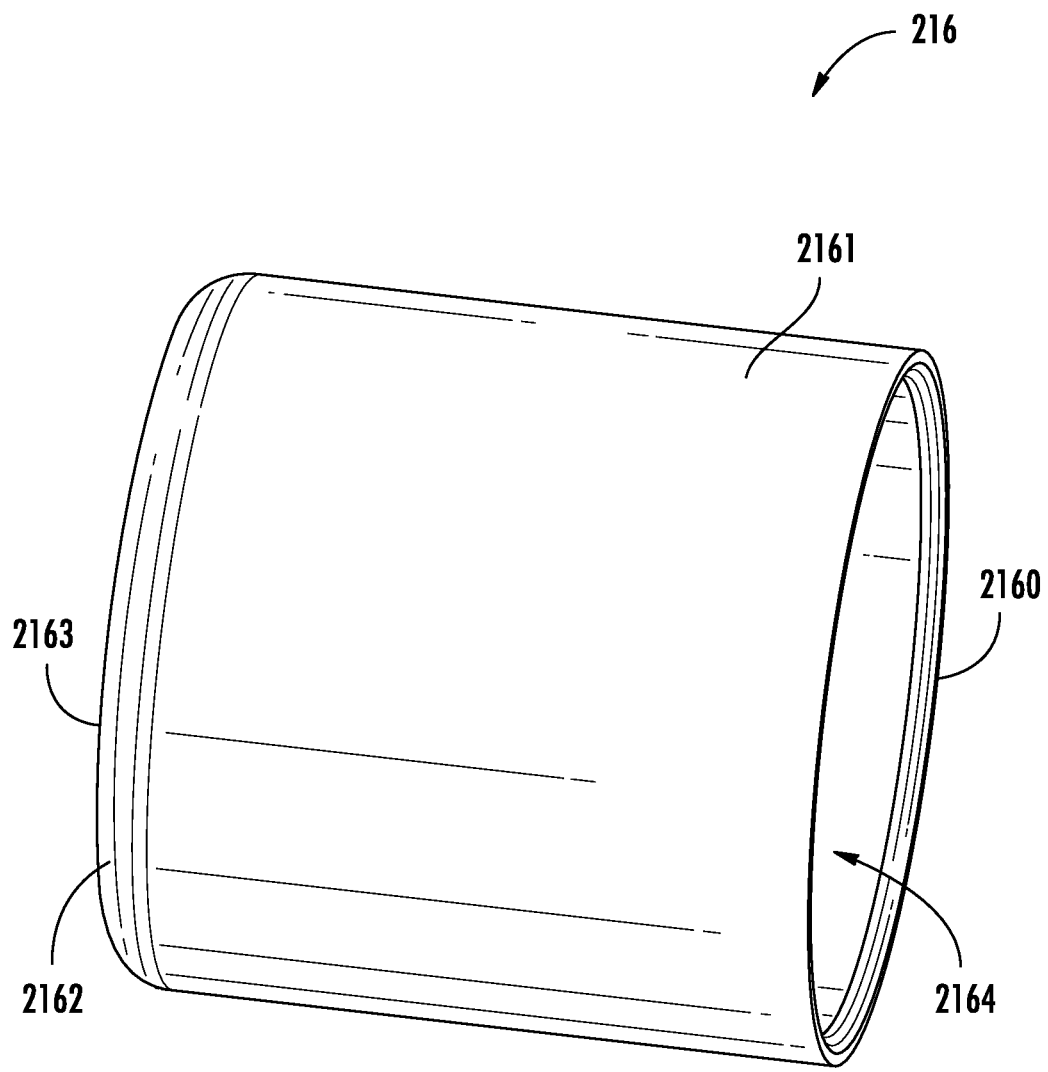
FIG. 2D illustrates a side view of the receiving collar of FIG. 2A.
Figure 3A:
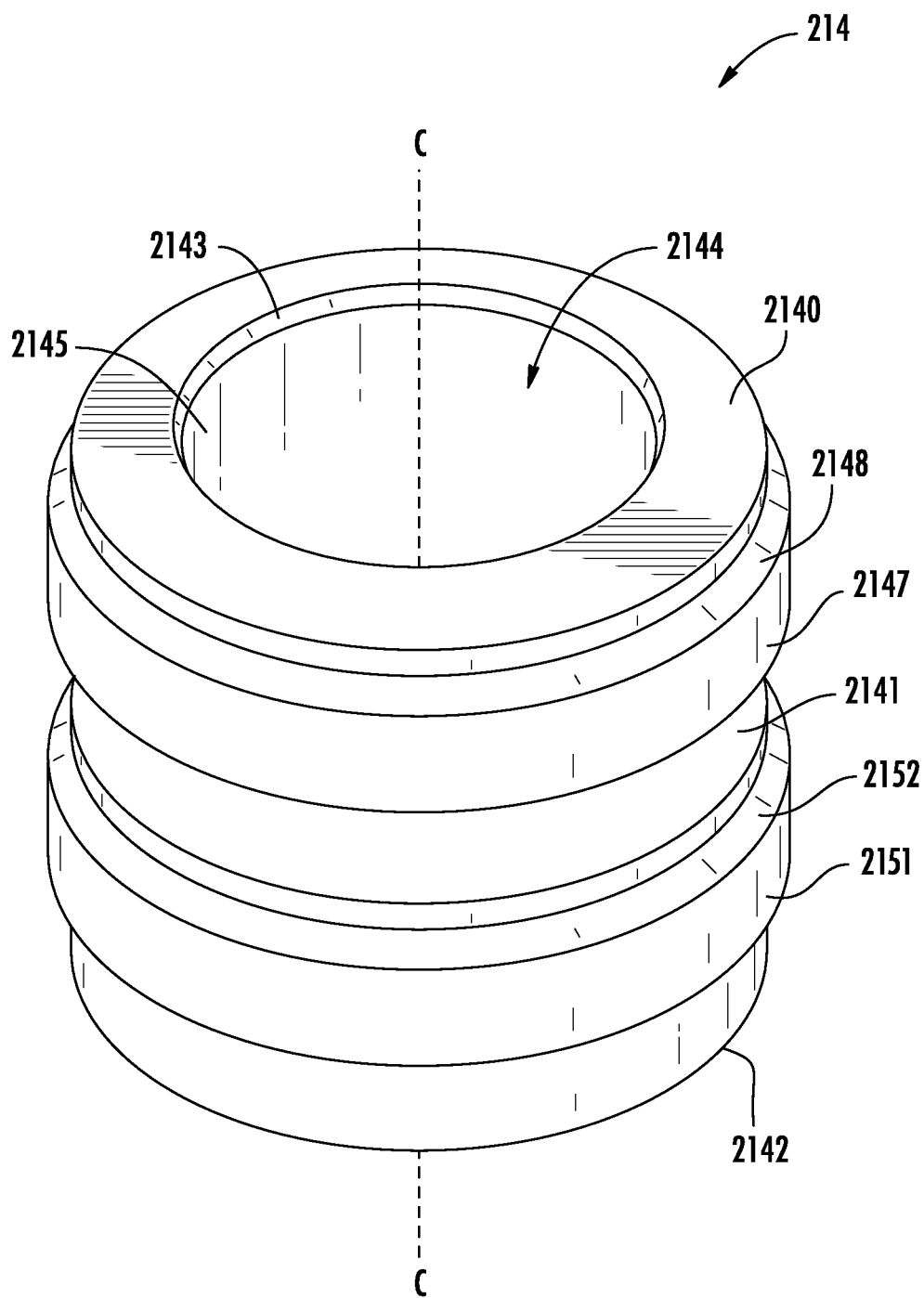
FIG. 3A illustrates a perspective view of a radial seal, in accordance with some example embodiments described herein.
Figure 3B:
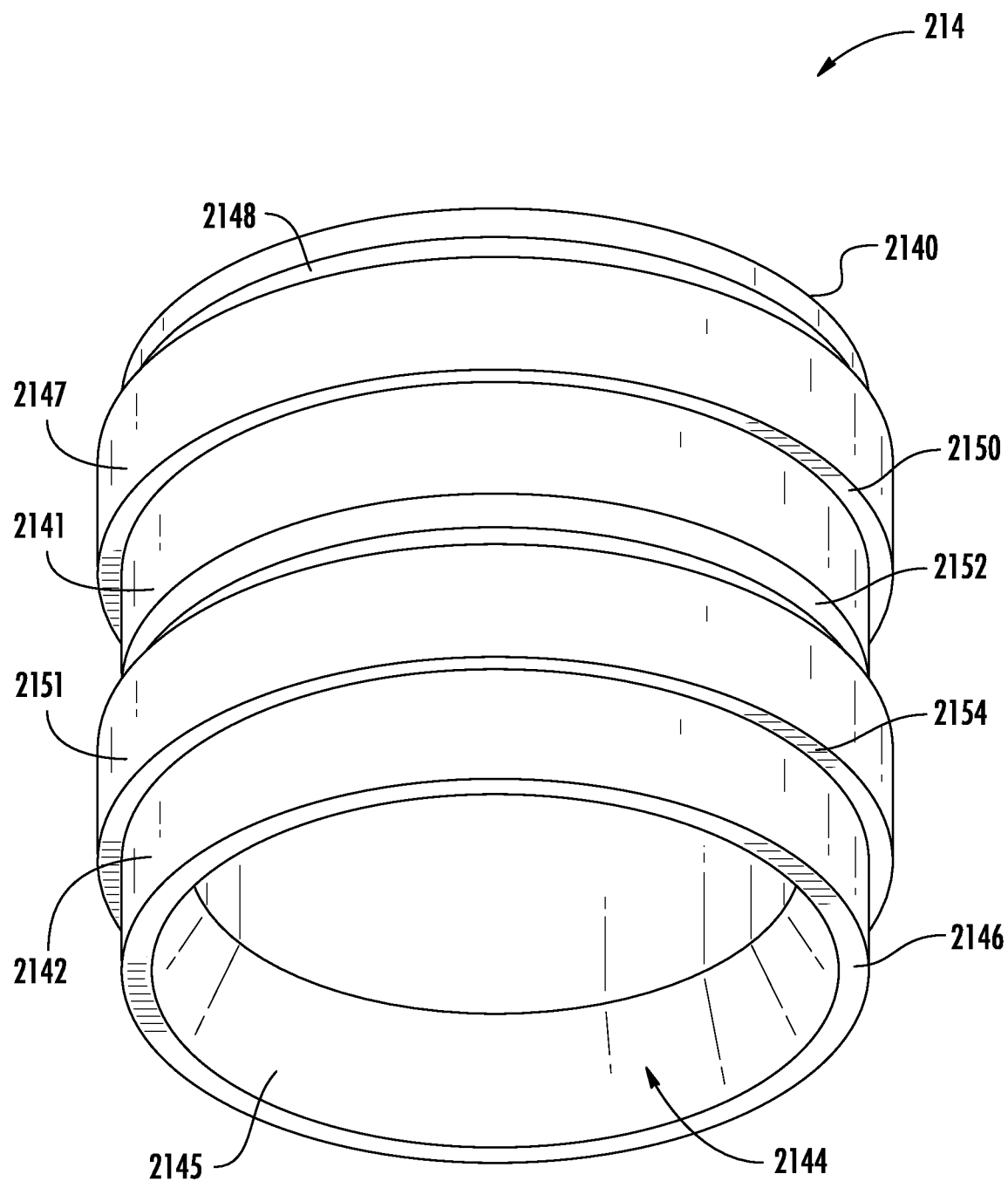
FIG. 3B illustrates a bottom perspective view of the radial seal of FIG. 3A.
Figure 3C:
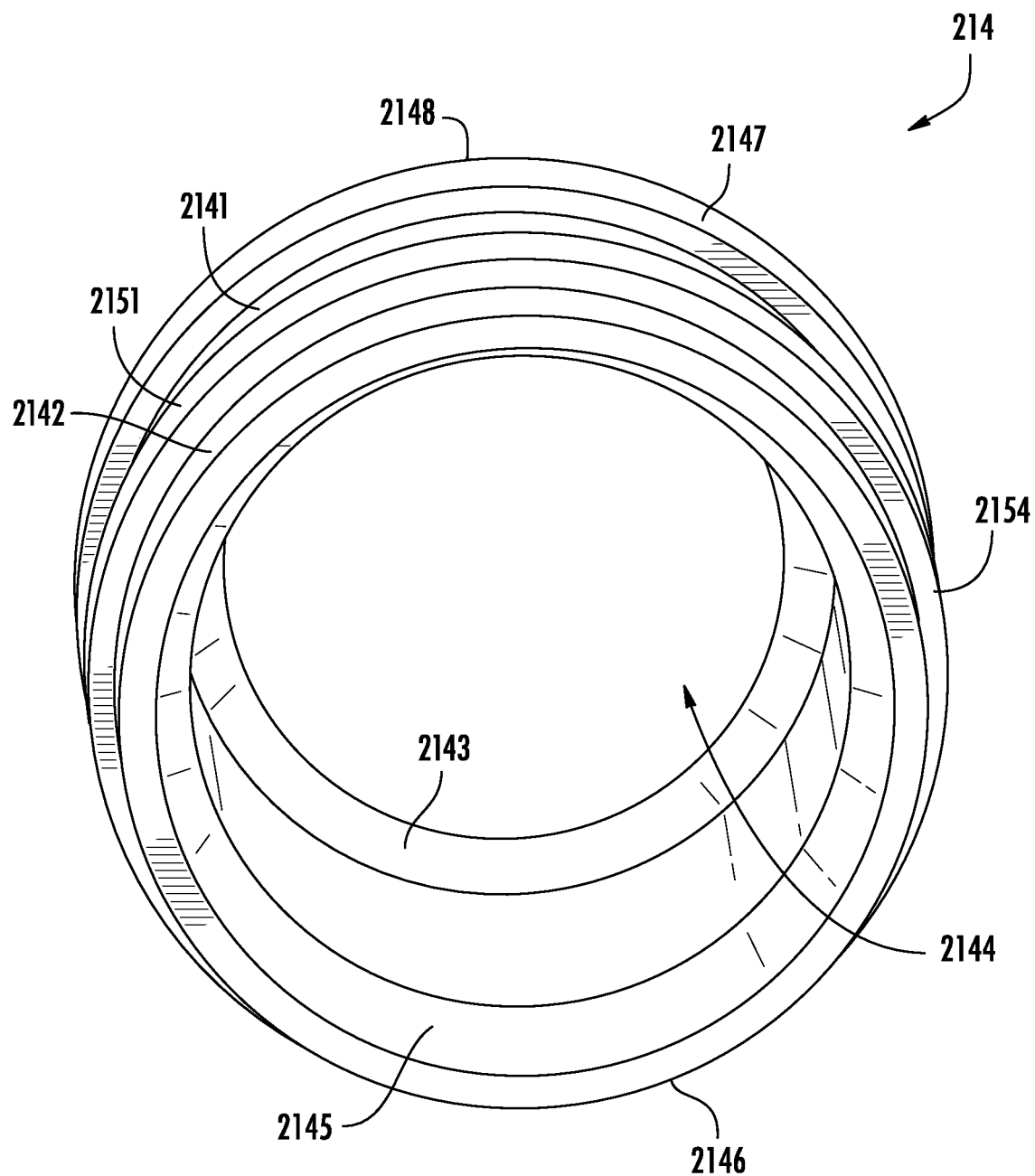
FIG. 3C illustrates a bottom view of the radial seal of FIG. 3A.
Figure 3D:
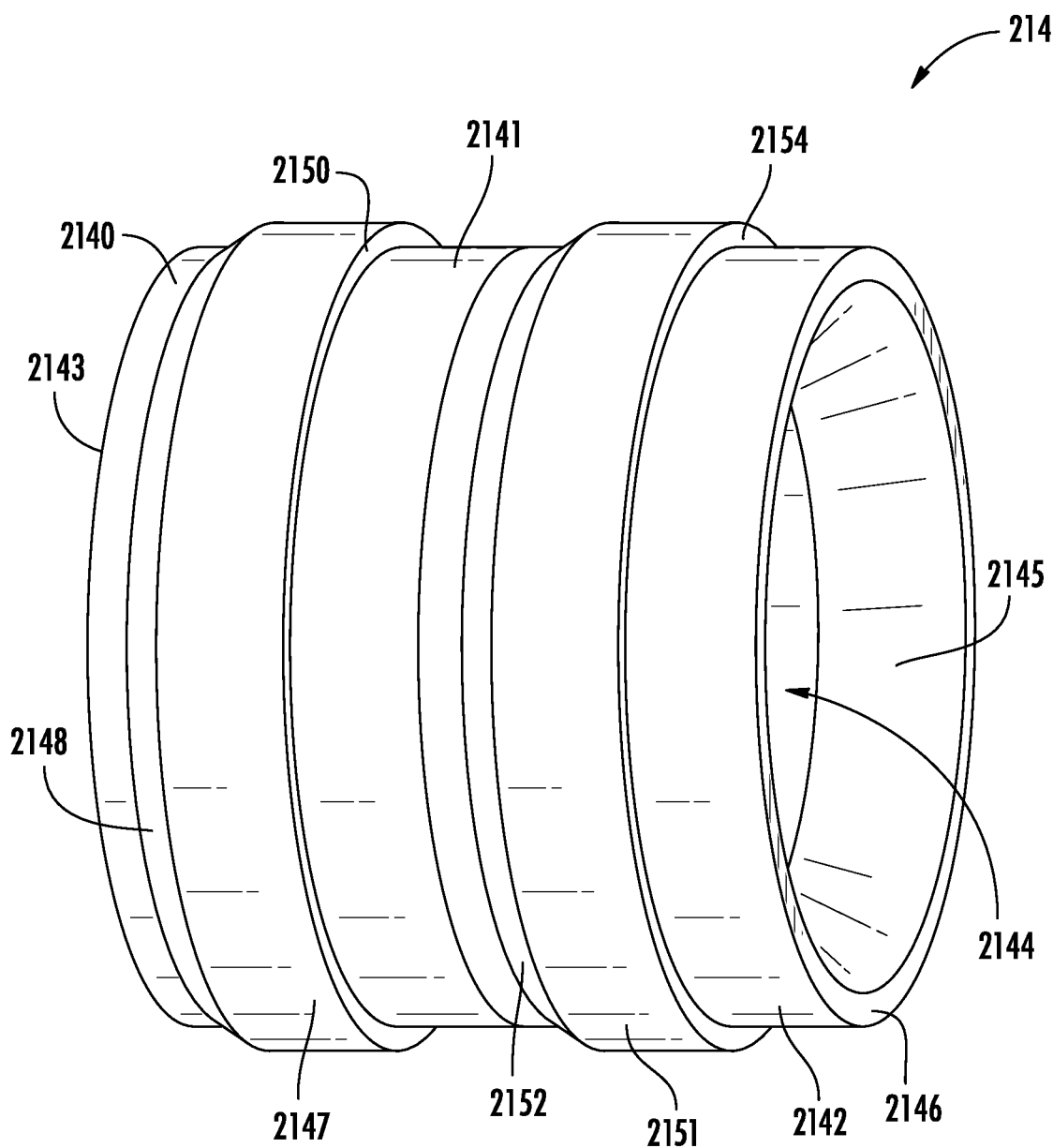
FIG. 3D illustrates a side view of the radial seal of FIG. 3A.
Figure 3E:
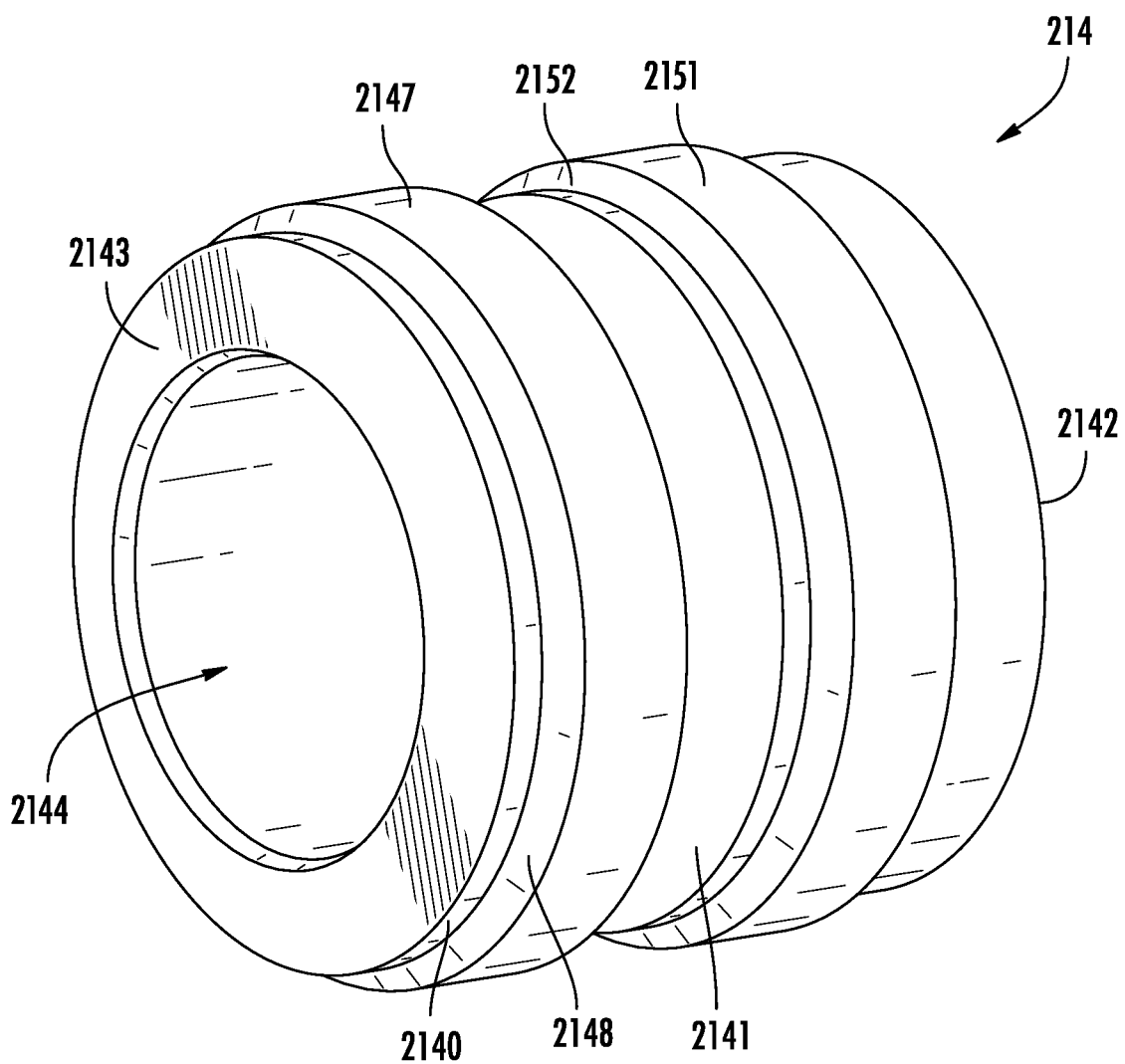
FIG. 3E illustrates a top perspective view of the radial seal of FIG. 3A.

In some embodiments, as shown in zoomed portion B of FIG. 2C, the doming surface 2166 may include a chamfered first surface 2166A and a horizontal second surface 2166B. For example, the doming surface 2166 can include a first surface 2166A forming reflex angle with the inner surface 2165. In some embodiments, the doming surface 2166 can include a second surface 2166B being substantially horizontal (e.g., parallel to a horizontal plane that is perpendicular to the axis of the axial bore) defining a second reflex angle with the first surface 2166A such that an inner diameter of the axial bore 2164 corresponding to the second surface 2166B is larger than the inner diameter of the remaining portions of the axial bore 2164, and the second surface 2166B is narrower than a thickness of the radial collar about the inner surface 2165. In some embodiments, the angle between the first surface 2166A and the second surface 2166B may be approximately 270 degrees. The abrupt transition between surfaces may force the media to build up as its cohesive force is stronger than its spreading force to produce a convex surface at the distal end of the media. In some embodiments, the doming surface 2166 can be particularly dimensioned and configured such that, when the media is disposed within the axial bore 2164 such that a convexity of the media protrudes beyond the distal end 2160 of the receiving collar 216, cohesive forces of the media are stronger than spreading forces of the media.

Referring now to FIGS. 3A-3E, an example sealing member 214 is illustrated for use with a sensor assembly (e.g., the sensor assembly 105), according to an embodiment of the present disclosure. In some embodiments, the sealing member 214 can engage with a substrate (e.g., the substrate 110) of the sensor assembly (e.g., coupled via a receiving collar 116). In some embodiments, the sealing member 214 can be particularly configured and dimensioned to be disposed about, partially disposed about, or disposed about part of a receiving collar such as the receiving collar discussed herein. In some embodiments, the sealing member 214 can be particularly configured and dimensioned such that, when the sealing member 214 is disposed about, partially disposed about, or disposed about part of the receiving collar, a diameter difference at the interface between the sealing member 214 and the receiving collar is sufficiently small so that the sealing member 214 is retained on the receiving collar during use of the sensor assembly.

In some embodiments, the sealing member 214 can include a distal portion 2140, a medial portion 2141, and a proximal portion 2142. In some embodiments, the sealing member 214 can define an orifice at the distal portion 2140 and an orifice at the proximal portion 2142. In some embodiments, the distal portion 2140, the medial portion 2141, and/or the proximal portion 2142 can be aligned along an axis denoted in FIG. 3A by hashed line C. In some embodiments, the distal portion 2140, the medial portion 2141, and/or the proximal portion 2142 can at least partially define an axial bore 2144 aligned parallel with the hashed line C. In some embodiments, the sealing member 214 can include a flange 2143 defined at the edge of the orifice in the distal portion 2140 of the sealing member 214. In some embodiments, the flange 2143 can be configured to cover at least a portion of the media disposed within the axial bore 2164/2144 such that the media is not disturbed, deformed, removed, or otherwise compromised during assembly and/or use of the apparatus. Further discussion of the flange 2143 is discussed below with regard to FIGS. 8-10.

In some embodiments, the proximal portion 2142 can be configured to abut and/or be engaged with a portion of the substrate, directly or indirectly. In some embodiments, the engagement member (e.g., at least similar to the engagement member 113), which may include the sealing member 214 and the receiving collar (e.g., at least similar to the receiving collar, can connect with the substrate such that the engagement member is disposed about a sensor (e.g., the sensor 112) disposed on the substrate. The axial bore 2144 may be at least partially defined by an inner cylindrical surface 2145. In some embodiments, the sealing member 214 can have a contacting surface 2145 at the proximal end (2146) of the sealing member 214, the contacting surface 2145 configured to engage with or be coupled to the substrate. In some embodiments, however, whether or not the sealing member 214 includes a contacting surface 2145, the sealing member 214 can be configured to only partially engage or be coupled to the substrate 110. In some embodiments, for example when the sealing member 214 is fully or substantially disposed about the receiving collar, the contacting surface 2145 may not be engaged with or coupled to the substrate 110 directly. In some embodiments, the proximal end 2146 of the sealing member 214 may include a ramped, inner surface for allowing the sealing member 214 to slide onto the receiving collar.

In some embodiments, the engagement member can be or include a generally columnar sealing member 214 configured to engage the receiving tube. In some embodiments, the sealing member 214 can include one or more surface features, such as a first and second engaging elements 2147, 2151 disposed on or integrally formed with an outer surface (e.g., the medial portion 2141) of the sealing member 214. In some embodiments, the sealing member 214 can include a first engaging element 2147 disposed on or formed integrally with an outer surface of the sealing member 214, in either event referred to as a portion of the outer surface. In some embodiments, the first engaging element 2147 can include an inclined surface 2148 positioned as a distal leading edge to the first engaging element 2147. In some embodiments, the first engaging element 2147 can include a medial surface 2149 which may act partially, primarily, or solely as a contact surface when the sealing member 214 is disposed within the receiving tube. In some embodiments, the sealing member 214 can further include a second engaging element 2151. In some embodiments, the second engaging element 2151 can be disposed on or formed integrally with the outer surface of the sealing member 214 proximal the first engaging element 2147. In some embodiments, the second engaging element 2151 can include an inclined surface 2152 positioned as a distal leading edge to the second engaging member 2151. In some embodiments, the second engaging element 2151 can include a medial surface 2153 which may act partially, primarily, or solely as a contact surface when the sealing member 214 is disposed within the receiving tube. In some embodiments, the sealing member 214 can include additional engaging elements or other such elements configured to fixably engage the inner cylindrical surface of the receiving tube. In some embodiments, the first engaging element 2147 can further include a proximal surface 2151. In some embodiments, the second engaging element 2151 can further include a proximal surface 2152.

In some embodiments, for the first engaging element 2147, the medial surface 2149 can be generally flat in an axial direction and extend about the generally columnar sealing member 214 in a circumferential direction. In some embodiments, the proximal surface 2150 can be generally adjacent the medial surface 2149 in a proximal direction and can extend about the generally columnar sealing member 214 in the circumferential direction. In some embodiments, an intersection of the medial surface 2149 and the proximal portion 2150 may define a first reflex angle. In some embodiments, the distal surface 2148 can be generally adjacent the medial surface 2149 in a distal direction and can extend about the generally columnar sealing member 214 in the circumferential direction. In some embodiments, an intersection of the medial surface 2149 and the distal surface 2148 may define a second reflex angle greater than the first reflex angle.

Additionally or alternatively, in some embodiments, the medial surface 2153 can be generally flat in an axial direction and extend about the generally columnar sealing member 214 in a circumferential direction. In some embodiments, the proximal surface 2154 can be generally adjacent the medial surface 2153 in a proximal direction and can extend about the generally columnar sealing member 214 in the circumferential direction. In some embodiments, an intersection of the medial surface 2153 and the proximal portion 2154 may define a first reflex angle. In some embodiments, the distal surface 2152 can be generally adjacent the medial surface 2153 in a distal direction and can extend about the generally columnar sealing member 214 in the circumferential direction. In some embodiments, an intersection of the medial surface 2153 and the distal surface 2152 may define a second reflex angle greater than the first reflex angle.

In some embodiments, the first engaging element 2147 and/or the second engaging element 2151 can be dimensioned and configured to extend circumferentially about a diameter of the sealing member 214. In some embodiments, the first engaging element 2147 and the second engaging element 2151 can be configured to engage the inner cylindrical surface of the receiving tube to resist removal of the sensor during operation. In some embodiments, the first engaging element 2147 and the second engaging element 2151 can be dimensioned and configured to cause an asymmetrical friction force against the inner cylindrical surface of the receiving tube such that the friction force between the sealing member 214 and the inner cylindrical surface of the receiving tube is greater during application of a force to the sealing member 214 in a removal direction defined from the distal end 2140 towards the proximal end 2142 than during application of the force to the sealing member 214 in an insertion direction defined from the proximal end 2142 towards the distal end 2140. In some embodiments, the sealing member 214 can be a generally columnar sealing member 214. In some embodiments, the sealing member 214 can include or define an outer sealing surface (such as some combination of the distal portion 2140, the medial portion 2141, and the proximal portion 2142 of the sealing member 214). In some embodiments, the outer sealing surface can include or defining one or more of the first engaging element 2147 and the second engaging element 2151 extending circumferentially about a diameter of the generally columnar sealing member 214, wherein the one or more engaging elements 2147, 2151 can be configured to engage the inner cylindrical surface of the receiving tube to resist removal of the sensor assembly during operation.

In some embodiments, one or more of the engaging elements 2147, 2151 can be configured to cause an asymmetrical friction force against the inner cylindrical surface of the receiving tube such that the friction force between the generally columnar sealing member 214 and the inner cylindrical surface is greater during application of a force to the generally columnar sealing member 214 in a removal direction defined from the distal end 2140 towards the proximal end 2142 than during application of the force to the generally columnar sealing member 214 in an insertion direction defined from the proximal end towards the distal end 2142. As discussed herein, the flange 2143 may cover a portion of the media to prevent the media from tearing during insertion into the housing (described herein). In some embodiments, the flange 2143 may further prevent or reduce bubble formation at the interface between the sensor assembly and the housing.

Referring now to FIGS. 4A-4E, a housing 220 of a pressure sensing system can include a sensor enclosure 221 defining a receiving tube 222. In some embodiments, the housing 220 can include a conduit 224 defining a passageway 226 through the conduit 224 in a direction aligned substantially with a center axis of the conduit 224, the center axis illustrated in FIG. 4A as hashed line D. In some embodiments, the passageway 226 can be configured to communicate fluids such as the bodily fluid 126 therethrough. The conduit 224 may include a conduit wall 225, defining an opening connecting the passageway 226 with the receiving tube 222. In some embodiments, the housing 220 can further include a first connector 220A and a second connector 220B configured to be slideably or rotatably engaged with a further tubing or a further conduit such that a fluid can be caused to flow through the passageway 226 of the conduit 224.

Figure 4B:
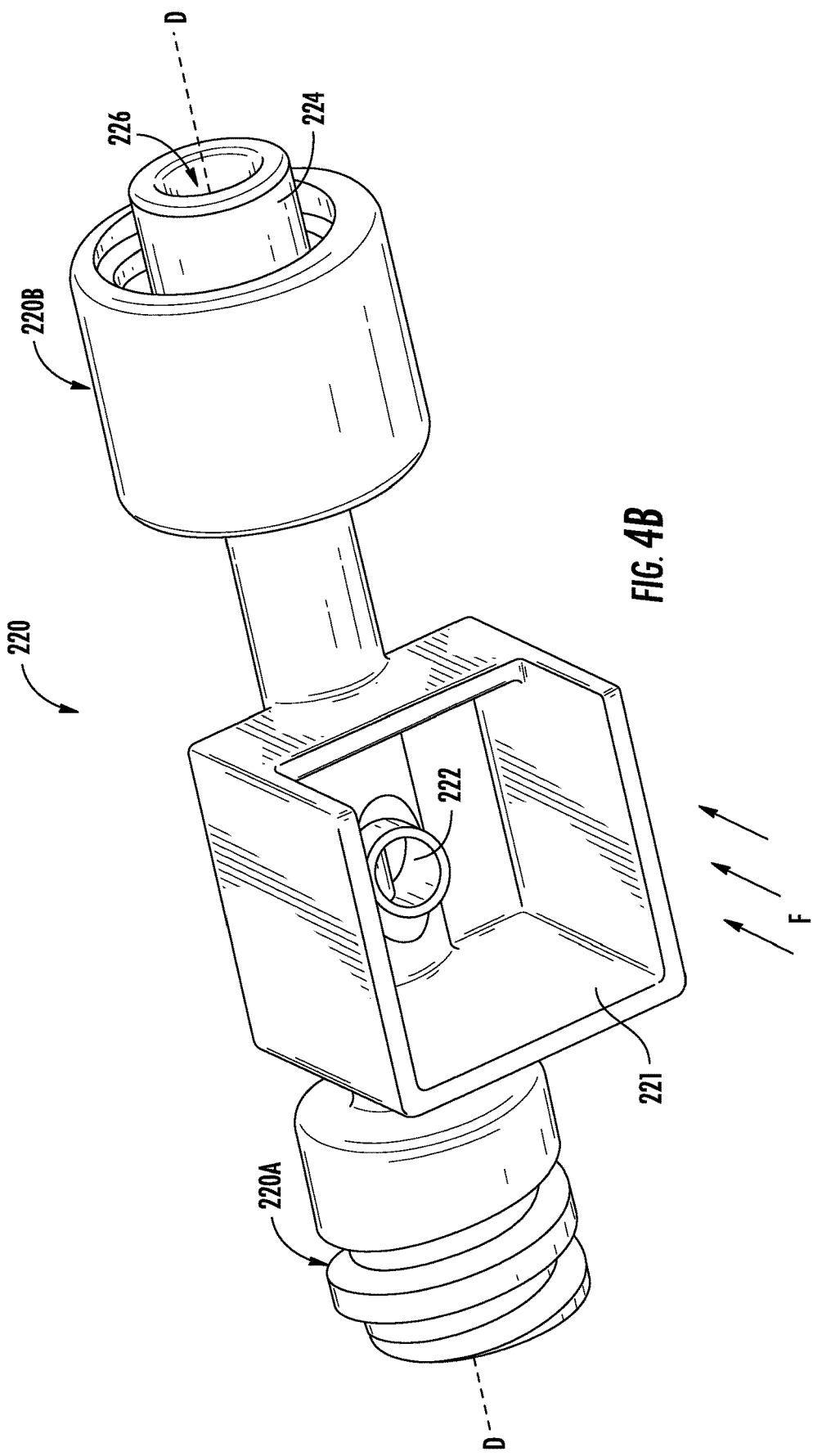
FIG. 4B illustrates a bottom perspective view of the housing of FIG. 4A.
Figure 4C:
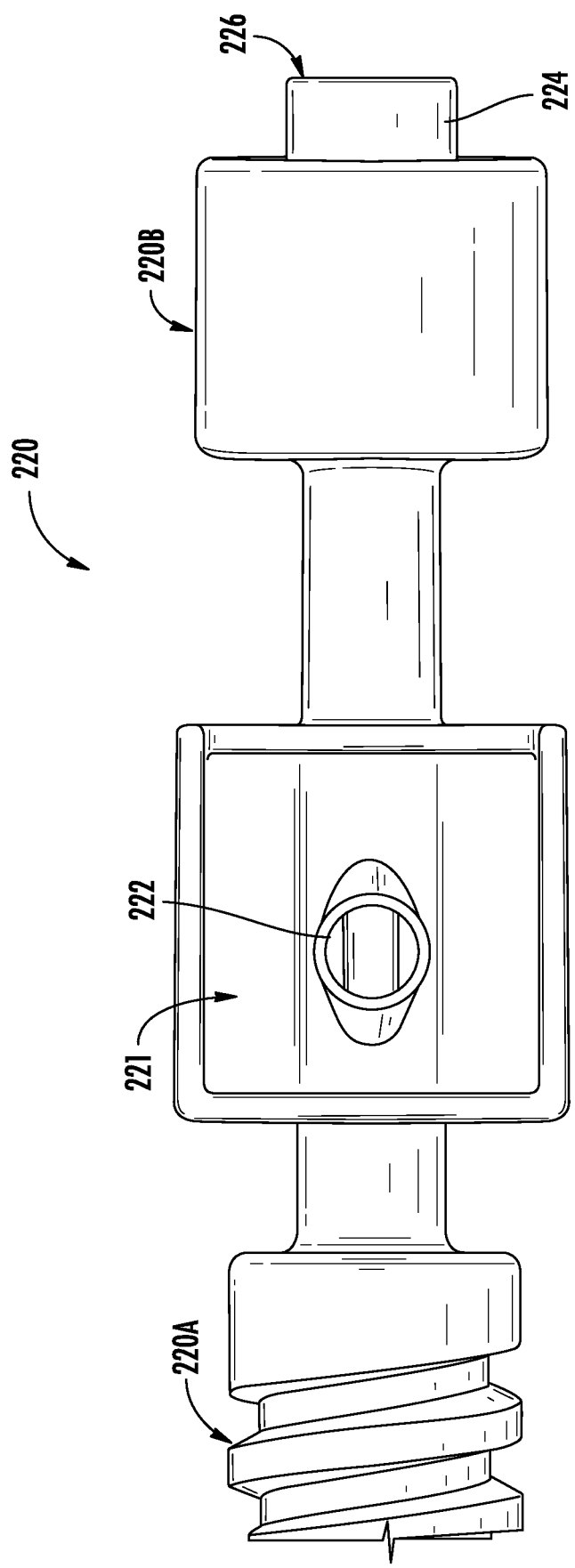
FIG. 4C illustrates a bottom view of the housing of FIG. 4A.
Figure 4E:
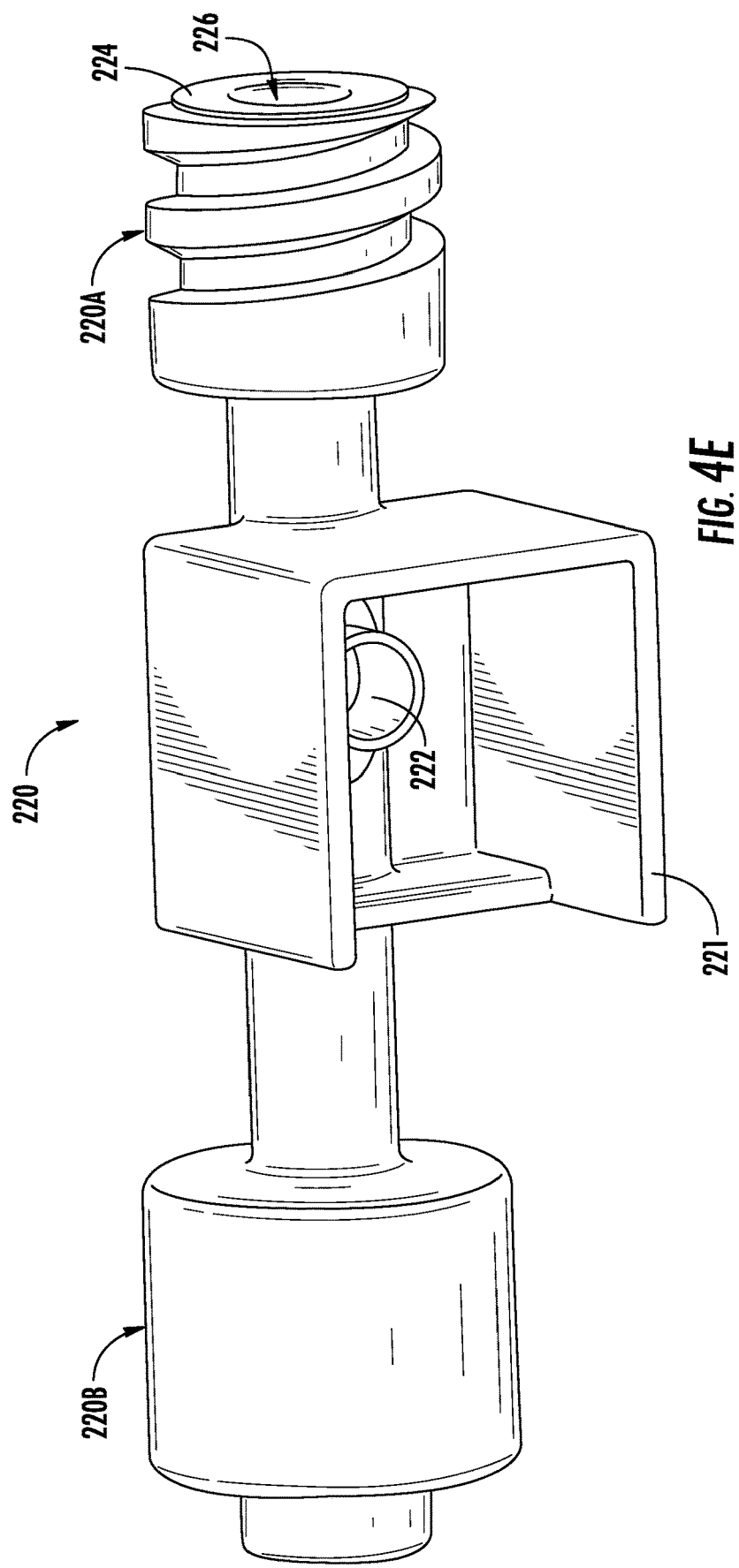
FIG. 4E illustrates a bottom perspective view of the housing of FIG. 4A.

In some embodiments, the receiving tube 222 can be configured such that a portion of a sensor assembly, such as the engagement member, can be slideably disposed therein. In some embodiments, the receiving tube 222 can be positioned or oriented perpendicular or substantially perpendicular to the center axis of the conduit 224, denoted by the hashed line D, such that fluid passes by the sensor assembly substantially tangential to the surface of the media. In some embodiments, the sealing member 214 can be disposed within, partially within, or part of the sealing member 214 can be disposed within the receiving tube 222 by aligning the distal portion 2140 with the receiving tube 222 and applying a insertion force F, as illustrated in FIG. 4B, in a direction perpendicular to the hashed line D of the conduit 224. In some embodiments, the sealing member 214 can define a center bore aligned substantially perpendicular to the hashed line D when the sealing member 214 is aligned with and/or disposed within the receiving tube 222. In some embodiments, one or more media 118, such as a gel or other suitable media, such as a silicone-containing gel, room temperature vulcanizing rubber, and/or the like, can be disposed within the center bore of the sealing member 214. In some embodiments, slideably disposing the sealing member 214 within the receiving tube 222 of the housing 220 may place the one or more media 118 in fluidic communication with the bodily fluid 126. In some embodiments, the bodily fluid 126 communicated through the passageway 226 of the conduit 224 can have a hydraulic pressure, which can be exerted upon and/or communicated to the one or more media 118, the sensor 112 being configured to sense, measure, or otherwise detect the hydraulic pressure exerted by the one or more media 118 upon the sensor.

As illustrated in FIG. 4D, the sealing member 214 and components of the sensor assembly can be slideably removed from the receiving tube 222 by applying or exerting a removal force F' greater than a frictional force exerted by the sealing member 214 on the inner cylindrical surface of the receiving tube 222. As such, during normal operation of the pressure reading system, the removal force F' can be provided by at least the hydraulic pressure of the bodily fluid 126 exerted upon the one or more media 118. In some embodiments, based upon the shape, size, position, material (s) used, and/or the like, the sealing member 214 can exert sufficient frictional force on the inner cylindrical surface of the receiving tube 222 such that the frictional force can be equal to or greater than the removal force F' required to remove the sealing member 214 from the receiving tube 222.

Figure 5A:
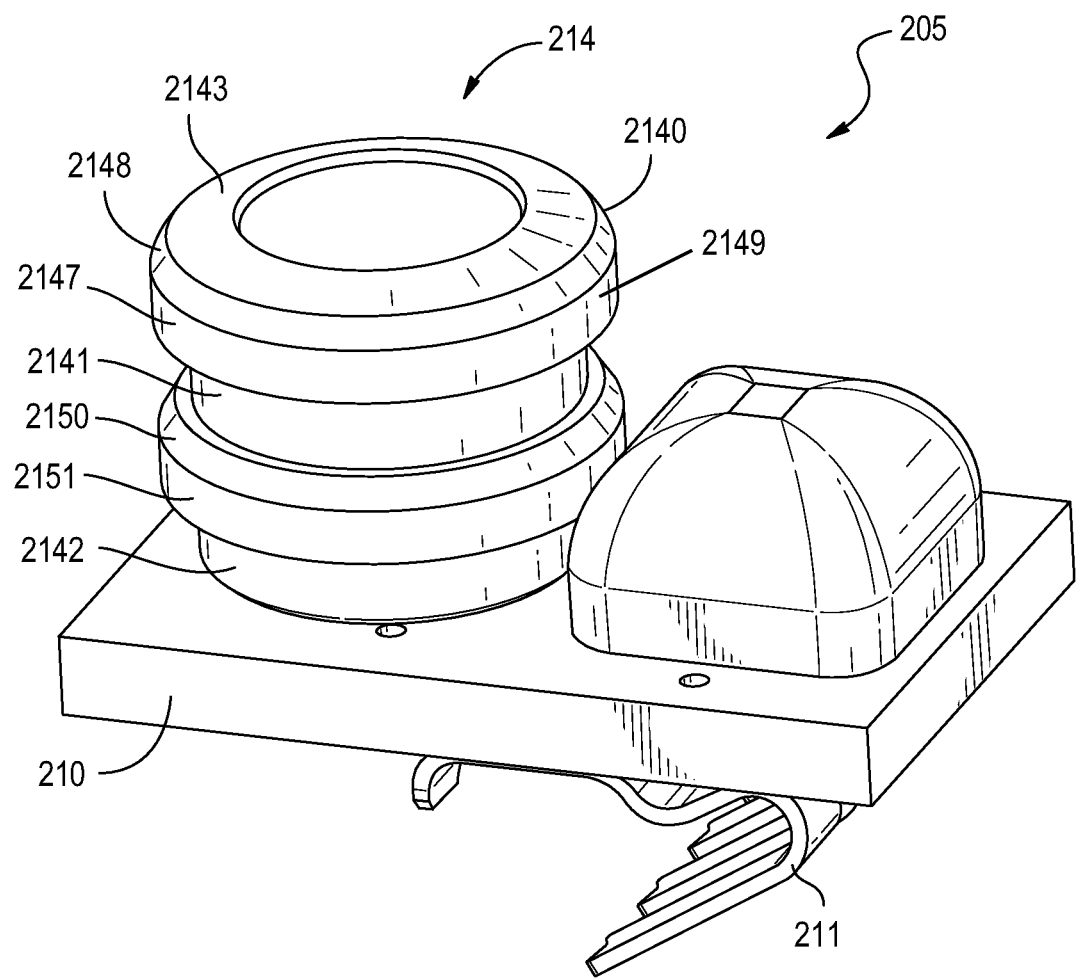
FIG. 5A illustrates a perspective view of a sensor assembly, in accordance with some example embodiments described herein.
Figure 5B:
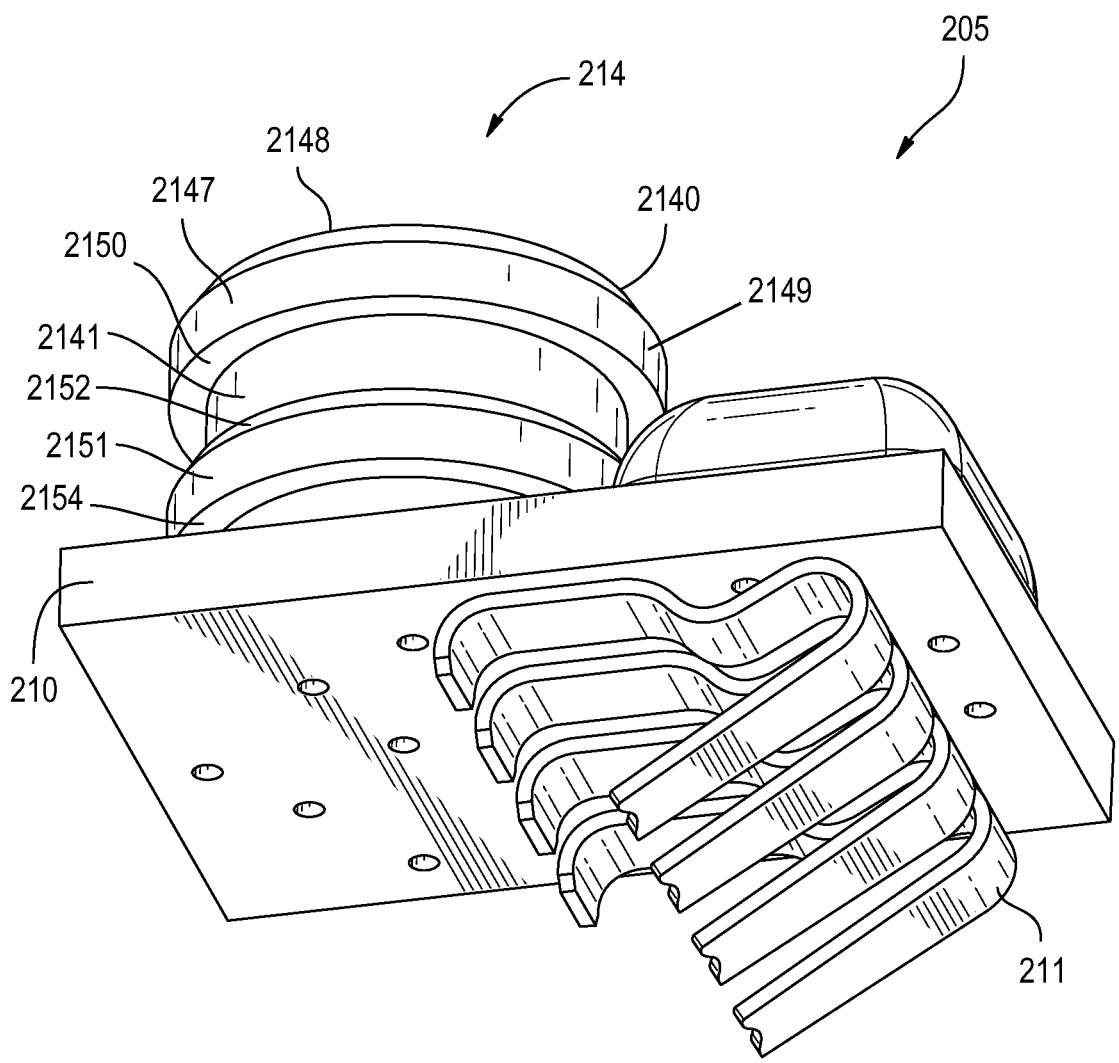
FIG. 5B illustrates a bottom perspective view of the sensor assembly of FIG. 5A.
Figure 5C:
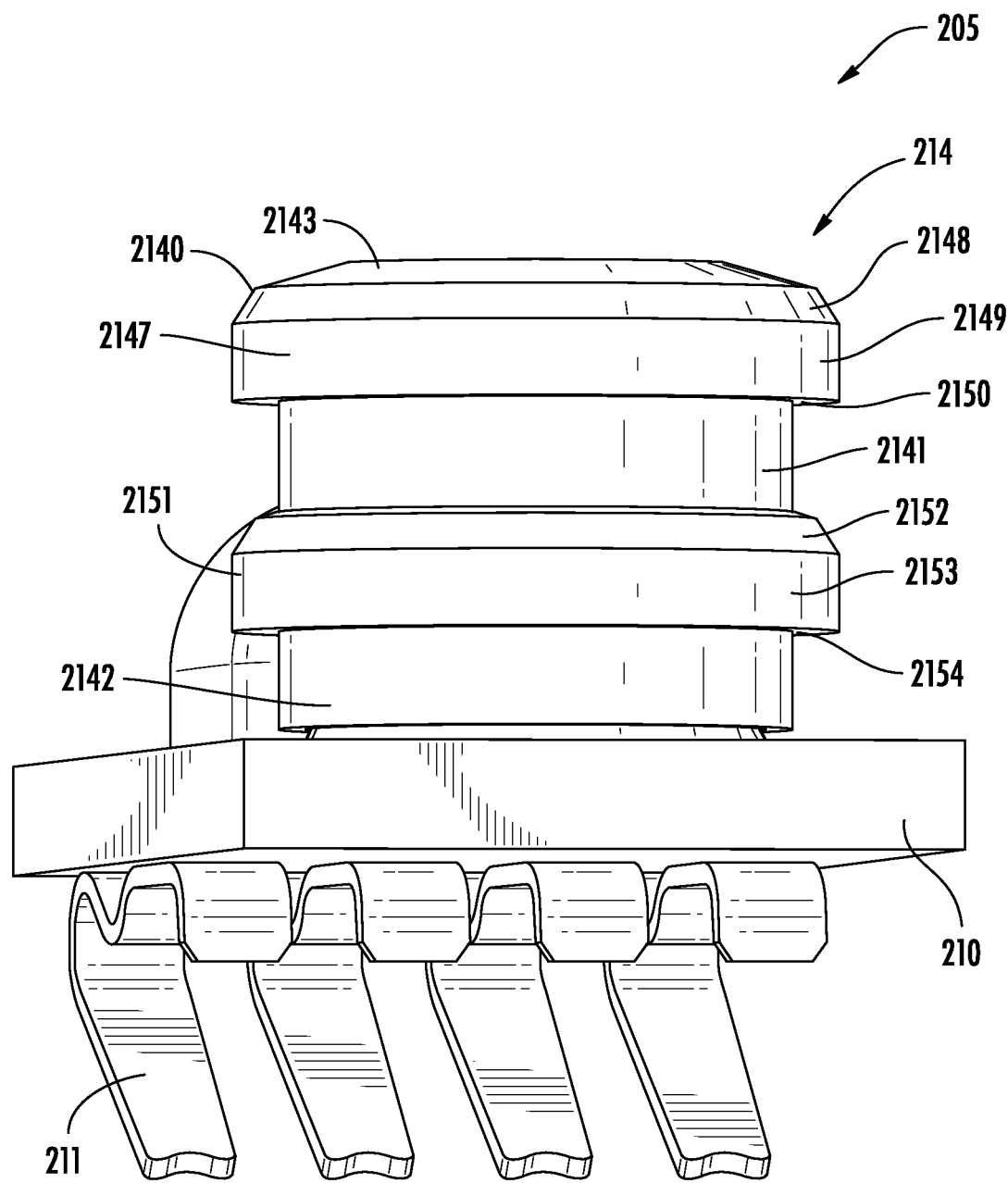
FIG. 5C illustrates a side view of the sensor assembly of FIG. 5C.

Referring now to FIGS. 5A-5C, a sensor assembly 205 can include a substrate 210 and a sensor (not shown) disposed on the substrate 210. In some embodiments, the engagement member (e.g., including the sealing member 214 and the receiving collar) can engage with the substrate 210 (e.g., the receiving collar and the substrate may be formed as the same piece of material or coupled together in some embodiments). In some embodiments, the engagement member can be configured, dimensioned, and/or positioned such that the sensor is coupled to the substrate 210 and the sensor is encircled by the engagement member. In some embodiments, the sensor assembly 205 can further include electronics 211, such as a processor, memory, and one or more sensing modules as would be understood by a person of skill in the art in light of the present disclosure configured to power and/or receive a signal from the sensor. In some embodiments, the sensor and the engagement member can be disposed on a first surface of the substrate 210 and the electronics 211 can be disposed on a second surface opposite the first surface. In some embodiments, the substrate 210 can include one or more apertures therethrough such that the electronics 211 on the second surface of the substrate 210 can be operably coupled to the sensor on the first surface of the substrate 210 by way of one or more wires extending from the electronics 211, through at least one of the one or more apertures through the substrate 210, to the sensor. In some embodiments, the sensor assembly may be coupled to an external computing device which may receive the raw sensor data and/or processed data from the sensor assembly, and which external computing device may include one or more processors and/or memories to conduct further processing and/or analysis of the signals received from the sensor assembly.

Figure 6A:
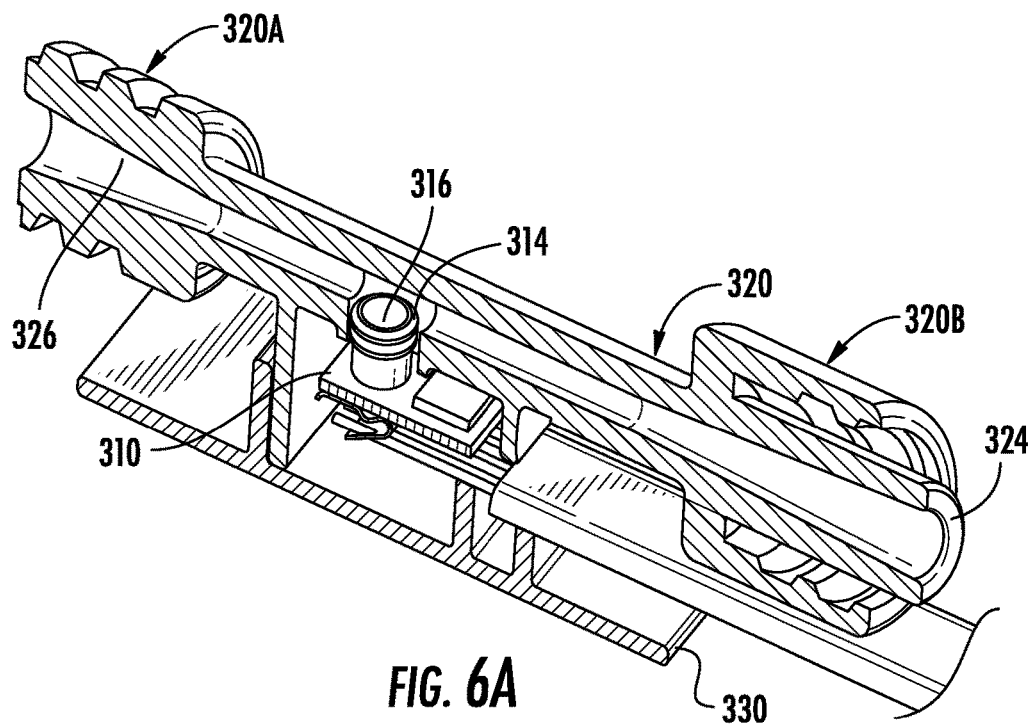
FIG. 6A illustrates a sectional view of a housing for a pressure reading apparatus, in accordance with some example embodiments described herein.
Figure 6B:
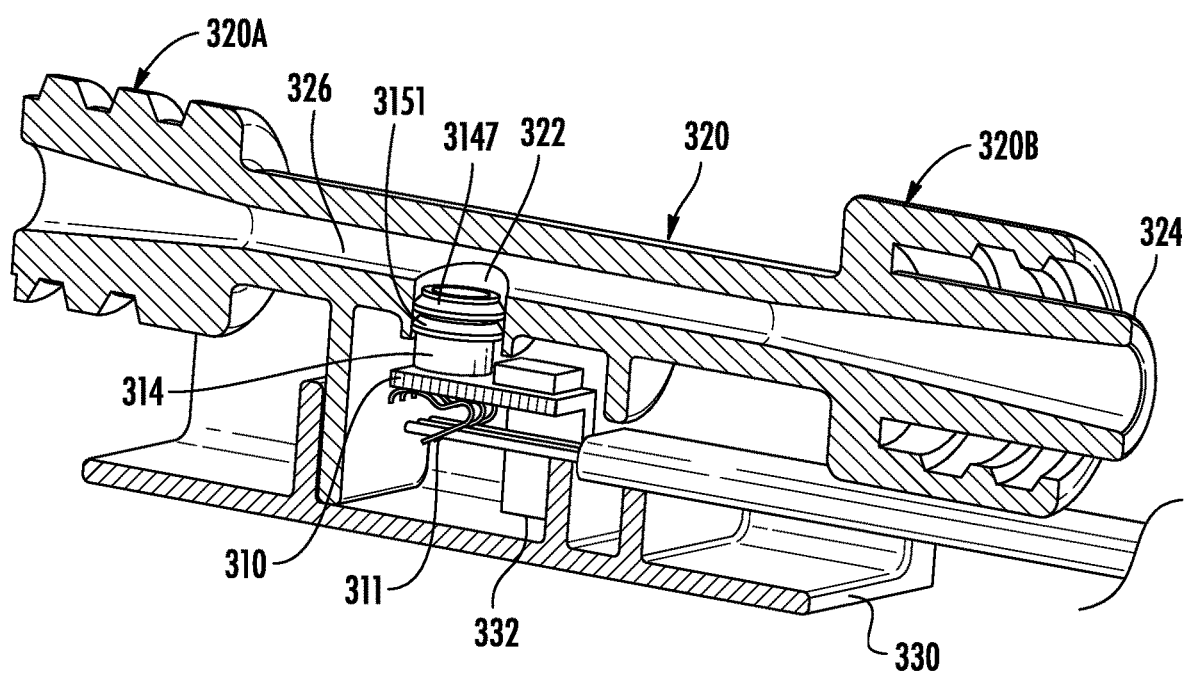
FIG. 6B illustrates a sectional view of a pressure reading apparatus, in accordance with some example embodiments described herein.

Referring now to FIGS. 6A and 6B, a cross-section of a portion of a pressure sensor system (e.g., the pressure reading assembly 100) is illustrated. In some embodiments, the pressure sensor system can include a sensor assembly (e.g., the sensor assembly 105). In some embodiments, the sensor assembly can include a substrate 310 and a sensor (e.g., the sensor 112) disposed on the substrate 310. In some embodiments, the substrate 310 can further include electronics 311 configured to send/receive electricity and/or information to/from the sensor. In some embodiments, the sensor assembly can include an engagement member (e.g., the engagement member 113) that can engage with the substrate 310. In some embodiments, the engagement member can be configured, dimensioned, and/or positioned such that the sensor is coupled to the substrate 310 and the sensor is encircled by the engagement member, which may include a sealing member 314 and may include a receiving collar 316. In some embodiments, the sensor and the engagement member can be disposed on a first surface of the substrate 310 and the electronics 311 can be disposed on a second surface opposite the first surface. In some embodiments, the substrate 310 can include one or more apertures therethrough such that the electronics 311 on the second surface of the substrate 310 can be operably coupled to the sensor on the first surface of the substrate 310 by way of one or more wires extending from the electronics 311, through at least one of the one or more apertures through the substrate 310, to the sensor. In some embodiments, the sensor assembly can further include the receiving collar 316, about which the sealing member 314 is configured to be fixably disposed.

In some embodiments, the engagement member can be or include a sealing member 314 that is generally columnar (also referred to herein as a generally columnar sealing member 314) configured to engage a receiving tube 322 of a housing 320, the receiving tube 322 configured to retain at least part of the sealing member 314 and allow a pressure based on a force exerted by a fluid on the sensor 312. In some embodiments, the sealing member 314 can include an outer sealing surface having one or more surface features or other such engaging elements disposed on or integrally formed with the outer surface of the sealing member 314. In some embodiments, the sealing member 314 can include a first engaging element 3147 disposed on or formed integrally with an outer surface of the sealing member 314. In some embodiments, the first engaging element 3147 can include an inclined surface defined as a distal leading edge to the first engaging element 3147. In some embodiments, the sealing member 314 can further include a second engaging element 3151. In some embodiments, the second engaging element 3151 can be disposed on or formed integrally with the outer surface of the sealing member 314 proximal the first engaging element 3147. In some embodiments, the second engaging element 3151 can include an inclined surface positioned as a distal leading edge to the second engaging element 3151. In some embodiments, the sealing member 314 can include additional engaging elements configured to fixably engage the inner cylindrical surface of the receiving tube 322. In some embodiments, the first engaging element 3147 can further include a proximal surface. In some embodiments, the second engaging element 3151 can further include a proximal surface.

In some embodiments, the first engaging element 3147 and/or the second engaging element 3151 can be dimensioned and configured to extend circumferentially about a perimeter of the sealing member 314. In some embodiments, the first engaging element 3147 and the second engaging element 3151 can be configured to engage the inner cylindrical surface of the receiving tube 322 to resist removal of the sensor during operation.

In some embodiments, the first engaging element 3147 and/or the second engaging element 3151 can be dimensioned and configured to cause an asymmetrical friction force against the inner cylindrical surface of the receiving tube 322 such that the friction force between the sealing member 314 and the inner cylindrical surface of the receiving tube 322 is greater during application of a force to the sealing member 314 in a removal direction defined from a distal end towards a proximal end than during application of the force to the sealing member 314 in an insertion direction defined from the proximal end towards the distal end. For example, as described herein, the engaging elements may be angled towards the proximal end to allow deflection of the engaging elements during insertion, while compressing the engaging elements to increase the normal force when a force is applied in the removal direction. In some embodiments, the engaging elements may include an offset center of mass, offset attachment points between the center of the base of the engaging elements (e.g., the portion of the engaging element opposite the receiving tube 322) and the center of the medial portion of the engaging elements (e.g., the portion of the engaging element contacting the receiving tube 322), and/or tapered surfaces at least on the distal end to facilitate insertion with less resistance than in a removal direction.

As illustrated in FIG. 6B, for instance, the first engaging element 3147 and the second engaging element 3151 can be similar in size and shape. In some embodiments, sealing member 314 can include less than or more than two engaging elements, can include more than one different engaging elements, and/or can include engaging elements that are integrally formed with the other components and features of the sealing member 314. In some embodiments, the sealing member 314, and engaging elements thereof (e.g., 3147, 3151) can be configured to be slideably disposed within the receiving tube 322 of the housing 320, according to the various parameters described herein. In some embodiments, an outermost diameter of the sealing member 314 may be greater than an inner diameter of the receiving tube 322, such that the sealing member 314 exerts an outward force on the inner cylindrical wall of the receiving tube 322. In some embodiments, the diameter of the sealing member 314 to one or more recessed portions of the outer sealing surface (e.g., one or more portions not defining the outer diameter and/or not defining an engagement member) may be less than the inner diameter of the receiving tube 322, such that the sealing member 314 may be inserted. In some embodiments, for instance when one or more media (e.g., 118) are disposed within the axial bore of the sealing member 314, slideably disposing the sealing member 314 into the receiving tube 322 can place the one or more media in contact with a conduit of the housing 320 and thereby allow communication with a fluid (e.g., fluid 126) disposed within and/or flowing through a conduit 326 of the housing 320 during operation. In some embodiments, the housing 320 can further include a first connector 320A and a second connector 320B configured to be slideably or rotatably engaged with a further tubing or a further conduit such that a fluid can be caused to flow through the passageway 326 of the conduit 324. In some embodiments, the fluid 126 communicated through a passageway 326 defined by the conduit 324 can have a hydraulic pressure, which can be exerted upon and/or communicated to the one or more media, the sensor being configured to sense, measure, or otherwise detect the hydraulic pressure exerted by the one or more media upon the sensor, while the frictional force between the sealing member 314 and the inner cylindrical wall is not overcome by the pressure of the fluid on the sensor assembly.

The pressure sensor system can further include a housing base 330. In some embodiments, the housing base 330 can have a rigid structure that is configured to support the housing 320 in operation. In some embodiments, during assembly, the sensor assembly is first engaged with the housing 320 as described herein and then the housing base 330 is engaged with the housing 320 to at least partially enclose the sensor assembly within the housing structure comprising the housing 320 and the housing base 330. In some embodiments, the housing base 330 may include a mechanical structure (e.g., a wall 332 as shown in FIG. 6b) to prevent the sensor assembly (e.g., the sealing member 314) from backing out of the receiving tube 322 of the housing 320.

In some embodiments, the housing base 330 may fixedly engage the housing 320 during assembly, and the housing base 330 may include one or more mechanical structures 332 to prevent the sensor assembly from backing out of the receiving tube 322 of the housing 320 during operation. In some embodiments, the sealing member 314 may engage the inner cylindrical surface of the receiving tube 322 of the housing 320 with sufficient resistance (e.g., frictional force) to prevent backing out of the sensor assembly from the receiving tube 322 during normal operation. In some embodiments, the pressure sensor system may additionally or alternatively use the one or more mechanical structures 332 to at least partially prevent the sensor assembly (e.g., the sealing member 314) from backing out of the receiving tube 322 during normal operation. For example, in a medical application, if a nurse attempts to flush the housing 320 to remove debris or bodily fluids before re-introducing a fluid for pressure sensing, higher than normal pressures may be applied to the sensor (e.g., 80-100 psi), which may in some instances overcome the resistance of the sealing member 314 if the sealing member 314 is the only structure contributing to the prevention of the sensor assembly from backing out of the receiving tube 322 of the housing 320. In some embodiments, the one or more mechanical structures 332 may redundantly ensure that the sensor assembly does not back out of the receiving tube 322 under normal or abnormal operation of the pressure sensor system. In some embodiments, the one or more mechanical structures 332 may rest against or slightly below the substrate 310 without applying any or substantial force to the substrate 310 in a static state. In such embodiments, the one or more mechanical structures 332 may limit the motion of the sensor assembly to acceptable tolerances under any pressure load while not necessarily positively forcing the substrate 310 upwards at all times. In some embodiments, the one or more mechanical structures 332 may define a clearance from the housing 320 configured to ensure that the substrate 310 and the rest of the sensor apparatus begin and remain in an acceptable position relative to the flow tube.

Figure 7A:
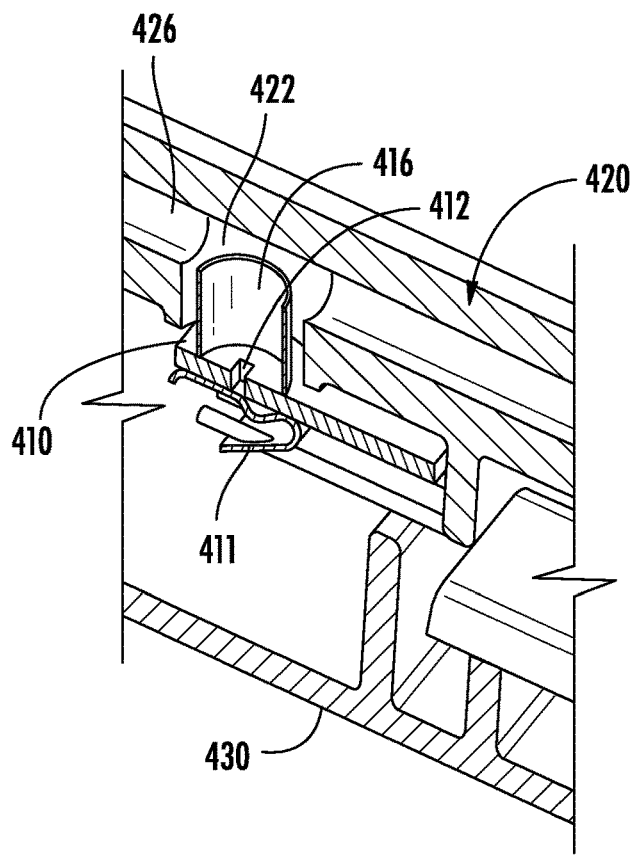
FIG. 7A illustrates a sectional view of a housing for a pressure reading apparatus, in accordance with some example embodiments described herein.
Figure 7B:
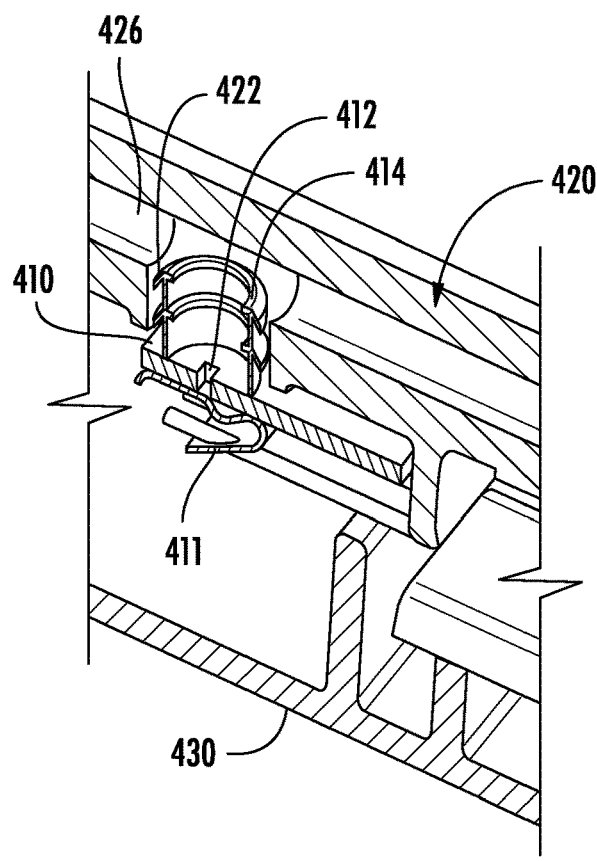
FIG. 7B illustrates a sectional view of a pressure reading apparatus, in accordance with some example embodiments described herein.

Referring now to FIGS. 7A and 7B, a cross-sectional portion of a pressure sensor system is illustrated according to another example embodiment. In some embodiments, the pressure sensor system can include a sensor assembly (e.g., the sensor assembly 105). In some embodiments, the sensor assembly can include a substrate 410 and a sensor 412 disposed on a substrate 410. In some embodiments, the sensor assembly can further include electronics 411 configured to send/receive electricity and/or information to/from the sensor 412. In some embodiments, the sensor assembly can include an engagement member (e.g., the engagement member 113), which may include a sealing member 414 and may include a receiving collar 416 that can engage with the substrate 410. In some embodiments, the engagement member can be configured, dimensioned, and/or positioned such that the sensor 412 is coupled to the substrate 410 and the sensor 412 can be encircled by the engagement member, which may comprise the sealing member 414 and/or the receiving collar 416. In some embodiments, the sensor 412 and the engagement member can be disposed on a first surface of the substrate 410 and the electronics 411 can be disposed on a second surface opposite the first surface. In some embodiments, the substrate 410 can include one or more apertures therethrough such that the electronics 411 on the second surface of the substrate 410 can be operably coupled to the sensor 412 on the first surface of the substrate 410 by way of one or more wires extending from the electronics 411, through at least one of the one or more apertures through the substrate 410, to the sensor 412. In some embodiments, the sensor assembly can further include a receiving collar 416, about which the sealing member 414 is configured to be fixably disposed.

In some embodiments, the engagement member can be or include a generally columnar sealing member 414 configured to engage a receiving tube 422 of a housing 420. In some embodiments, the sealing member 414 can include an outer sealing surface that may include one or more surface features or other such engaging elements disposed on or integrally formed with an outer surface of the sealing member 414. In some embodiments, the sealing member 414 can include a first engaging element disposed on or formed integrally with an outer surface of the sealing member 414. In some embodiments, the first engaging element can include an inclined surface positioned as a distal leading surface to the first engaging element. In some embodiments, the sealing member 414 can further include a second engaging element. In some embodiments, the second engaging element can be disposed on or formed integrally with the outer surface of the sealing member 414 proximal the first engaging element. In some embodiments, the second engaging element can include an inclined surface positioned as a distal leading surface to the second engaging element. In some embodiments, the sealing member 414 can include additional engaging members or other such elements configured to fixably engage the inner cylindrical surface of the receiving tube 422. In some embodiments, the first engaging element can further include a proximal surface. In some embodiments, the second engaging element can further include a proximal surface. In some embodiments, the outside angle formed by the intersection of the proximal surface and the medial surface can be a reflex angle, an obtuse angle, or the like.

In some embodiments, the first engaging element and/or the second engaging element can be dimensioned and configured to extend circumferentially about a diameter of the sealing member 414. In some embodiments, the first engaging element and the second engaging element can be configured to engage the inner cylindrical surface of the receiving tube 422 to resist removal of the sensor during operation. In some embodiments, the first engaging element and the second engaging element can be dimensioned and configured to cause an asymmetrical friction force against the inner cylindrical surface of the receiving tube 422 such that the friction force between the sealing member 414 and the inner cylindrical surface of the receiving tube 422 is greater during application of a force to the sealing member 414 in a removal direction defined from a distal end towards a proximal end than during application of the force to the sealing member 414 in an insertion direction defined from the proximal end towards the distal end.

As illustrated in FIG. 7B, for instance, the first engaging element and the second engaging element can be similar in size and shape. In some embodiments, sealing member 414 can include less than or more than two engaging elements, can include more than one different engaging elements, and/or can include engaging elements that are integrally formed with the other components and features of the sealing member 414. In some embodiments, the sealing member 414, and engaging elements thereof can be configured to be slideably disposed within the receiving tube 422 of the housing 420. In some embodiments, for instance when one or more media (e.g., 118) are disposed within the axial bore of the sealing member 414, slideably disposing the sealing member 414 into the receiving tube 422 can place the one or more media in contact with a fluid (e.g., 126) disposed within and/or flowing through a conduit 426 of the housing 420. In some embodiments, the fluid 126 communicated through a passageway 428 defined by the conduit 426 of the housing 420 can have a hydraulic pressure, which can be exerted as a force upon and/or communicated to the one or more media, the sensor 412 being configured to sense, measure, or otherwise detect the hydraulic pressure exerted by the one or more media upon the sensor. As can be seen in FIGS. 6B and 7B, the engagement members can be dimensioned and configured according to various different embodiments so as to be suitable for sealing the receiving tube 322, 422 and remainder of the sensing assembly against inflow of air or other contaminant and outflow of the media and/or the bodily fluid. Based upon the dimensions and material properties of the receiving tube 322, 422, the engagement member can be configured to sealably engage the inner surface of the receiving tube 322, 422 under normal operating conditions (e.g., normal pressures or pressure ranges exerted by the bodily fluid on the one or more media).

The pressure sensor system can further include a housing base 430. In some embodiments, the housing base 430 can have a rigid structure that is configured to support the housing 420 in operation. In some embodiments, during assembly, the sensor assembly is first engaged with the housing 420 as described herein and then the housing base 430 is engaged with the housing 420 to at least partially enclose the sensor assembly within the housing structure comprising the housing 420 and the housing base 430. In some embodiments, the housing base 430 may include a mechanical structure (e.g., the wall 332 as shown in FIG. 6*b*) to prevent the sensor assembly (e.g., the sealing member 414) from backing out of the receiving tube 422 of the housing 420.

In some embodiments, the housing base 430 may fixedly engage the housing 420 during assembly, and the housing base 430 may include one or more mechanical structures to prevent the sensor assembly from backing out of the receiving tube 422 of the housing 420 during operation. In some embodiments, the sealing member 414 may engage the inner cylindrical surface of the receiving tube 422 of the housing 420 with sufficient resistance (e.g., frictional force) to prevent backing out of the sensor assembly from the receiving tube 422 during normal operation. In some embodiments, the pressure sensor system may additionally or alternatively use the one or more mechanical structures to at least partially prevent the sensor assembly (e.g., the sealing member 414) from backing out of the receiving tube 422 during normal operation. For example, in a medical application, if a nurse attempts to flush the housing 420 to remove debris or bodily fluids before re-introducing a fluid for pressure sensing, higher than normal pressures may be applied to the sensor (e.g., 80-100 psi), which may in some instances overcome the resistance of the sealing member 414 if the sealing member 414 is the only structure contributing to the prevention of the sensor assembly from backing out of the receiving tube 422 of the housing 420. In some embodiments, the one or more mechanical structures may redundantly ensure that the sensor assembly does not back out of the receiving tube 422 under normal or abnormal operation of the pressure sensor system. In some embodiments, the one or more mechanical structures may rest against or slightly below the substrate 410 without applying any or substantial force to the substrate 410. In such embodiments, the one or more mechanical structures may limit the motion of the sensor assembly to acceptable tolerances while not positively forcing the substrate 410 upwards at all times. In some embodiments, the one or more mechanical structures may define a clearance from the housing 420 configured to ensure that the substrate 410 and the rest of the sensor apparatus begin and remain in an acceptable position relative to the flow tube.

Figure 8:
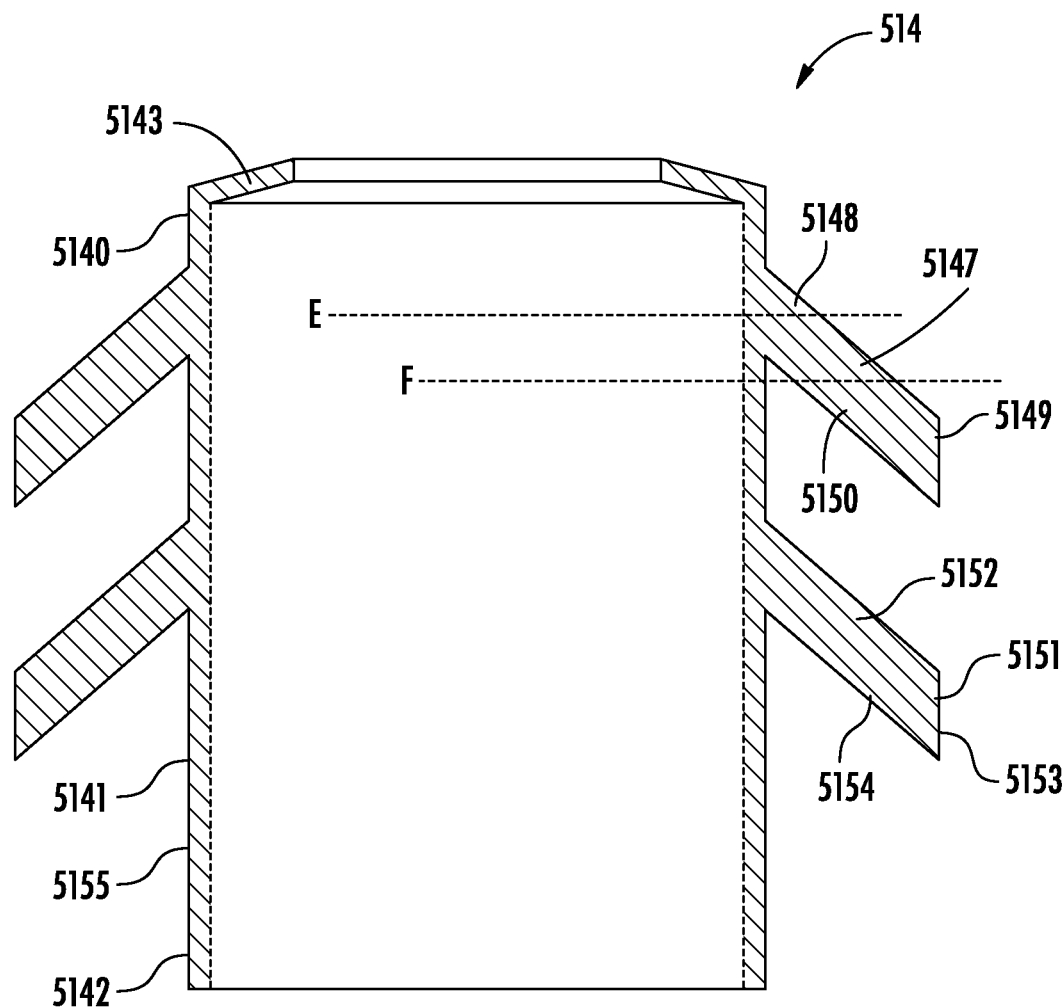
FIG. 8 illustrates a sectional view of a generally columnar sealing member for a pressure reading apparatus, in accordance with some example embodiments described herein.
Figure 9:
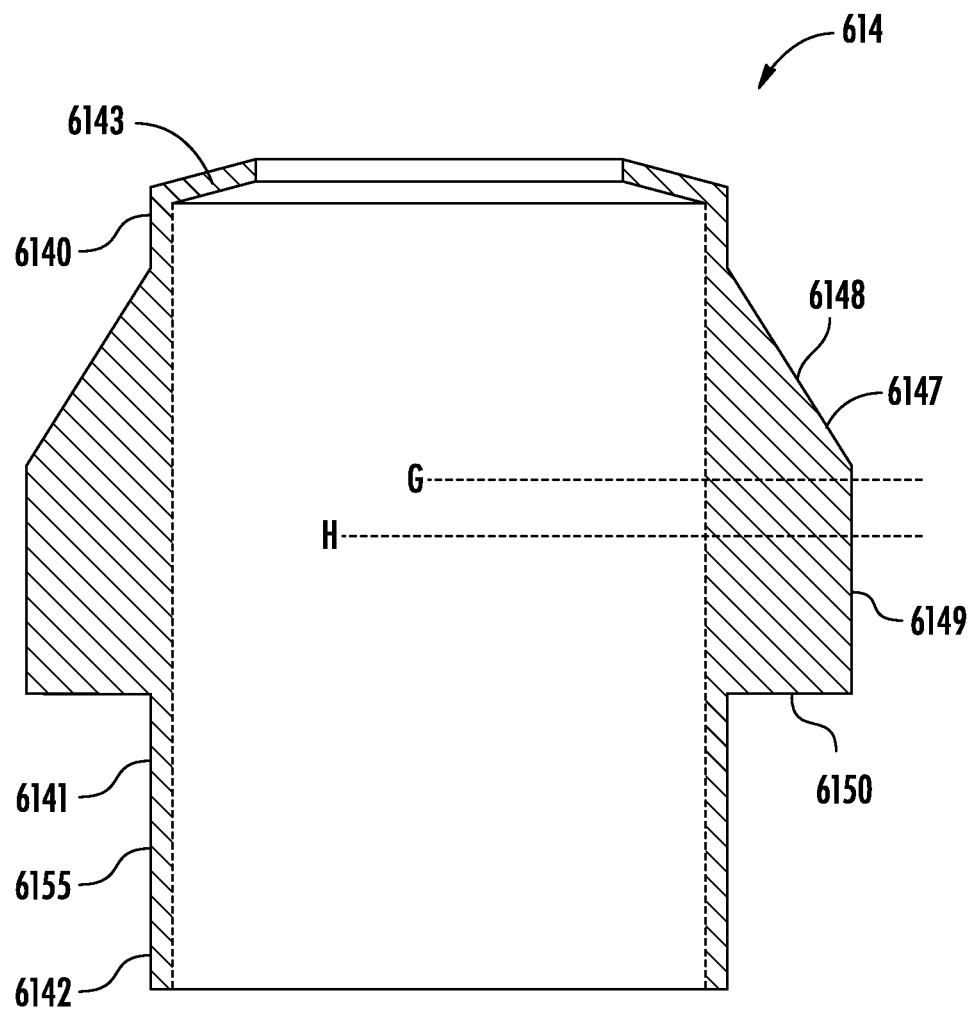
FIG. 9 illustrates a sectional view of a generally columnar sealing member for a pressure reading apparatus, in accordance with some example embodiments described herein.
Figure 10:
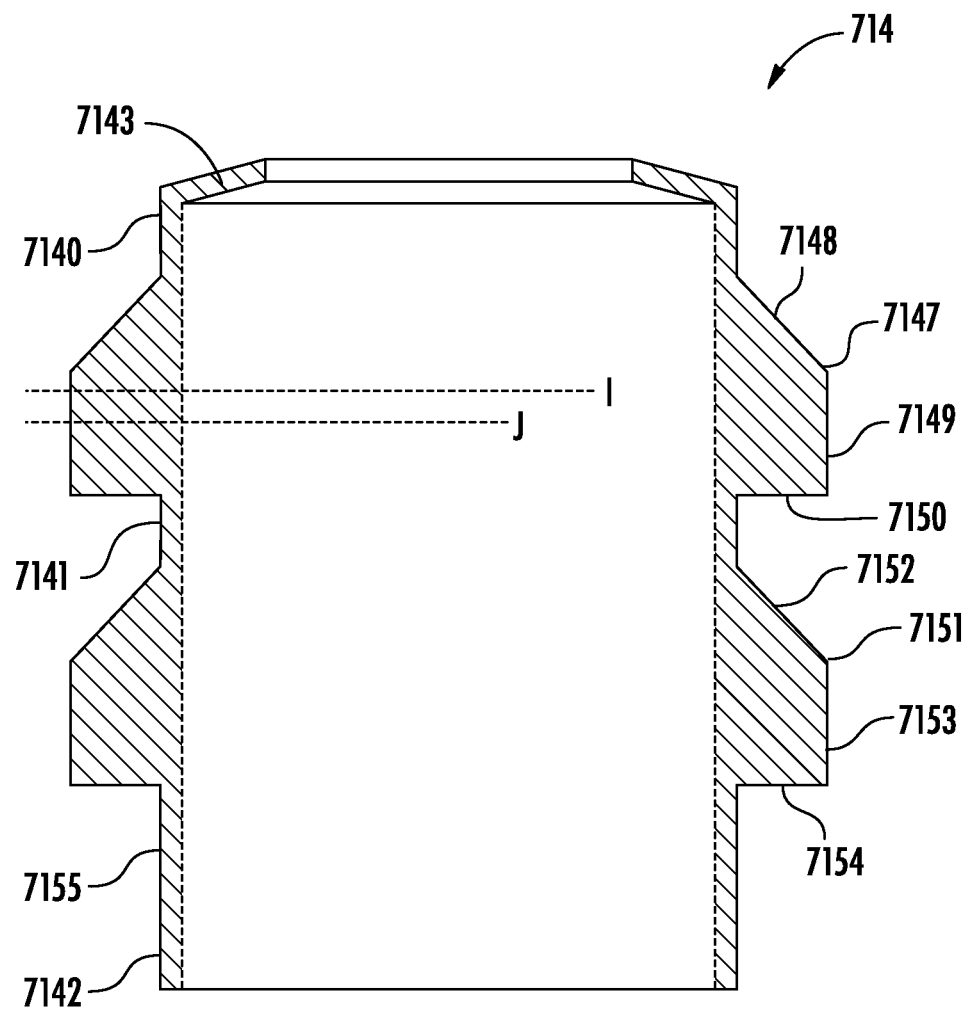
FIG. 10 illustrates a sectional view of a generally columnar sealing member for a pressure reading apparatus, in accordance with some example embodiments described herein.

Described in more detail below with reference to FIGS. 8-10 are some, but not all, of the suitable configurations and contemplated embodiments for sealing members, such as the sealing member 114 and the like, according to various embodiments of the present disclosure. Said descriptions and illustrations are not intended to limit the scope of this disclosure in any way, and are provide by way of example only to illustrate the concepts generally.

Referring now to FIG. 8, a sealing member 514 is illustrated for use with a sensor assembly (e.g., the sensor assembly 105), according to an embodiment of the present disclosure. In some embodiments, the sealing member 514 can engage with a substrate (e.g., the substrate 110) of the sensor assembly (e.g., via a receiving collar). In some embodiments, the sealing member 514 can be particularly configured and dimensioned to be disposed about, partially disposed about, or disposed about part of a receiving collar such as the receiving collars discussed herein. In some embodiments, the sealing member 514 can be particularly configured and dimensioned such that, when the sealing member 514 is disposed about, partially disposed about, or disposed about part of the receiving collar, a diameter difference at the interface between the sealing member 514 and the receiving collar is sufficiently small so that the sealing member 514 is retained on the receiving collar during use of the sensor assembly.

In some embodiments, the sealing member 514 can include a distal portion 5140, a medial portion 5141, and a proximal portion 5142. In some embodiments, the sealing member 514 can define an orifice at the distal portion 5140 and an orifice at the proximal portion 5142. In some embodiments, the distal portion 5140, the medial portion 5141, and/or the proximal portion 5142 can be aligned axially along the sealing member 514. In some embodiments, the distal portion 5140, the medial portion 5141, and/or the proximal portion 5142 can at least partially define an axial bore (not shown) aligned axially along the sealing member 514. In some embodiments, the sealing member 514 can include a flange 5143 defined at the edge of the orifice in the distal portion 5140 of the sealing member 514. In some embodiments, the proximal portion 5142 can be configured to abut, be coupled to, be fixed to, be adhered to, or integrally formed with a portion of the substrate 110.

In some embodiments, the engagement member can engage with the substrate 110 such that the sealing member 514 is disposed about a sensor (such as the sensor 112). The axial bore can be at least partially defined by an inner cylindrical surface (not shown). In some embodiments, the engagement member can be configured and dimensioned to be disposed about the sensor and be coupled to the substrate and to retain one or more media in place about the sensor. In some embodiments, the engagement member can comprise the sealing member 514 disposed about at least a portion of the receiving collar, the receiving collar coupled to the substrate. In other words, while the receiving collar is typically coupled to the substrate, the sealing member 514 can be disposed about only a distal portion of the receiving collar or a medial portion of the receiving collar, and in such a way, the sealing member 514 can be disposed about a portion of the receiving collar without abutting or being coupled to the substrate. In some embodiments, the receiving collar can define a first axial bore having a volume approximately equal to the inner diameter and length of the aperture through the receiving collar. In some embodiments, the sealing member 514 can define a second axial bore having a volume approximately equal to the inside diameter and length of the aperture through the sealing member 514. In some embodiments, the inside diameter of the sealing member 514 can be substantially similar to or equal to an outside diameter of the receiving collar. In some embodiments, the sealing member 514 can have a contacting surface at a proximal end of the sealing member 514. In some embodiments, the contacting surface can be configured to engage with or be coupled to the substrate. In some embodiments, for example when the sealing member 514 is fully or substantially disposed about the receiving collar, the contacting surface may not be engaged with or coupled to the substrate 110 at any point or place.

In some embodiments, the engagement member can be or include a generally columnar sealing member 514 configured to engage the receiving tube. In some embodiments, the sealing member 514 can include an outer sealing surface one or more surface features or other such engaging elements disposed on or integrally formed with an outer surface of the sealing member 514. In some embodiments, the sealing member 514 can include a first engaging element 5147 disposed on or formed integrally with an outer surface of the sealing member 514. In some embodiments, the first engaging element 5147 can include an inclined surface 5148 positioned as a distal leading edge to the first engaging element 5147. In some embodiments, the sealing member 514 can further include a second engaging element 5151. In some embodiments, the second engaging element 5151 can be disposed on or formed integrally with the outer surface of the sealing member 514 proximal the first engaging element 5147. In some embodiments, the second engaging element 5151 can include an inclined surface 5150 positioned as a distal leading edge to the second engaging element 5151. In some embodiments, the sealing member 514 can include additional engaging members or other such elements configured to fixably engage the inner cylindrical surface of the receiving tube. In some embodiments, the first engaging element 5147 can further include a proximal surface 5151. In some embodiments, the second engaging element 5151 can further include a proximal surface 5154.

In some embodiments, the first engaging element 5147 and/or the second engaging element 5151 can be dimensioned and configured to extend circumferentially about a diameter of the sealing member 514. In some embodiments, the first engaging element 5147 and the second engaging element 5151 can be configured to engage the inner cylindrical surface of the receiving tube to resist removal of the sensor during operation. In some embodiments, the first engaging element 5147 and the second engaging element 5151 can be dimensioned and configured to cause an asymmetrical friction force against the inner cylindrical surface of the receiving tube such that the friction force between the sealing member 514 and the inner cylindrical surface of the receiving tube is greater during application of a force to the sealing member 514 in a removal direction defined from the distal end 5140 towards the proximal end 5142 than during application of the force to the sealing member 514 in an insertion direction defined from the proximal end 5142 towards the distal end 5140.

In some embodiments, the sealing member 514 can be generally columnar and can be configured to fixedly engage the receiving tube. In some embodiments, the sealing member 514 can include one or more surface features, such as a first and second engaging elements 5147, 5151 disposed on or integrally formed with an outer surface (e.g., the medial portion 5141) of the sealing member 514. In some embodiments, the sealing member 514 can include a first engaging element 5147 disposed on or formed integrally with an outer surface of the sealing member 514, in either event referred to as a portion of the outer surface. In some embodiments, the first engaging element 5147 can include an inclined surface 5148 positioned as a distal leading edge to the first engaging element 5147. In some embodiments, the first engaging element 5147 can include a medial surface 5149 which may act partially, primarily, or solely as a contact surface when the sealing member 514 is disposed within the receiving tube. In some embodiments, the sealing member 514 can further include a second engaging element 5151. In some embodiments, the second engaging element 5151 can be disposed on or formed integrally with the outer surface of the sealing member 514 proximal the first engaging element 5147. In some embodiments, the second engaging element 5151 can include an inclined surface 5152 positioned as a distal leading edge to the second engaging member 5151. In some embodiments, the second engaging element 5151 can include a medial surface 5153 which may act partially, primarily, or solely as a contact surface when the sealing member 514 is disposed within the receiving tube. In some embodiments, the sealing member 514 can include additional engaging elements or other such elements configured to fixably engage the inner cylindrical surface of the receiving tube. In some embodiments, the first engaging element 5147 can further include a proximal surface 5151. In some embodiments, the second engaging element 5151 can further include a distal surface 5152.

In some embodiments, for the first engaging element 5147, the medial surface 5149 can be generally flat in an axial direction and extend about the generally columnar sealing member 514 in a circumferential direction. In some embodiments, the proximal surface 5150 can be generally adjacent the medial surface 5149 in a proximal direction and can extend about the generally columnar sealing member 514 in the circumferential direction. In some embodiments, an intersection of the medial surface 5149 and the proximal portion 5150 may define a first reflex angle. In some embodiments, the distal surface 5148 can be generally adjacent the medial surface 5149 in a distal direction and can extend about the generally columnar sealing member 514 in the circumferential direction. In some embodiments, an intersection of the medial surface 5149 and the distal surface 5148 may define a second reflex angle greater than the first reflex angle.

Additionally or alternatively, in some embodiments, the medial surface 5153 can be generally flat in an axial direction and extend about the generally columnar sealing member 514 in a circumferential direction. In some embodiments, the proximal surface 5154 can be generally adjacent the medial surface 5153 in a proximal direction and can extend about the generally columnar sealing member 514 in the circumferential direction. In some embodiments, an intersection of the medial surface 5153 and the proximal portion 5154 may define a first reflex angle. In some embodiments, the distal surface 5152 can be generally adjacent the medial surface 5153 in a distal direction and can extend about the generally columnar sealing member 514 in the circumferential direction. In some embodiments, an intersection of the medial surface 5153 and the distal surface 5152 may define a second reflex angle greater than the first reflex angle.

In particular, as illustrated in FIG. 8, the first engaging element 5147 is illustrated as having a first radial axis E associated with an axial length of attachment of the first engaging element 5147 to the surface of a main body 5155 of the sealing member 514 (e.g., disposed in a center of the intersection of the sealing member 5147 and the main body 5155 of the sealing member 514). Said differently, the engaging elements may be described as protrusions extending from the main body 5155 of the sealing member 514, while forming a portion of the outer sealing surface of the engaging element. Likewise, as illustrated in FIG. 8, the first engaging element 5147 is illustrated as having a second radial axis F associated with a radial center of mass of the first engaging element 5147. As illustrated, the second radial axis F is positioned to the proximal side of the first radial axis E at least partially because of the particular dimensions and configuration of the first engaging element 5147. In other words, since the entire length of attachment of the first engaging element 5147 is distal the entire leading surface 5150 of the first engaging element 5147, the center of mass of the first engaging element 5147 (illustrated as radial axis F) is lower than the center of the length of attachment (illustrated as radial axis E). In such a configuration, inserting the sealing member 514 into the receiving tube causes the engaging elements to lie flat, while attempting to remove the sealing member 514 causes compression on the engaging elements by the engaging elements rolling relative to the length of the engaging element, which increases the compression of the engaging elements to increase the retention between the housing and the sealing member 514. Without wishing to be bound by any particular theory, this may contribute to an asymmetrical friction force exerted by the sealing member 514 or a component thereof (e.g., an engaging element 5147, 5151) against the inner cylindrical surface of the receiving tube because the normal force between the housing and the sealing member is increased as the engaging elements compress.

In some embodiments, the second engaging element 5151 can behave in the same or a similar manner as the first engaging element 5147. However, while FIG. 8 illustrates that the second engaging element 5151 is the dimensionally similar to the first engaging element 5147, albeit positioned proximate the first engaging element 5147, the second engaging element 5151 can alternatively be dimensioned and configured in any other suitable way, in any combination thereof. Alternatively, in other embodiments, the sealing member 514 may not include the second engaging element 5151 and/or the first engaging element 5147 can be dimensioned, configured, shaped, positioned, and/or react to an exerted frictional force in any other suitable manner.

In particular, as illustrated in FIG. 8, the second engaging element 5151 is illustrated as having a similar axial length of attachment to the surface of a main body 5155 as the first engaging element 5147, which is not necessarily true for other embodiments. Likewise, relative to the dimension and shape of the second engaging element 5151, the radial center of mass of the second engaging element 5151 appears similar to that of the first engaging element 5147, which is not necessarily true for other embodiments either. In the illustrated embodiment at least, the second engaging element 5151 of FIG. 8 has a distal surface 5152, medial surface 5153, and proximal surface 5154 that are sufficiently similar in terms of dimensions and orientation to the distal surface 5148, medial surface 5149, and proximal surface 5150 of the first engaging element 5147, the same or similar benefits in terms of asymmetrical friction force is exhibited by the second engaging element 5151. Said differently, the engaging elements may be described as protrusions extending from the main body 5155 of the sealing member 514, while forming a portion of the outer sealing surface of the engaging element. Likewise, as illustrated, since the entire length of attachment of the second engaging element 5151 is distal the entire leading surface 5154 of the second engaging element 5151, the center of mass of the second engaging element 5151 will be lower than the center of the length of attachment of the second engaging element 5151 to the body 5155 of the sealing member 514. In such a configuration, inserting the sealing member 514 into the receiving tube causes the engaging elements to lie flat, while attempting to remove the sealing member 514 may cause compression on the engaging elements and may increase the force (frictional, compressive, and/or the like) exerted against the inner cylindrical wall of the receiving tube. Without wishing to be bound by any particular theory, this may contribute to an asymmetrical friction force exerted by the sealing member 514 or a component thereof against the inner cylindrical surface of the receiving tube. Therefore, as illustrated, the first engaging element 5147 and/or the second engaging element 5151 can frictionally and/or compressively engage the inner cylindrical surface of the receiving tube, and therefore the multiplicity of engaging elements used provides a degree of redundancy and can further reduce the likelihood that a fluid pressure during normal operation of the pressure reading assembly will exert sufficient force on the media and/or sensor assembly such that the sealing member 714 will be withdrawn partially or fully from the receiving tube of the housing.

In some embodiments, due at least to the length, shape, attachment position, and orientation of the first and/or second engaging element 5147, 5151, a higher compressive force may be exerted on the inner surface of the receiving tube by the contacting surface 5149, 5153 than other portions (e.g., the distal surfaces 5148, 5152 of the engaging elements 5147, 5151. Without wishing to be bound by any particular theory, in some embodiments, during removal or attempted removal of the sealing member 514 from the receiving tube, the engaging elements 5147, 5151 can "roll" or "curl" or otherwise deform towards the distal end 5140 of the sealing member 514, such that the engaging elements 5147, 5151 are deformed so as to lengthen in the outward radial direction, exerting an increased compressive force on the inner surface of the receiving tube and increasing the force required to overcome these compressive forces to successfully remove the sealing member 514 from the receiving tube. For example, in some embodiments the engagement elements 5147, 5151 may be structured and configured such that movement in a direction extending from the distal end towards the proximal end (e.g., a removal direction) causes greater compression of the engagement elements than movement in a direction extending from the proximal end towards the distal end (e.g., an insertion direction). For example, the engagement elements 5147, 5151 may be angled at least partially in the proximal direction.

In some embodiments, the friction force between the sealing member 514 or the component thereof and the inner cylindrical surface of the receiving tube can be greater during application of a force to the sealing member 514 in a removal direction defined from the distal end towards the proximal end than during application of the force to the sealing member 514 in an insertion direction defined from the proximal end towards the distal end due at least in part to the higher compression when trying to remove the sealing member 514 from the receiving tube. Without wishing to be bound by any particular theory, a particular shape or a feature of the shape of the sealing member 514 may also or alternatively contribute to the asymmetrical friction force exhibited by the sealing member 514. In other words, in some embodiments, a length of the sealing member 514 along the leading surface 5151 may be shorter than or equal to the length of attachment of the first engaging element 5147 to the main body 5155 of the sealing member 514, which may result in differential mechanical properties when a deforming frictional force is exerted upon the first engaging element 5147. This deforming frictional force may cause less or more deformation of the first engaging element 5147 depending upon the direction in which the deforming frictional force is exerted and the possible range of flexion of the engaging elements. In other words, in some embodiments, the first engaging element 5147 may experience a first deformation when the frictional force is exerted in a direction from the distal portion 5140 to the proximal portion 5142, and may experience a second deformation less than the first deformation when the frictional force is exerted in a direction from the proximal portion 5142 to the distal portion 5140.

In some embodiments, the sealing member 514 or a portion thereof may be configured to deform to fill all available volume between and within the receiving collar. In some embodiments, since the sealing member 514 can deform to fill any available space upon receiving a strain-inducing stress, such as a frictional force or a compressive force, the compressive force exerted by the first and/or second engaging elements 5147, 5151 against the inner surface of the receiving tube can be reduced upon such deformation, leading to an undesirable easing of required force for removal of the sealing member 514 from the receiving tube. However, in some embodiments, the sealing member 514 and the receiving tube, among other components, can be particularly dimensioned and configured such that an appropriate mating fit is achieved between the sealing member 514 and the receiving tube such that deformation of the sealing member 514 is minimized and the compressive force of the engaging elements 5147, 5151 against the inner cylindrical surface of the receiving tube can be maintained such that the sealing member 514 is retained within the receiving tube under normal operating pressures.

As such, in the direction in which less deformation is achieved or possible under the same or similar friction force, the normal frictional forces exerted by a contacting surface or edge of the first engaging element 5147 against the inner cylindrical surface of the receiving tube can be less than in the direction in which more deformation is achieved or possible under the same or similar friction force. In other words, the first engaging element 5147 deform under compression to contribute to or cause the differential force required for insertion versus removal of the sealing member 514 from the receiving tube.

In some embodiments, a radial distance and a volume of a gap between an outer diameter of the main body of the sealing member 514 and an inner diameter at a corresponding point of the inner cylindrical surface of the receiving tube can be greater than a predetermined threshold sufficient for retaining the sealing member 514 within the receiving tube by allowing one or more of the engaging elements 5147, 5151 to fold and compress into the gap to propagate the seal and hold the sealing member 514 in place. In other words, in some embodiments, when the volume of the gap between the sealing member 514 and the receiving tube is less than the volume of the engaging elements 5147, 5151, for instance, the sealing member 514 will tend to be removed from the receiving tube under normal operating pressures, however when the volume of the gap between the sealing member 514 and the receiving tube is greater than the volume of the engaging elements 5147, 5151, for instance, the sealing member 514 will tend to be retained within the receiving tube under normal operating pressures at least partially because one or more of the engaging elements 5147, 5151 can be deformed (e.g., folded, compressed, etc.) into the volume of the gap and the normal compressive forces of the sealing member 514 against the inside surface of the receiving tube will be maintained.

Referring now to FIG. 9, a sealing member 614 is illustrated for use with a sensor assembly (e.g., the sensor assembly 105), according to an embodiment of the present disclosure. In some embodiments, the sealing member 614 can engage with a substrate (e.g., the substrate 110) of the sensor assembly (e.g., via a receiving collar). In some embodiments, the sealing member 614 can be particularly configured and dimensioned to be disposed about, partially disposed about, or disposed about part of a receiving collar such as the receiving collars discussed herein. In some embodiments, the sealing member 614 can be particularly configured and dimensioned such that, when the sealing member 614 is disposed about, partially disposed about, or disposed about part of the receiving collar, a diameter difference at the interface between the sealing member 614 and the receiving collar is sufficiently small so that the sealing member 614 is retained on the receiving collar during use of the sensor assembly. For example, in some embodiments, the inner diameter of the sealing member 614 may be less than the outer diameter of the receiving collar.

In some embodiments, the sealing member 614 can include a distal portion 6140, a medial portion 6141, and a proximal portion 6142. In some embodiments, the sealing member 614 can define an orifice at the distal portion 6140 and an orifice at the proximal portion 6142. In some embodiments, the distal portion 6140, the medial portion 6141, and/or the proximal portion 6142 can be aligned axially along the sealing member 614. In some embodiments, the distal portion 6140, the medial portion 6141, and/or the proximal portion 6142 can at least partially define an axial bore (not shown) aligned axially along the sealing member 614. In some embodiments, the sealing member 614 can include a flange 6143 defined at the edge of the orifice in the distal portion 6140 of the sealing member 614.

In some embodiments, the engagement member can engage with the substrate such that the engagement member 614 is disposed about a sensor (e.g., the sensor 112). The axial bore can be at least partially defined by an inner cylindrical surface (not shown). In some embodiments, the engagement member can be configured and dimensioned to be disposed about the sensor and be coupled to the substrate and to retain one or more media in place about the sensor. In some embodiments, the engagement member can comprise the sealing member 614 disposed about at least a portion of the receiving collar, the receiving collar coupled to the substrate. In other words, while the receiving collar is typically coupled to the substrate, the sealing member 614 can be disposed about only a distal portion of the receiving collar or a medial portion of the receiving collar, and in such a way, the sealing member 614 can be disposed about a portion of the receiving collar without abutting or being coupled to the substrate. In some embodiments, the receiving collar can define a first axial bore having a volume approximately equal to the inner diameter and length of the aperture through the receiving collar. In some embodiments, the sealing member 614 can define a second axial bore having a volume approximately equal to the inside diameter and length of the aperture through the sealing member 614. In some embodiments, the inside diameter of the sealing member 614 can be substantially similar to or equal to an outside diameter of the receiving collar. In some embodiments, the sealing member 614 can have a contacting surface at a proximal end of the sealing member 614. In some embodiments, the contacting surface can be configured to engage with or be coupled to the substrate. In some embodiments, for example when the sealing member 614 is fully or substantially disposed about the receiving collar, the contacting surface may not be engaged with or coupled to the substrate at any point or place.

In some embodiments, the sealing member 614 can include an outer sealing surface and one or more surface features or other such engaging elements disposed on or integrally formed with an outer surface of the sealing member 614. In some embodiments, the sealing member 614 can include an engaging element 6147 disposed on or formed integrally with an outer surface of the sealing member 614. In some embodiments, the engaging element 6147 can include an inclined surface 6148 positioned as a distal leading edge to the engaging element 6147. In some embodiments, the engaging element 6147 can include a medial surface 6149 which may act partially, primarily, or solely as a contact surface when the sealing member 614 is disposed within the receiving tube. In some embodiments, the engaging element 6147 can further include a proximal surface 6151.

In some embodiments, the engaging element 6147 can be dimensioned and configured to extend circumferentially about a diameter of the sealing member 614. In some embodiments, the engaging element 6147 can be configured to engage the inner cylindrical surface of the receiving tube to resist removal of the sensor during operation. In some embodiments, the engaging element 6147 can be dimensioned and configured to cause an asymmetrical friction force against the inner cylindrical surface of the receiving tube such that the friction force between the engagement member 614 and the inner cylindrical surface of the receiving tube is greater during application of a force to the engagement member 614 in a removal direction defined from the distal end 6140 towards the proximal end 6142 than during application of the force to the engagement member 614 in an insertion direction defined from the proximal end 6142 towards the distal end 6140.

In some embodiments, for the engaging element 6147, the medial surface 6149 can be generally flat in an axial direction and extend about the generally columnar sealing member 614 in a circumferential direction. In some embodiments, the proximal surface 6150 can be generally adjacent the medial surface 6149 in a proximal direction and can extend about the generally columnar sealing member 614 in the circumferential direction. In some embodiments, an intersection of the medial surface 6149 and the proximal portion 6150 may define a first reflex angle. In some embodiments, the distal surface 6148 can be generally adjacent the medial surface 6149 in a distal direction and can extend about the generally columnar sealing member 614 in the circumferential direction. In some embodiments, an intersection of the medial surface 6149 and the distal surface 6148 may define a second reflex angle greater than the first reflex angle.

In some embodiments, a seal may be formed between the engagement member 614 and/or the engaging element 6147 on the one hand and the inner cylindrical surface of the receiving tube on the other hand due, at least in part, to a radial compression fit therebetween. In other words, in some embodiments, the sensory assembly can be retained in the receiving tube based, at least in part, upon a volume match between the engagement member 614 and the inner cylindrical surface of the receiving tube. In some embodiments, the gap that the engagement member 614 is disposed within between the receiving collar and the inner cylindrical surface of the receiving tube can have a volume that is greater than the displacement volume of the engagement member 614, which can prevent or partially prevent the sensor assembly from backing out of the receiving collar. In some embodiments, when the volume of the engagement member 614 engaging the inner cylindrical surface of the receiving collar is greater than the volume of displacement of the engagement member 614, the sensor assembly may back out of the receiving tube.

As illustrated in FIG. 9, the sealing member 6147 has a first radial axis G associated with an axial length of attachment of the sealing member 6147 to a surface 5155 of the sealing member 614. Likewise, the sealing member 6147 is illustrated as having a second radial axis H associated with a radial center of mass of the sealing member 6147. As illustrated, the second radial axis H is to the proximal side of the first radial axis G at least partially because of the particular dimensions and configuration of the sealing member 6147. In other words, since the entire length of attachment of the sealing member 6147 is distal the entire leading surface 6151 of the sealing member 6147, the center of mass of the sealing member 6147 (illustrated as radial axis H) is lower than the center of the length of attachment (illustrated as radial axis G). Without wishing to be bound by any particular theory, this may contribute to an asymmetrical friction force exerted by the sealing member 614 or a component thereof against the inner cylindrical surface of the receiving tube.

In some embodiments, the friction force between the sealing member 614 and/or the sealing member 6147 and the inner cylindrical surface of the receiving tube can be greater during application of a force to the sealing member 614 in a removal direction defined from the distal end towards the proximal end than during application of the force to the sealing member 614 in an insertion direction defined from the proximal end towards the distal end. Without wishing to be bound by any particular theory, a particular shape or a feature of the shape of the sealing member 6147 may also or alternatively contribute to the asymmetrical friction force exhibited by the sealing member 614 and/or the sealing member 6147. In other words, in some embodiments, when the sealing member 6147 includes a sufficiently long tapered surface 6148 relative to a non-tapered leading surface 6151, the sealing member 6147 may exhibit differential mechanical properties when a deforming frictional force is exerted upon the sealing member 6147 depending upon the direction of that frictional force. The deforming frictional force may cause less or more deformation of the sealing member 6147 depending upon the direction in which the deforming frictional force is exerted. In other words, in some embodiments, the sealing member 6147 may experience a first deformation when the frictional force is exerted in a direction from the distal portion 6140 to the proximal portion 6142, and may experience a second deformation less than the first deformation when the frictional force is exerted in a direction from the proximal portion 6142 to the distal portion 6140.

As such, in the direction in which less deformation is achieved or possible under the same or similar friction force, the normal frictional forces exerted by a contacting surface or edge of the sealing member 6147 against the inner cylindrical surface of the receiving tube can be less than in the direction in which more deformation is achieved or possible under the same or similar friction force. In other words, the sealing member 6147 may deform under compression to contribute to or cause the differential force required for insertion versus removal of the sealing member 614 from the receiving tube.

In some embodiments, the radial distance and volume of the gap between an outer diameter of the main body 6155 of the sealing member 614 and an inner diameter at a corresponding point of the inner cylindrical surface of the receiving tube can be greater than a predetermined threshold sufficient for retaining the sealing member 614 within the receiving tube by allowing the engaging element 6147 to fold and compress into the gap to propagate the seal and hold the sealing member 614 in place. In other words, in some embodiments, when the volume of the gap between the sealing member 614 and the receiving tube is less than the volume of the engaging element 6147, for instance, the sealing member 614 will tend to be removed from the receiving tube under normal operating pressures, however when the volume of the gap between the sealing member 614 and the receiving tube is greater than the volume of the engaging element 6147, for instance, the sealing member 614 will tend to be retained within the receiving tube under normal operating pressures at least partially because the engaging element 6147 can be deformed (e.g., folded, compressed, etc.) into the volume of the gap and the normal compressive forces of the sealing member 614 against the inside surface of the receiving tube will be maintained.

Referring now to FIG. 10, a sealing member 714 is illustrated for use with a sensor assembly (e.g., the sensor assembly 105), according to an embodiment of the present disclosure. In some embodiments, the sealing member 714 can engage with a substrate (e.g., the substrate 110) of the sensor assembly (e.g., via a receiving collar). In some embodiments, the sealing member 714 can be particularly configured and dimensioned to be disposed about, partially disposed about, or disposed about part of a receiving collar such as the receiving collars discussed herein. In some embodiments, the sealing member 714 can be particularly configured and dimensioned such that, when the sealing member 714 is disposed about, partially disposed about, or disposed about part of the receiving collar, a diameter difference at the interface between the sealing member 714 and the receiving collar is sufficiently small so that the sealing member 714 is retained on the receiving collar during use of the sensor assembly.

In some embodiments, the sealing member 714 can include a distal portion 7140, a medial portion 5141, and a proximal portion 7142. In some embodiments, the sealing member 714 can define an orifice at the distal portion 7140 and an orifice at the proximal portion 7142. In some embodiments, the distal portion 7140, the medial portion 7141, and/or the proximal portion 7142 can be aligned axially along the sealing member 714. In some embodiments, the distal portion 7140, the medial portion 7141, and/or the proximal portion 7142 can at least partially define an axial bore (not shown) aligned axially along the sealing member 714. In some embodiments, the sealing member 714 can include a flange 7143 defined at the edge of the orifice in the distal portion 7140 of the sealing member 714. In some embodiments, the proximal portion 7142 can be configured to abut, be coupled to, be fixed to, be adhered to, or integrally formed with a portion of the substrate.

In some embodiments, the engagement member can engage with the substrate such that the engagement member 714 is disposed about a sensor (e.g., the sensor 112). The axial bore can be at least partially defined by an inner cylindrical surface (not shown). In some embodiments, the engagement member can be configured and dimensioned to be disposed about the sensor and be coupled to the substrate and to retain one or more media in place about the sensor. In some embodiments, the engagement member can comprise the sealing member 714 disposed about at least a portion of the receiving collar, the receiving collar coupled to the substrate. In other words, while the receiving collar is typically coupled to the substrate, the sealing member 714 can be disposed about only a distal portion of the receiving collar or a medial portion of the receiving collar, and in such a way, the sealing member 714 can be disposed about a portion of the receiving collar without abutting or being coupled to the substrate. In some embodiments, the receiving collar can define a first axial bore having a volume approximately equal to the inner diameter and length of the aperture through the receiving collar. In some embodiments, the sealing member 714 can define a second axial bore having a volume approximately equal to the inside diameter and length of the aperture through the sealing member 714. In some embodiments, the inside diameter of the sealing member 714 can be substantially similar to or equal to an outside diameter of the receiving collar. In some embodiments, the sealing member 714 can have a contacting surface at a proximal end of the sealing member 714. In some embodiments, the contacting surface can be configured to engage with or be coupled to the substrate. In some embodiments, for example when the sealing member 714 is fully or substantially disposed about the receiving collar, the contacting surface may not be engaged with or coupled to the substrate 110 at any point or place.

In some embodiments, the engagement member can be or include a generally columnar sealing member 714 configured to engage the receiving tube. In some embodiments, the sealing member 714 can include an outer sealing surface one or more surface features or other such engaging elements disposed on or integrally formed with an outer surface of the sealing member 714. In some embodiments, the sealing member 714 can include a first engaging element 7147 disposed on or formed integrally with an outer surface of the sealing member 714. In some embodiments, the first engaging element 7147 can include an inclined surface 7148 positioned as a distal leading edge to the first engaging element 7147. In some embodiments, the sealing member 714 can further include a second engaging element 7151. In some embodiments, the second engaging element 7151 can be disposed on or formed integrally with the outer surface of the sealing member 714 proximal the first engaging element 7147. In some embodiments, the second engaging element 7151 can include an inclined surface 7150 positioned as a distal leading edge to the second engaging element 7151. In some embodiments, the sealing member 514 can include additional engaging members or other such elements configured to fixably engage the inner cylindrical surface of the receiving tube. In some embodiments, the first engaging element 7147 can further include a proximal surface 7151. In some embodiments, the second engaging element 7151 can further include a proximal surface 7154.

In some embodiments, the first engaging element 7147 and/or the second engaging element 7151 can be dimensioned and configured to extend circumferentially about a diameter of the sealing member 714. In some embodiments, the first engaging element 7147 and the second engaging element 7151 can be configured to engage the inner cylindrical surface of the receiving tube to resist removal of the sensor during operation. In some embodiments, the first engaging element 7147 and the second engaging element 7151 can be dimensioned and configured to cause an asymmetrical friction force against the inner cylindrical surface of the receiving tube such that the friction force between the engagement member 714 and the inner cylindrical surface of the receiving tube is greater during application of a force to the engagement member 714 in a removal direction defined from the distal end 7140 towards the proximal end 7142 than during application of the force to the engagement member 714 in an insertion direction defined from the proximal end 7142 towards the distal end 7140.

In some embodiments, the sealing member 714 can be generally columnar and can be configured to fixedly engage the receiving tube. In some embodiments, the sealing member 714 can include one or more surface features, such as a first and second engaging elements 7147, 7151 disposed on or integrally formed with an outer surface (e.g., the medial portion 7141) of the sealing member 714. In some embodiments, the sealing member 714 can include a first engaging element 7147 disposed on or formed integrally with an outer surface of the sealing member 714, in either event referred to as a portion of the outer surface. In some embodiments, the first engaging element 7147 can include an inclined surface 7148 positioned as a distal leading edge to the first engaging element 7147. In some embodiments, the first engaging element 7147 can include a medial surface 7149 which may act partially, primarily, or solely as a contact surface when the sealing member 714 is disposed within the receiving tube. In some embodiments, the sealing member 714 can further include a second engaging element 7151. In some embodiments, the second engaging element 7151 can be disposed on or formed integrally with the outer surface of the sealing member 714 proximal the first engaging element 7147. In some embodiments, the second engaging element 7151 can include an inclined surface 7152 positioned as a distal leading edge to the second engaging member 7151. In some embodiments, the second engaging element 7151 can include a medial surface 7153 which may act partially, primarily, or solely as a contact surface when the sealing member 714 is disposed within the receiving tube. In some embodiments, the sealing member 714 can include additional engaging elements or other such elements configured to fixably engage the inner cylindrical surface of the receiving tube. In some embodiments, the first engaging element 7147 can further include a proximal surface 7151. In some embodiments, the second engaging element 7151 can further include a proximal surface 7152.

In some embodiments, for the first engaging element 7147, the medial surface 7149 can be generally flat in an axial direction and extend about the generally columnar sealing member 714 in a circumferential direction. In some embodiments, the proximal surface 7150 can be generally adjacent the medial surface 7149 in a proximal direction and can extend about the generally columnar sealing member 714 in the circumferential direction. In some embodiments, an intersection of the medial surface 7149 and the proximal portion 7150 may define a first reflex angle. In some embodiments, the distal surface 7148 can be generally adjacent the medial surface 7149 in a distal direction and can extend about the generally columnar sealing member 714 in the circumferential direction. In some embodiments, an intersection of the medial surface 7149 and the distal surface 7148 may define a second reflex angle greater than the first reflex angle.

Additionally or alternatively, in some embodiments, the medial surface 7153 can be generally flat in an axial direction and extend about the generally columnar sealing member 714 in a circumferential direction. In some embodiments, the proximal surface 7154 can be generally adjacent the medial surface 7153 in a proximal direction and can extend about the generally columnar sealing member 714 in the circumferential direction. In some embodiments, an intersection of the medial surface 7153 and the proximal portion 7154 may define a first reflex angle. In some embodiments, the distal surface 7152 can be generally adjacent the medial surface 7153 in a distal direction and can extend about the generally columnar sealing member 714 in the circumferential direction. In some embodiments, an intersection of the medial surface 7153 and the distal surface 7152 may define a second reflex angle greater than the first reflex angle.

As illustrated in FIG. 10, the first engaging element 7147 has a first radial axis I associated with an axial length of attachment of the first engaging element 7147 to a main body 7155 of the sealing member 714. In some embodiments, the sealing member 714 can include a distal portion 7140, a medial portion 7141, and a proximal portion 7142, aligned along an axial direction. Likewise, the first engaging element 7147 is illustrated as having a second radial axis J associated with a radial center of mass of the first engaging element 7147. As illustrated, the second radial axis J is to the proximal side of the first radial axis I at least partially because of the particular dimensions and configuration of the first engaging element 7147. In other words, in some embodiments, the center of mass of the first engaging element 7147 (illustrated as radial axis J) is lower than the center of the length of attachment (illustrated as radial axis I). Without wishing to be bound by any particular theory, this may contribute to an asymmetrical friction force exerted by the sealing member 714 or a component thereof against the inner cylindrical surface of the receiving tube.

In some embodiments, the friction force between the sealing member 714 and/or the first engaging element 7147 and the inner cylindrical surface of the receiving tube can be greater during application of a force to the sealing member 714 in a removal direction defined from the distal end towards the proximal end than during application of the force to the sealing member 714 in an insertion direction defined from the proximal end towards the distal end. Without wishing to be bound by any particular theory, a particular shape or a feature of the shape of the first engaging element 7147 may also or alternatively contribute to the asymmetrical friction force exhibited by the sealing member 714 and/or the first engaging element 7147. In other words, in some embodiments, when the first engaging element 7147 includes a sufficiently long tapered surface 7148 relative to a non-tapered leading surface 7151, the first engaging element 7147 may exhibit differential mechanical properties when a deforming frictional force is exerted upon the first engaging element 7147 depending upon the direction of that frictional force. The deforming frictional force may cause less or more deformation of the first engaging element 7147 depending upon the direction in which the deforming frictional force is exerted. In other words, in some embodiments, the first engaging element 7147 may experience a first deformation when the frictional force is exerted in a direction from the distal portion 7140 to the proximal portion 7142, and may experience a second deformation less than the first deformation when the frictional force is exerted in a direction from the proximal portion 7142 to the distal portion 7140.

As such, in the direction in which less deformation is achieved or possible under the same or similar friction force, the normal frictional forces exerted by a contacting surface or edge of the first engaging element 7147 against the inner cylindrical surface of the receiving tube can be less than in the direction in which more deformation is achieved or possible under the same or similar friction force. In other words, the first engaging element 7147 may deform to contribute to or cause the differential force required for insertion versus removal of the sealing member 714 from the receiving tube.

In some embodiments, a second engaging element 7151 can behave in the same or a similar manner as the first engaging element 7147. However, while FIG. 10 illustrates that the second engaging element 7151 is dimensionally similar to the first engaging element 7147, albeit positioned proximate the first engaging element 7147, the second engaging element 7151 can alternatively be dimensioned and configured in any other suitable way. Alternatively, in other embodiments, the sealing member 714 may not include the second engaging element 7151 and/or the first engaging element 7147 can be dimensioned, configured, shaped, positioned, and/or react to an exerted frictional force in any other suitable manner.

In some embodiments, the radial distance and volume of the gap between an outer diameter of the main body of the sealing member 714 and an inner diameter at a corresponding point of the inner cylindrical surface of the receiving tube can be greater than a predetermined threshold sufficient for retaining the sealing member 714 within the receiving tube by allowing the engaging elements 7147, 7151 to fold and compress into the gap to propagate the seal and hold the sealing member 714 in place. In other words, in some embodiments, when the volume of the gap between the sealing member 714 and the receiving tube is less than the volume of the engaging elements 7147, 7151, for instance, the sealing member 714 will tend to be removed from the receiving tube under normal operating pressures, however when the volume of the gap between the sealing member 714 and the receiving tube is greater than the volume of the engaging elements 7147, 7151, for instance, the sealing member 714 will tend to be retained within the receiving tube under normal operating pressures at least partially because one or more of the engaging elements 7147, 7151 can be deformed (e.g., folded, compressed, etc.) into the volume of the gab and the normal compressive forces of the sealing member 714 against the inside surface of the receiving tube will be maintained.

Figure 11:
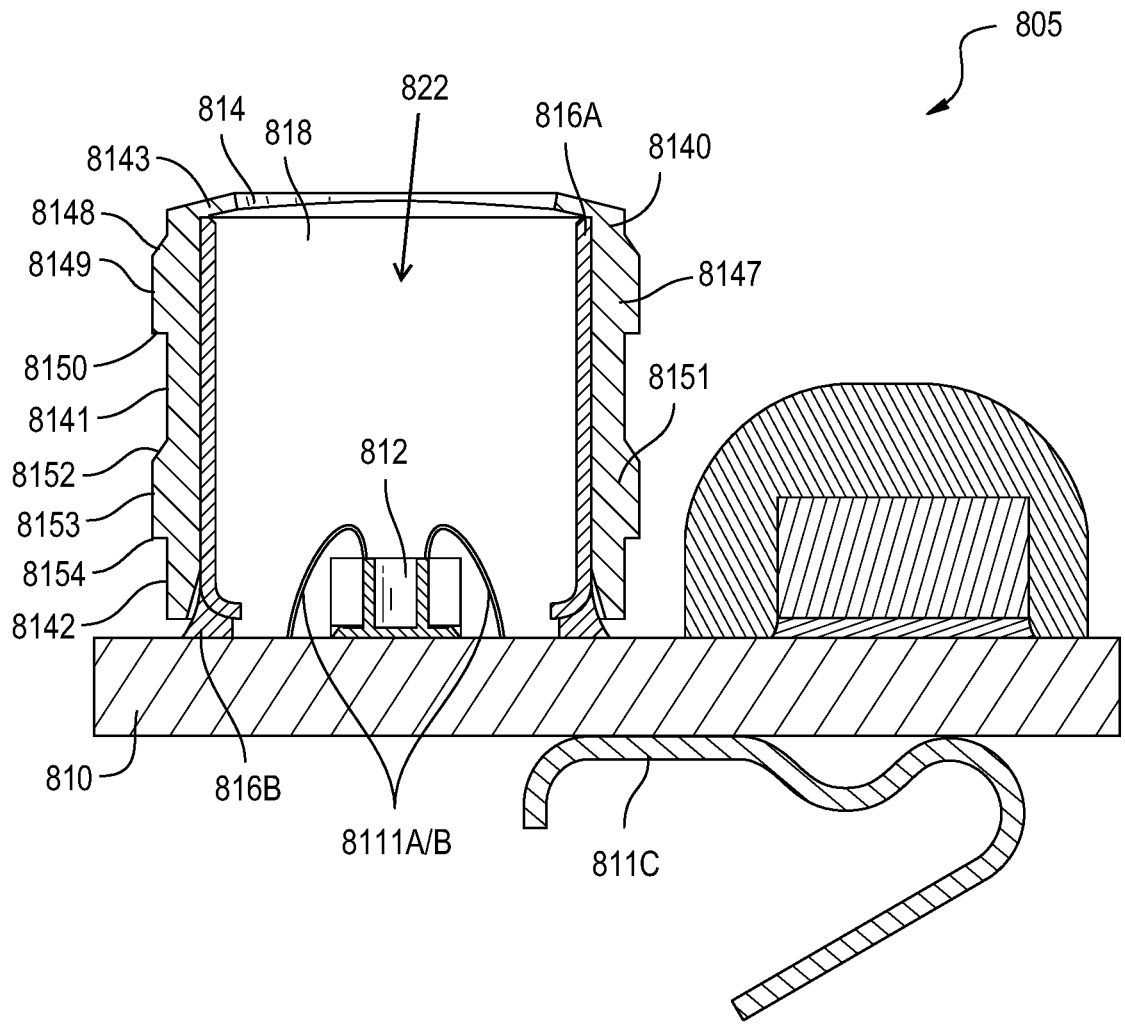
FIG. 11 illustrates a cross-sectional view of a sensor assembly for a pressure reading apparatus, in accordance with some example embodiments discussed herein.

Turning to FIG. 11, a cross-sectional view of a sensing apparatus 805 for a pressure reading assembly (e.g., 100) is illustrated according to an embodiment of the present disclosure. In the depicted embodiment, a sealing member 814 is shown disposed about a portion of a receiving collar 816, which are each disposed about a sensor 812 on a substrate 810. In some embodiments, the receiving collar 816 can be similar or substantially identical to the receiving collar 116 described above with regard to FIG. 1. However, as illustrated in FIG. 11, the receiving collar 816 can have or include or define more than one layer of material and/or more than one component. For instance, the receiving collar 816 can include a generally columnar portion 816A defining an axial bore 822 or the like defined therein, and the generally columnar portion 816A portion can be disposed on, in, partially is, coupled to, or fixed to a base portion 816B, as illustrated in FIG. 11. In some embodiments, the base portion 816B can be used to stabilize or increase the rigidity of one or more of the generally columnar portion 816A of the receiving collar 816 and the sealing member 814.

In some embodiments, the sensing apparatus 805 can further include electronics (811A/B, 811C), such as a circuit board or processing circuitry, configured to transmit/receive electricity, signals, information, and the like to and from the sensor 812 in order to power the sensor 812 and/or retrieve and process sensor signal data related to the pressure/force exerted indirectly by the sensed fluid on the sensor 812. A media 818 is shown disposed within an axial bore 822 defined at least in part by an inner volume of one or both of the receiving collar 816 and the sealing member 814.

In some embodiments, the sealing member 814 can include one or more surface features, such as a first and second engaging elements 8147, 8151 disposed on or integrally formed with an outer surface (e.g., a medial portion 8141) of the sealing member 814. In some embodiments, the first engaging element 8147 can be disposed on or formed integrally with an outer surface of the sealing member 814, in either event referred to as a portion of the outer surface. In some embodiments, the first engaging element 8147 can include an inclined surface 8148 positioned as a distal leading edge to the first engaging element 8147. In some embodiments, the first engaging element 8147 can include a medial surface 8149 which may act partially, primarily, or solely as a contact surface when the sealing member 214 is disposed within the receiving tube. In some embodiments, the sealing member 814 can further include a second engaging element 8151. In some embodiments, the second engaging element 8151 can be disposed on or formed integrally with the outer surface of the sealing member 814 proximal the first engaging element 8147. In some embodiments, the second engaging element 8151 can include an inclined surface 8152 positioned as a distal leading edge to the second engaging member 8151. In some embodiments, the second engaging element 8151 can include a medial surface 8153 which may act partially, primarily, or solely as a contact surface when the sealing member 814 is disposed within the receiving tube. In some embodiments, the sealing member 814 can include additional engaging elements or other such elements configured to fixably engage the inner cylindrical surface of the receiving tube. In some embodiments, the first engaging element 8147 can further include a proximal surface 8151. In some embodiments, the second engaging element 8151 can further include a proximal surface 8152.

In some embodiments, for the first engaging element 8147, the medial surface 8149 can be generally flat in an axial direction and extend about the generally columnar sealing member 814 in a circumferential direction. In some embodiments, the proximal surface 8150 can be generally adjacent the medial surface 8149 in a proximal direction and can extend about the generally columnar sealing member 814 in the circumferential direction. In some embodiments, an intersection of the medial surface 8149 and the proximal portion 8150 may define a first reflex angle. In some embodiments, the distal surface 8148 can be generally adjacent the medial surface 8149 in a distal direction and can extend about the generally columnar sealing member 814 in the circumferential direction. In some embodiments, an intersection of the medial surface 8149 and the distal surface 8148 may define a second reflex angle greater than the first reflex angle.

In some embodiments, the sealing member 814 can include a distal portion 8140, a medial portion 8141, and a proximal portion 8142. Additionally or alternatively, in some embodiments, the medial surface 8153 can be generally flat in an axial direction and extend about the generally columnar sealing member 814 in a circumferential direction. In some embodiments, the proximal surface 8154 can be generally adjacent the medial surface 8153 in a proximal direction and can extend about the generally columnar sealing member 814 in the circumferential direction. In some embodiments, an intersection of the medial surface 8153 and the proximal portion 8154 may define a first reflex angle. In some embodiments, the distal surface 8152 can be generally adjacent the medial surface 8153 in a distal direction and can extend about the generally columnar sealing member 814 in the circumferential direction. In some embodiments, an intersection of the medial surface

8153 and the distal surface 8152 may define a second reflex angle greater than the first reflex angle.

The sealing member 814 is illustrated as having a flange 8143 at a distal end 8140 of the sealing member 814, the flange 8143 operable to reduce gas bubble formation in a sensed fluid during operation of the pressure reading assembly. In some embodiments, the receiving collar 816 can extend to an underside of the flange 8143 to provide a degree of rigidity to the sealing member 814. Any of the engaging elements (e.g., any of engaging elements 2147, 2151, 3147, 3151, 4147, 4151, 5147, 5151, 6147, 7147, or 7151) and other sensing components discussed herein may be interchanged with the components depicted in FIG. 11.

In some embodiments, any of the components described herein including but not limited to sealing members, substrates, engaging elements, receiving collars, receiving tubes, housings, or other components can be formed from any suitable material without limitations. By way of example only, the sealing member and/or an engaging element thereof can comprise a rubber or silicone-containing material or any other suitably compliant and/or deformable material. In some embodiments, the sealing member and/or an engaging element thereof can comprise silicone for biocompatibility. In some embodiments, material(s) from which the sealing member and/or an engaging element thereof are formed can be chosen carefully such that the sealing member and/or an engaging element thereof can compress or deform to create high stress for sealing the sealing member and/or an engaging element thereof against the inside surface of the receiving tube. In some embodiments, the receiving collar can comprise any plastic material, such as polyphenylene sulfide, polypropylene, liquid-crystal polymers, polyolefins, polyethers, polypropyls, and the like, or any suitable metal materials, such as 304 stainless steel. In some embodiments, receiving collar materials can be chosen and the receiving collar can be formed such that the receiving collar has sufficient rigidity to force compression of the sealing member and/or an engaging element thereof, and/or cause compression or deformation of the sealing member and/or an engaging element thereof to create high stress for sealing the sealing member and/or an engaging element thereof against the inside surface of the receiving tube. In some embodiments, the substrate can be formed from a ceramic material, glass-reinforced epoxy laminate materials such as FR-4, OCB printed circuit board materials, and the like. In some embodiments, the substrate or a material or component thereof can be dimensioned and configured to have electrical paths to conduct electricity therethrough, while the substrate should also be rigid enough and durable enough to support the sensor, the receiving collar, and the sealing member during manufacturing and assembly as well as under normal operating pressures and conditions.

Figure 12:
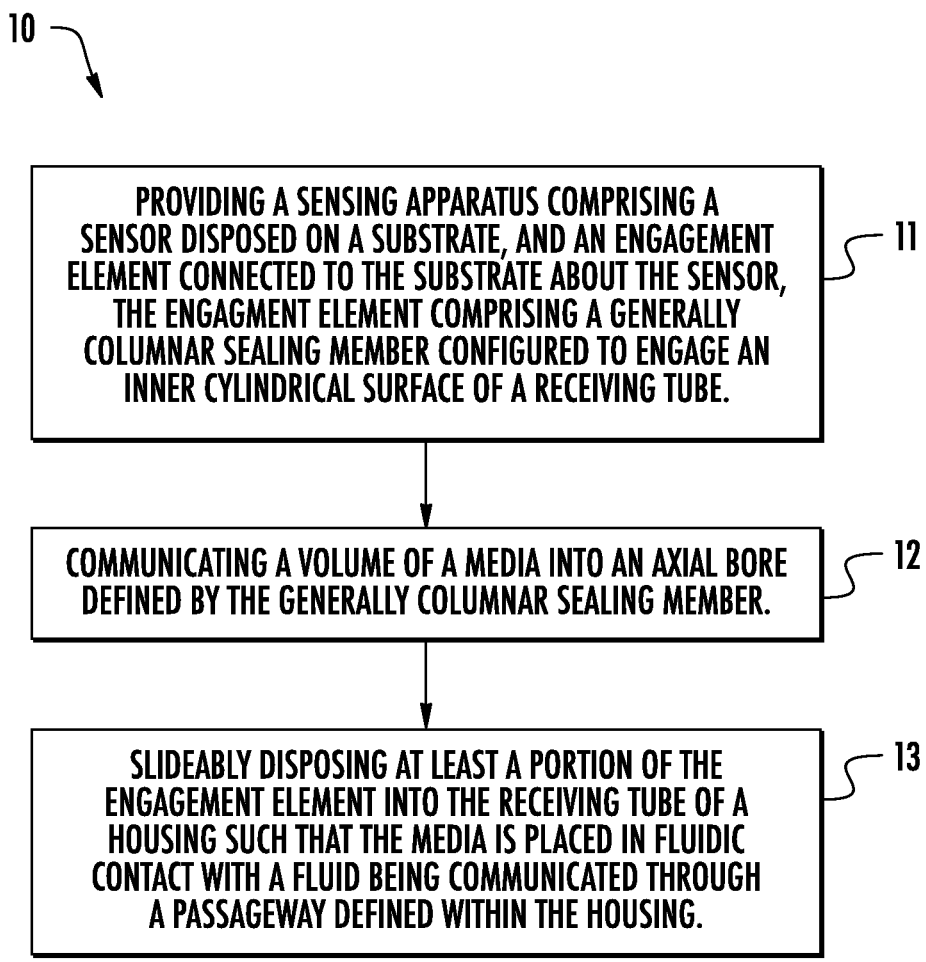
FIG. 12 is a process flow diagram illustrating a method of using an engagement member in a sensor assembly for a pressure reading apparatus, in accordance with some example embodiments described herein.

Referring now to FIG. 12, a method 10 according to an embodiment of the present disclosure can include, at least, providing a sensing apparatus comprising a sensor disposed on a substrate and a sealing member connected to the substrate about the sensor, the sealing member comprising a generally columnar sealing member configured to engage an inner cylindrical surface of a receiving tube, at 11. In some embodiments, the method 10 can further include communicating a volume of a media into the axial bore defined by the generally columnar sealing member, at 12. In some embodiments, the method 10 can further include slideably disposing at least a portion of the sealing member into a receiving tube of a housing such that the media is placed in fluidic contact with a bodily fluid being communicated through a radial passageway defined within the housing, at 13.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

At least some of the embodiments described herein provide for improvements or advantages over a less preferred approach of forming an adhesive joint between the sensor assembly and the housing. Some but not all of the advantages are described here. The adhesive-based approach for joining the sensor assembly and the conduit housing such that the sensor can sense the force exerted by (pressure of) the fluid such as a bodily fluid in the conduit includes dispensing adhesive on one or more components of the assembly or housing, joining the sensor assembly with the conduit housing by inserting the sensor assembly into the receiving tube, curing the adhesive (e.g., using ultraviolet radiation or the like), and inspecting the adhesive joint to make sure there is no excess adhesive in the conduit, on the sensing surface, or elsewhere, especially in medical application. Conversely, in some embodiments described in the present application, the process includes only one step of inserting the sensor assembly into the receiving tube of the conduit housing to non-adhesively join the sensor assembly with the housing. Since there are fewer steps, the cost and time intensiveness of assembly is reduced, and the reliability of the seal is improved since assembly is not dependent upon inserting adhesive into the device. Since no adhesive is used to join the engagement member (e.g., radial seal) with the inner cylindrical surface of the receiving tube, there is reduced likelihood that a final component fails inspection and must be scrapped. In terms of the cleanliness required during assembly for many medical applications, the fact that a pre-sterilized sensor assembly can be removed from a clean sealed packaging and joined directly with the housing means there is less time and handling requirements and less chance for contamination.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A sensing apparatus comprising:
a sensor disposed on a substrate; and
an engagement member connected to the substrate about the sensor, the engagement member comprising a generally columnar sealing member configured to engage an inner cylindrical surface of a receiving tube,
wherein the generally columnar sealing member defines an axial bore extending from a proximal end to a distal end, wherein the generally columnar sealing member is configured to receive one or more media in the axial bore, such that the sensor is configured to detect a force applied to the media at or proximate the distal end,
wherein the generally columnar sealing member comprises an outer sealing surface defining one or more engaging elements extending circumferentially about a diameter of the generally columnar sealing member, wherein the one or more engaging elements are configured to engage the inner cylindrical surface of the receiving tube to resist removal of the sensing apparatus during operation; and
a generally columnar receiving collar coupled to the substrate and positioned about the sensor, the generally columnar receiving collar defining an axial bore extending from a proximal end to a distal end such that the sensor is positioned within an inner volume of the generally columnar receiving collar, at least a portion of the generally columnar sealing member configured to be disposed about at least a portion of the generally columnar receiving collar, such that the at least the portion of the generally columnar receiving collar is configured to be disposed in the axial bore of the generally columnar sealing member.

2. The apparatus of claim 1, wherein the one or more engaging elements stand proud of at least a portion of the outer sealing surface of the generally columnar sealing member and define an asymmetrical shape relative to the insertion direction.

3. The apparatus of claim 2, wherein at least one of the one or more engaging elements comprises:
a medial portion that is flat in an axial direction and extends about the generally columnar sealing member in a circumferential direction;
a proximal portion adjacent the medial portion in a proximal direction and extending about the generally columnar sealing member in the circumferential direction, wherein an intersection of the medial portion and the proximal portion defines a first reflex angle; and
a distal portion adjacent the medial portion in a distal direction and extending about the generally columnar sealing member in the circumferential direction, wherein an intersection of the medial portion and the distal portion defines a second obtuse angle greater than the first reflex angle.

4. The apparatus of claim 1, wherein one of the one or more engaging elements defines an inclined surface defined circumferentially about a distal opening of the axial bore at the distal end of the generally columnar sealing member.

5. The apparatus of claim 1, wherein the outer sealing surface of the generally columnar sealing member is configured to form an adhesive-free interface with the inner cylindrical surface of the receiving tube, such that the engagement of the outer sealing surface with the inner cylindrical surface is configured to support the force applied to the media.

6. The apparatus of claim 1, wherein the one or more engaging elements are configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end.

7. The apparatus of claim 1, wherein the generally columnar sealing member has an innermost diameter, relative to an axis defined from the distal end to the proximal end, that is less than an outermost diameter of the generally columnar receiving collar, such that the sealing member is configured to stretch around the generally columnar receiving collar and be frictionally secured to the generally columnar receiving collar.

8. The apparatus of claim 1, wherein the one or more engaging elements comprise one or more protrusions extending radially outwardly and angled at least partially towards the proximal end.

9. The apparatus of claim 1, wherein the generally columnar sealing member further comprises a flange at a distal opening of the axial bore, the flange defining an aperture at the distal end of the generally columnar sealing member, the flange configured to have a width in an inward radial direction such that a portion of the flange forms a partial covering for the axial bore, wherein the flange is configured to engage at least a portion of the media.

10. The apparatus of claim 9, wherein the flange further comprises a contact surface having a positive slope in a distal direction and an inward radial direction.

11. A pressure reading assembly comprising:
a housing defining:
a conduit configured to allow fluid therethrough, the conduit defining a conduit wall; and
a receiving tube having a first opening, a second opening in the conduit wall, an axial receiving bore extending from the first opening to the second opening and an inner cylindrical surface defining at least a portion of the axial receiving bore; and
a sensing apparatus comprising:
a pressure sensor disposed on a substrate; and
an engagement member connected to the substrate about the sensor, the engagement member comprising a generally columnar sealing member configured to engage an inner cylindrical surface of the receiving tube,
wherein the generally columnar sealing member defines an axial bore extending from a proximal end to a distal end, wherein the generally columnar sealing member is configured to receive one or more media in the axial bore, such that the sensor is configured to detect a force applied to the media at or proximate the distal end caused by the fluid in the conduit,
wherein the generally columnar sealing member comprises an outer sealing surface defining one or more engaging elements extending circumferentially about a diameter of the generally columnar sealing member, wherein the one or more engaging elements are configured to engage the inner cylindrical surface of the receiving tube to resist removal of the pressure sensing assembly from the receiving tube during operation; and
  a generally columnar receiving collar coupled to the substrate and positioned about the sensor, the generally columnar receiving collar defining an axial bore extending from a proximal end to a distal end such that the sensor is positioned within an inner volume of the generally columnar receiving collar, at least a portion of the generally columnar sealing member configured to be disposed about at least a portion of the generally columnar receiving collar, such that the at least the portion of the generally columnar receiving collar is configured to be disposed in the axial bore of the generally columnar sealing member.

12. The assembly of claim 11, wherein the one or more engaging elements are configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end.

13. The assembly of claim 12, wherein the generally columnar sealing member further comprises a flange at a distal opening of the axial bore, the flange defining an aperture at the distal end of the generally columnar sealing member, the flange configured to have a width in an inward radial direction such that a portion of the flange forms a partial covering for the axial bore of the generally columnar sealing member.

14. The assembly of claim 13, wherein the axial bore is oriented perpendicular to a flow direction of the conduit, such that the media is configured to be in fluidic communication with the fluid via the aperture.

15. The assembly of claim 14, wherein coupling the portion of the generally columnar engaging elements with the receiving tube of the housing forms an adhesive-free interface therebetween, such that the engagement of the outer sealing surface with the inner cylindrical surface is configured to support the force applied to the media.

16. The assembly of claim 11, wherein at least one of the one or more engaging elements are positioned at or proximate the distal end of the generally columnar sealing member.

17. The assembly of claim 11, wherein slideably disposing at least the portion of the generally columnar sealing member about at least the portion of the generally columnar receiving collar forms an adhesive-free interface therebetween.

18. A method comprising:
  providing a sensing apparatus comprising:
    a sensor disposed on a substrate; and
    an engagement member connected to the substrate about the sensor, the engagement member comprising:
      a generally columnar sealing member configured to engage an inner cylindrical surface of a receiving tube,
      wherein the generally columnar sealing member defines an axial bore extending from a proximal end to a distal end, wherein the generally columnar sealing member is configured to receive one or more media in the axial bore, such that the sensor is configured to detect a force applied to the media at or proximate the distal end,
      wherein the generally columnar sealing member comprises an outer sealing surface defining one or more engaging elements extending circumferentially about a diameter of the generally columnar sealing member, wherein the one or more engaging elements are configured to engage the inner cylindrical surface of the receiving tube to resist removal of the sensor during operation,
      wherein the one or more engaging elements are configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end; the engagement member further comprising:
      a generally columnar receiving collar coupled to the substrate and positioned about the sensor, the generally columnar receiving collar defining an axial bore extending from a proximal end to a distal end such that the sensor is positioned within an inner volume of the generally columnar receiving collar, at least a portion of the generally columnar sealing member configured to be disposed about at least a portion of the generally columnar receiving collar, such that the at least the portion of the generally columnar receiving collar is configured to be disposed in the axial bore of the generally columnar sealing member;
  the method further comprising:
  communicating a volume of a media into the axial bore defined by the generally columnar sealing member; and
  slideably disposing at least a portion of the engagement member into a receiving tube of a housing in the insertion direction such that the media is configured to operably communicate with a fluid being communicated through a radial passageway defined within the housing.

19. The method of claim 18, wherein at least the portion of the generally columnar sealing member, when slideably disposed about at least the portion of the generally columnar receiving collar, forms an adhesive-free interface therebetween that retains at least the portion of the generally columnar sealing member disposed about at least the portion of the generally columnar receiving collar.

20. The method of claim 18, wherein the one or more engaging elements are configured to cause an asymmetrical friction force against the inner cylindrical surface such that the friction force between the generally columnar sealing member and the inner cylindrical surface is greater during application of a force to the generally columnar sealing member in a removal direction defined from the distal end towards the proximal end than during application of the force to the generally columnar sealing member in an insertion direction defined from the proximal end towards the distal end.

* * * * *